(12) United States Patent
Yi et al.

(10) Patent No.: US 12,557,092 B2
(45) Date of Patent: Feb. 17, 2026

(54) DATA SCHEDULING IN HIGH FREQUENCY

(71) Applicant: Ofinno, LLC, Reston, VA (US)

(72) Inventors: Yunjung Yi, Vienna, VA (US); Hyoungsuk Jeon, Centreville, VA (US); Esmael Hejazi Dinan, McLean, VA (US); Jonghyun Park, Syosset, NY (US); Ali Cagatay Cirik, Chantilly, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 538 days.

(21) Appl. No.: 17/694,350

(22) Filed: Mar. 14, 2022

(65) Prior Publication Data

US 2022/0304015 A1 Sep. 22, 2022

Related U.S. Application Data

(60) Provisional application No. 63/162,798, filed on Mar. 18, 2021.

(51) Int. Cl.
*H04W 72/1263* (2023.01)
*H04L 27/26* (2006.01)
(Continued)

(52) U.S. Cl.
CPC ... *H04W 72/1263* (2013.01); *H04L 27/26025* (2021.01); *H04W 24/08* (2013.01);
(Continued)

(58) Field of Classification Search
CPC . H04W 72/1263; H04W 72/23; H04W 24/08; H04W 72/0446; H04W 72/0453; H04L 27/26025
See application file for complete search history.

(56) References Cited

U.S. PATENT DOCUMENTS

2021/0168835 A1* 6/2021 Xiao .................. H04L 5/0044
2021/0385802 A1* 12/2021 Bae .................... H04W 72/23
(Continued)

OTHER PUBLICATIONS

R1-2100061; 3GPP TSG RAN WG1 #104-e; e-meeting, Jan. 25-Feb. 5, 2021; Source: Lenovo, Motorola Mobility; Title: PDSCH/PUSCH scheduling enhancements for NR from 52.6 GHz to 71GHz; Agenda Item: 8.2.5; Document for: Discussion.
(Continued)

*Primary Examiner* — Faruk Hamza
*Assistant Examiner* — Alan L Lindenbaum
(74) *Attorney, Agent, or Firm* — Reese Bastian; Kavon Nasabzadeh; Jacob L. Mangan

(57) ABSTRACT

A wireless device may receive one or more configuration parameters, of a cell, for physical downlink control channel (PDCCH) monitoring. The one or more configuration parameters may indicate a time duration of a span of one or more symbols for the PDCCH monitoring, and a time gap between two consecutive spans. The wireless device may determine a buffering time offset, for buffering data scheduled by a PDCCH transmission, based on the time gap and a subcarrier spacing of the cell. The wireless device may receive, in a first radio resource, downlink control information (DCI) scheduling a transport block (TB) in a second radio resource. The wireless device may drop the TB in response to a duration, in time, between the first radio resource and the second radio resource being less than, or equal to, the buffering time offset.

20 Claims, 36 Drawing Sheets

(51) Int. Cl.
*H04W 24/08* (2009.01)
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(56) References Cited

U.S. PATENT DOCUMENTS

2022/0167193 A1* 5/2022 Kim .................... H04W 72/044
2022/0303951 A1* 9/2022 Ren ....................... H04W 72/02

OTHER PUBLICATIONS

R1-2100150; 3GPP TSG RAN WG1 #104-e; e-Meeting, Jan. 25-Feb. 5, 2021; Source: OPPO; Title: Discussion on PDCCH monitoring; Agenda Item: 8.2.2; Document for: Discussion and Decision.
R1-2100644; 3GPP TSG RAN WG1 Meeting #104-e; e-Meeting, Jan. 25-Feb. 5, 2021; Source: Intel Corporation; Title: Discussion on PDCCH monitoring enhancements for extending NR up to 71 GHz; Agenda item: 8.2.2; Document for: Discussion/Decision.
R1-2100820; 3GPP TSG RAN WG1#104-e; e-Meeting, Jan. 25-Feb. 5, 2021; Agenda Item: 8.2.5; Source: Spreadtrum Communications; Title: Discussion on PDSCH and PUSCH enhancements for above 52.6GHZ; Document for: Discussion and decision.
R1-2101373; 3GPP TSG RAN WG1 #104-e; e-Meeting, Jan. 25-Feb. 5, 2021; Agenda Item: 8.2.2; Source: Apple Inc.; Title: PDCCH monitoring enhancements for NR between 52.6GHz and 71 GHz; Document for: Discussion/Decision.
R1-2101376; 3GPP TSG RAN WG1 #104-e; e-Meeting, Jan. 25-Feb. 5, 2021; Agenda Item: 8.2.5; Source: Apple Inc.; Title: PDSCH/PUSCH enhancements for NR between 52.6GHz and 71 GHz; Document for: Discussion/Decision.
R1-2101454; 3GPP TSG-RAN WG1 #104-e; e-Meeting, Jan. 25-Feb. 5, 2021; Agenda item: 8.2.2; Source: Qualcomm Incorporated; Title: PDCCH monitoring enhancements; Document for: Discussion/Decision.
R1-2101457; 3GPP TSG-RAN WG1 #104-e; e-Meeting, Jan. 25-Feb. 5, 2021; Agenda item: 8.2.5; Source: Qualcomm Incorporated; Title: PDSCH and PUSCH enhancements for 52.6-71GHz band; Document for: Discussion/Decision.
R1-2101776; 3GPP TSG RAN WG1 Meeting #104-e; E-meeting, Jan. 25-Feb. 5, 2021; Source: Moderator (vivo); Title: Summary of PDSCH/PUSCH enhancements (Bandwidth/Timeline/Reference signals); Agenda item: 8.2.5; Document for: Discussion and decision.
R1-2101858; 3GPP TSG RAN WG1 #104-e; e-Meeting, Jan. 25-Feb. 5, 2021; Agenda Item: 8.2.5; Source: Moderator (LG Electronics); Title: Summary #2 of PDSCH/PUSCH enhancements (Scheduling/HARQ); Document for: Discussion and decision.
R1-2101874; 3GPP TSG RAN WG1#104-e; e-Meeting, Jan. 25-Feb. 5, 2021; Agenda Item: 8.2.2; Source: Moderator (Lenovo); Title: Feature lead summary for [104-e-NR-52-71GHz-02] Email discussion/approval on PDCCH monitoring enhancements; Document for: Discussion, Decision.
R1-2101883; 3GPP TSG RAN WG1 Meeting #104-e; E-meeting, Jan. 25-Feb. 5, 2021; Source: Moderator (vivo); Title: Discussion summary #1 of [104-e-NR-52-71GHz-05]; Agenda item: 8.2.5; Document for: Discussion and decision.
R1-2101972; 3GPP TSG RAN WG1 Meeting #104-e; e-Meeting, Jan. 25-Feb. 5, 2021; Agenda Item: 8.2.5; Source: Moderator (LG Electronics); Title: Summary #3 of PDSCH/PUSCH enhancements (Scheduling/HARQ); Document for: Discussion and decision.
R1-2102072; 3GPP TSG RAN WG1 Meeting #104-e; E-meeting, Jan. 25-Feb. 5, 2021; Source: Moderator (vivo); Title: Discussion summary #2 of [104-e-NR-52-71GHz-05]; Agenda item: 8.2.5; Document for: Discussion and decision.
R1-2102080; 3GPP TSG RAN WG1 #104-e; e-Meeting, Jan. 25-Feb. 5, 2021; Agenda Item: 8.2.5; Source: Moderator (LG Electronics); Title: Summary #4 of PDSCH/PUSCH enhancements (Scheduling/HARQ); Document for: Discussion and decision.
R1-2102142; 3GPP TSG RAN WG1#104-e; e-Meeting, Jan. 25-Feb. 5, 2021; Agenda Item: 8.2.2; Source: Moderator (Lenovo); Title: Feature lead summary#2 for [104-e-NR-52-71GHz-02] on PDCCH monitoring enhancements; Document for: Discussion, Decision.
R1-2102192; 3GPP TSG-RAN WG1 Meeting #104-e; e-Meeting, Jan. 25-Feb. 5, 2021; Agenda item: 8.2; Title: Session notes for 8.2 (Study on supporting NR from 52.6 GHz to 71 GHz); Source: Ad-hoc Chair (Ericsson); Document for: Endorsement.
R1-2102237; 3GPP TSG RAN WG1 Meeting #104-e; E-meeting, Jan. 25-Feb. 5, 2021; Source: Moderator (vivo); Title: Discussion summary #3 of [104-e-NR-52-71GHz-05]; Agenda item: 8.2.5; Document for: Discussion and decision.
R1-2102242; 3GPP TSG RAN WG1#104-e; e-Meeting, Jan. 25-Feb. 5, 2021; Agenda Item: 8.2.2; Source: Moderator (Lenovo); Title: Feature lead summary#3 for [104-e-NR-52-71GHz-02] on PDCCH monitoring enhancements; Document for: Discussion, Decision.

* cited by examiner

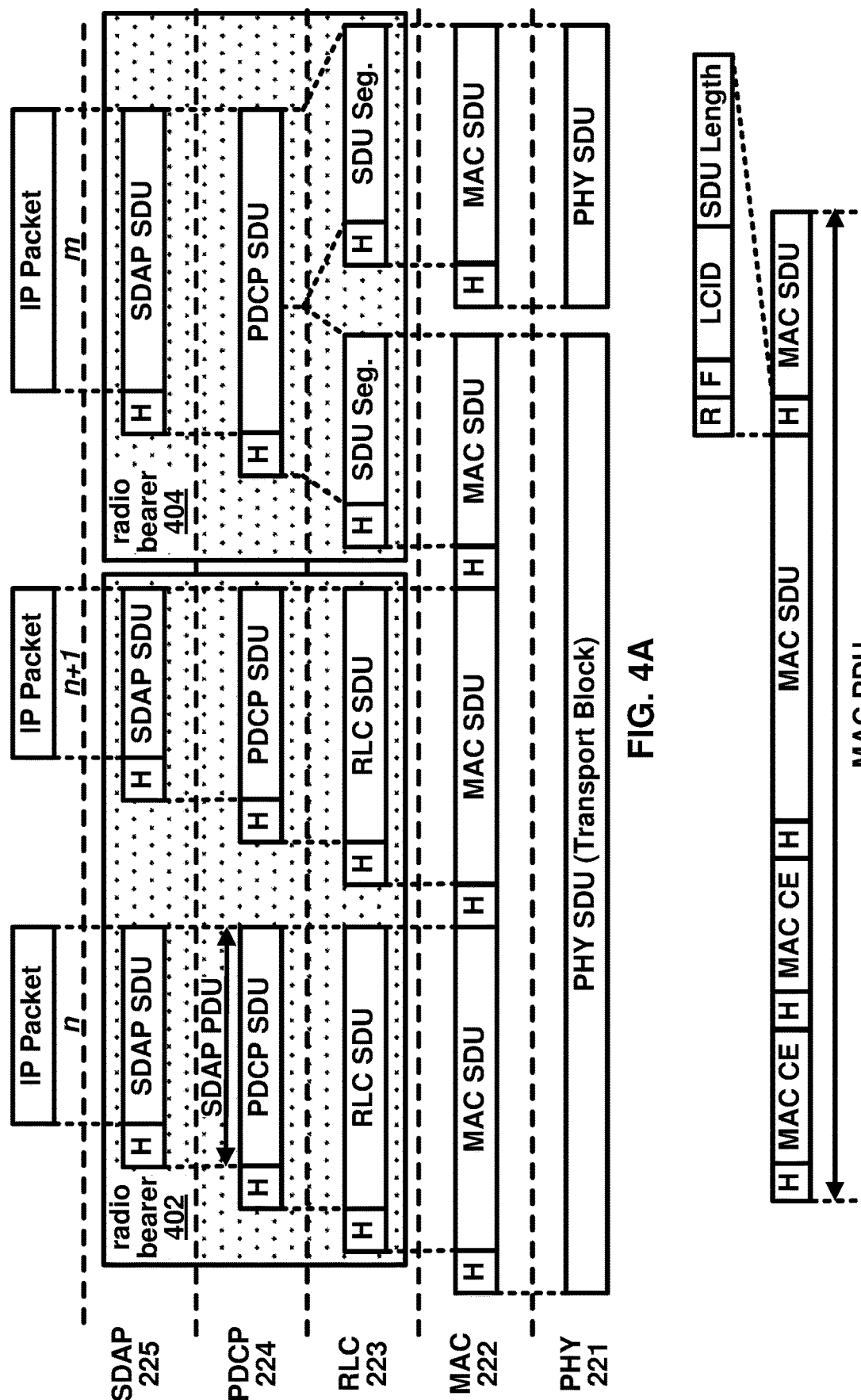

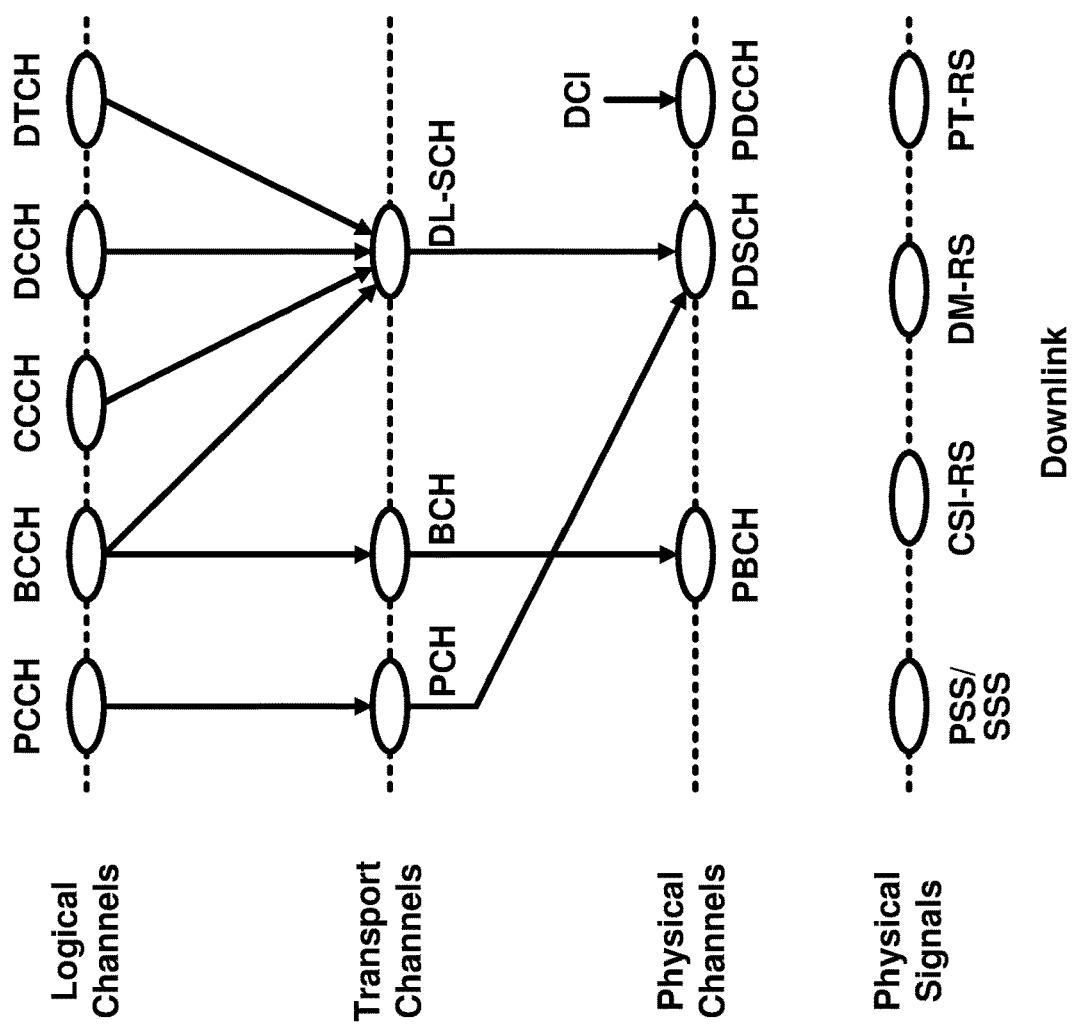
FIG. 5A Downlink
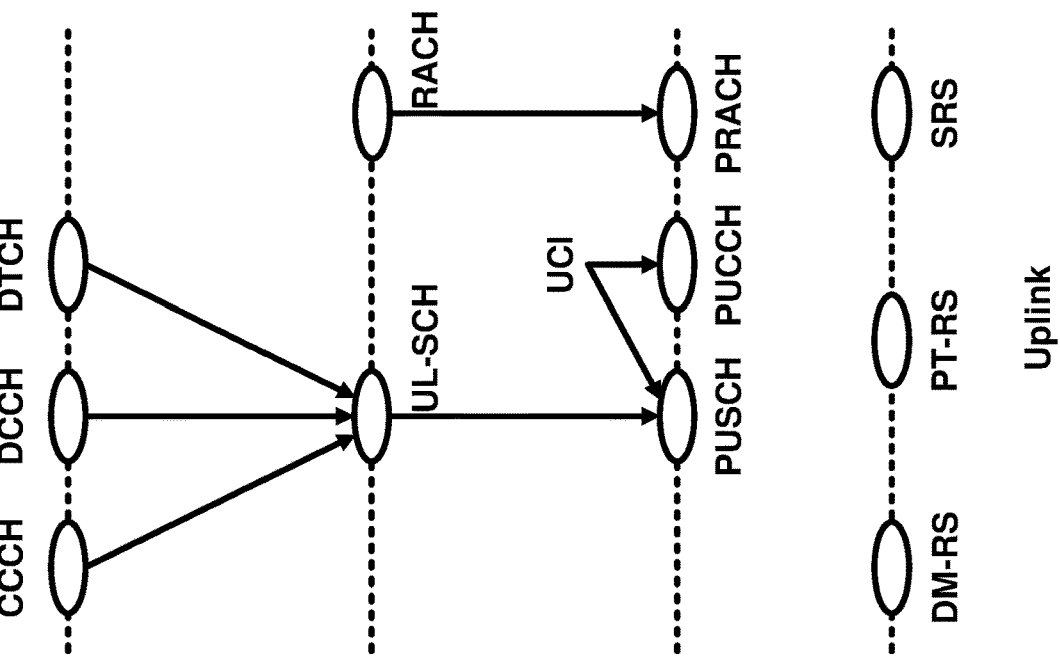
FIG. 5B Uplink

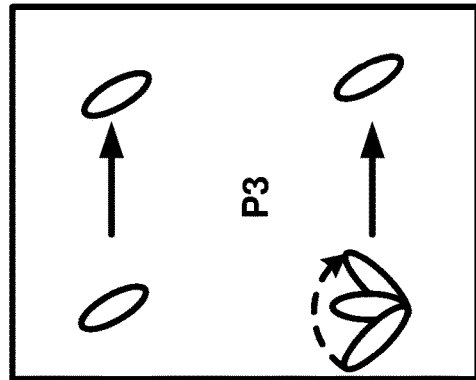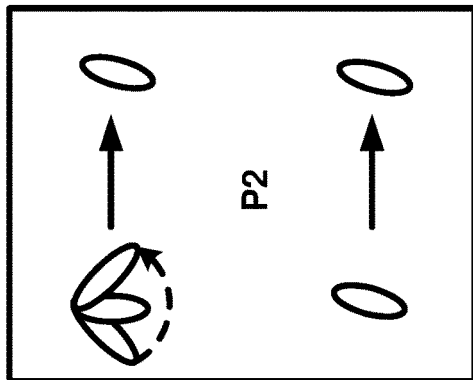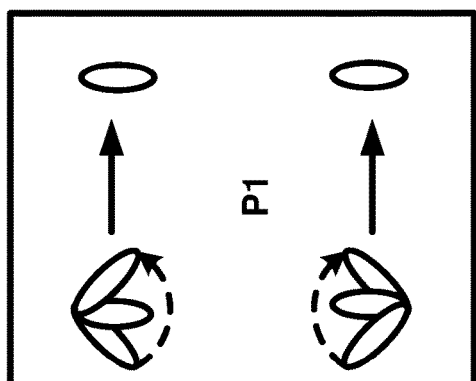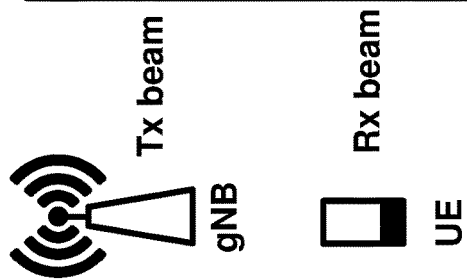
FIG. 12A
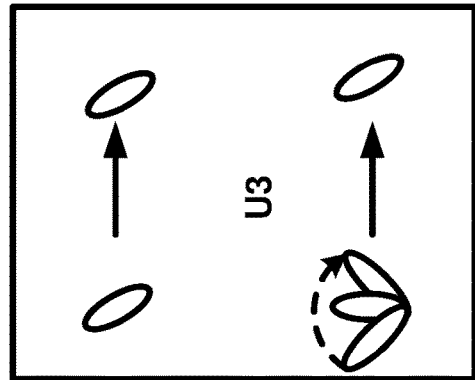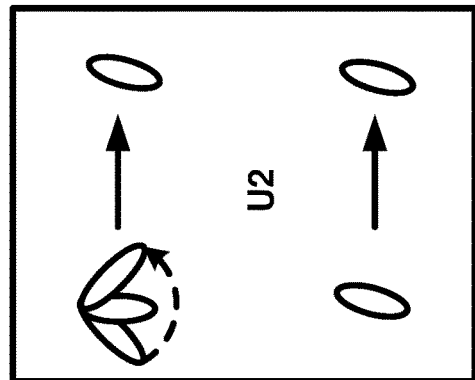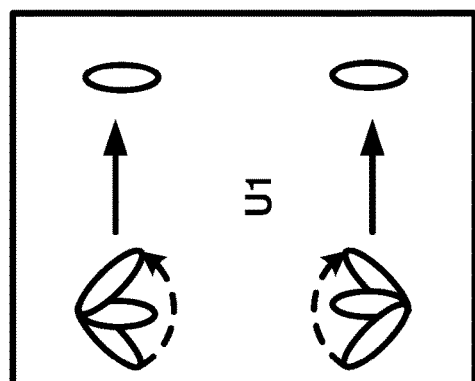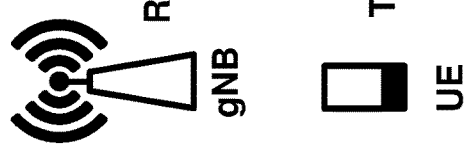
FIG. 12B

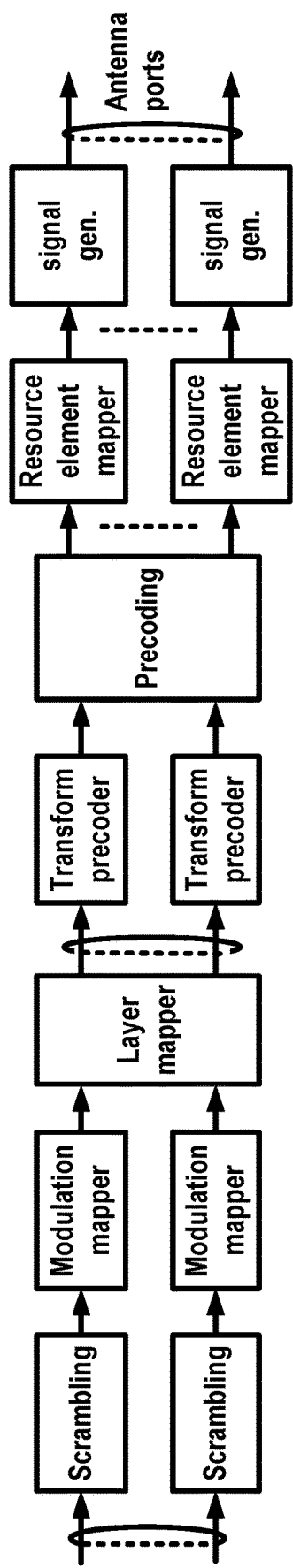
FIG. 16A
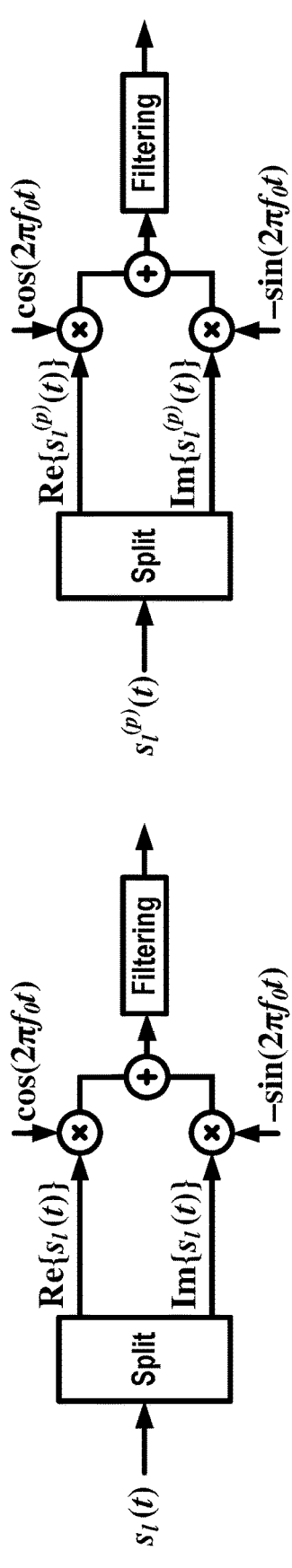
FIG. 16B
FIG. 16D
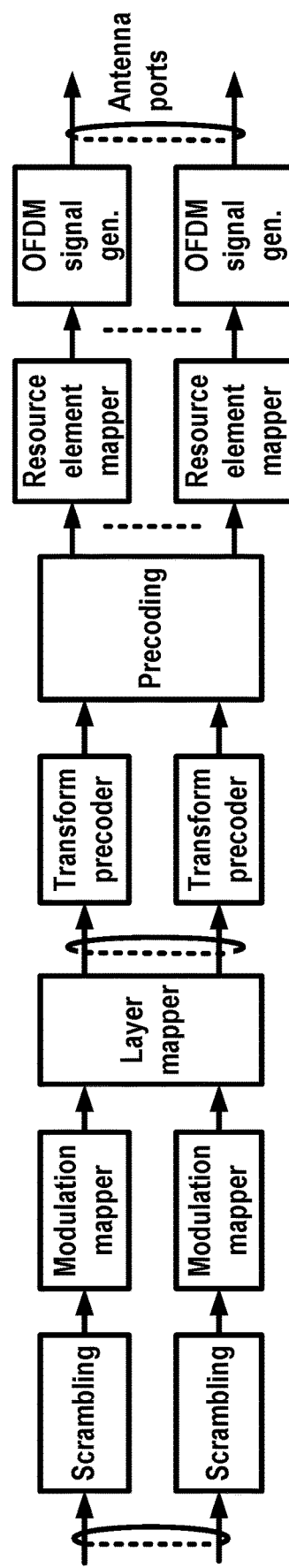
FIG. 16C

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause [x.x] of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17 pdcch-Monitoring-r16
Indicates whether the UE supports PDCCH search space monitoring occasions in any symbol of the slot with minimum time separation between two consecutive transmissions of PDCCH with span up to two OFDM symbols for two OFDM symbols or span up to three OFDM symbols for four and seven OFDM symbols. The different value can be reported for PDSCH processing type 1 and PDSCH processing type 2, respectively. For each sub-carrier spacing, the leading / leftmost bit (bit 0) corresponds to the supported value set (X,Y) of (7,3). The next bit (bit 1) corresponds to the supported value set (X,Y) of (4,3). The rightmost bit (bit 2) corresponds to the supported value set (X,Y) of (2,2).

pdcch-MonitoringCA-r16
Indicates the number of CCs for monitoring a maximum number of blind detections and non-overlapped CCEs per span when configured with DL CA with Rel-16 PDCCH monitoring capability on all the serving cells. This field also indicates supported span arrangement for CA. A UE that supports this feature shall also support pdcch-Monitoring-r16.

crossCarrierSchedulingProcessing-DiffSCS-r16
Indicates the UE cross carrier scheduling processing capability for DL carrier aggregation processing up to X unicast DCI scheduling for DL per scheduled CC. X is based on pair of (scheduling CC SCS, scheduled CC SCS) where a pair of (15,120), (15,60), (30,120) kHz SCS can have X = {1,2,4} while a pair of (15,30), (30,60), (60,120) kHz SCS can have X = {2}, and X applies per span in a slot of scheduling CC.

FIG. 24

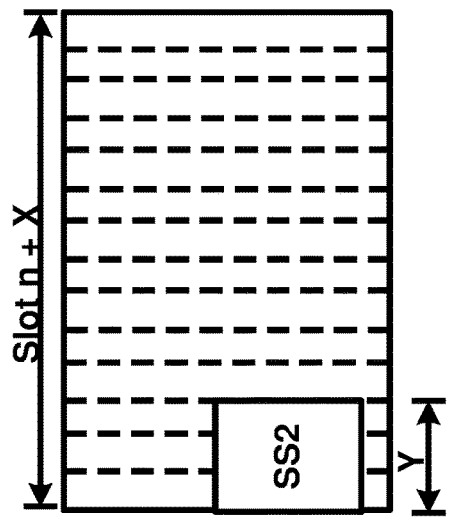
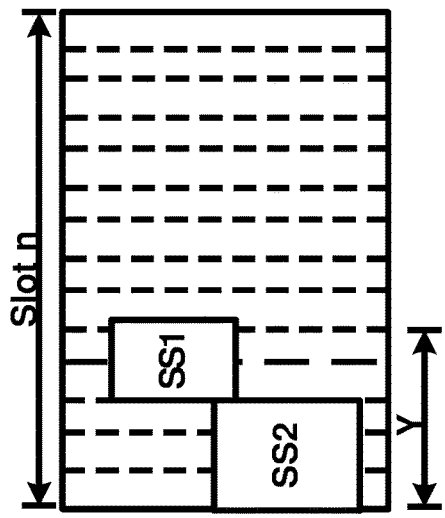
FIG. 25A
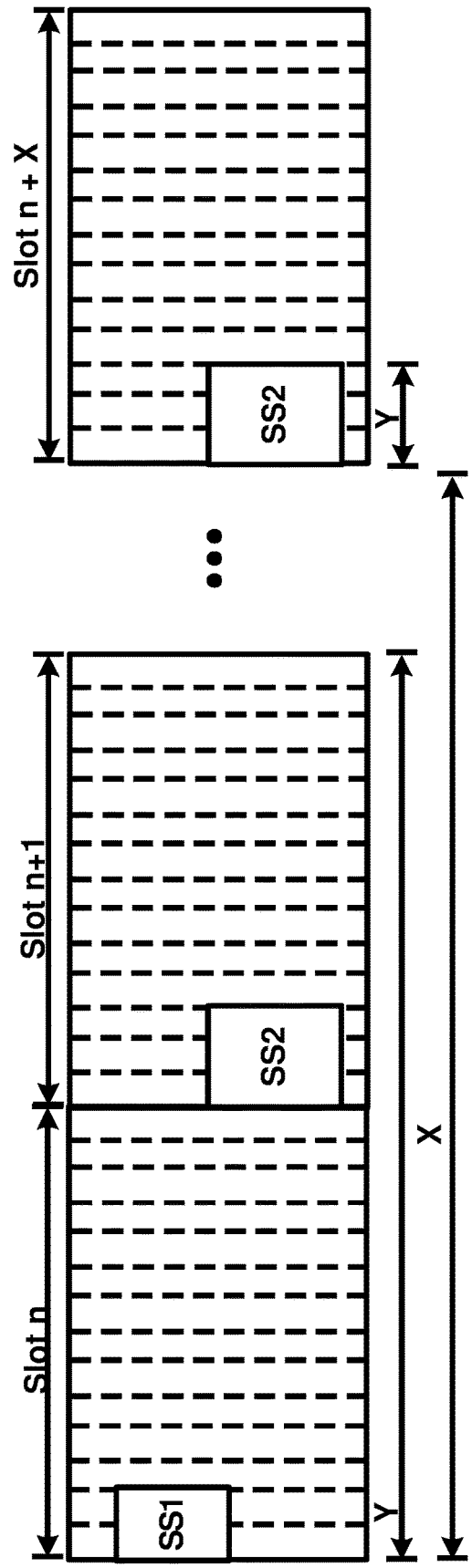
FIG. 25B

| Index | Y | X | # of BDs |
|---|---|---|---|
| 0 | 3 | 64 | 44 |
| 1 | 3 | 32 | 36 |
| 2 | 3 | 16 | 22 |
| 3 | 3 | 8 | 20 |
| 4 | 3 | 1 | 2 |
| 5 | 3 | 1 | 1 (multi-slot) |

FIG. 26A

| Index | Y | X | # of BDs |
|---|---|---|---|
| 0 | 3 | 32 | 44 |
| 1 | 3 | 16 | 36 |
| 2 | 3 | 8 | 22 |
| 3 | 3 | 4 | 20 |
| 4 | 3 | 1 | 4 |
| 5 | 3 | 1 | 2 (multi-slot) |

FIG. 26B

| Index | Y | X | # of DCIs (M) | Buffering Offset (BO) |
|---|---|---|---|---|
| 0 | 3 | 64 | 8 | 68 |
| 1 | 3 | 64 | 4 | 64 |
| 2 | 3 | 64 | 1 | 63 |
| 3 | 3 | 32 | 8 | 48 |
| 4 | 3 | 32 | 4 | 32 |

...

| P | 3 | 4 | 8 | 5 |
| P+1 | 3 | 4 | 4 | 4 |
| P+2 | 3 | 4 | 1 | 3 |

FIG. 28

DATA SCHEDULING IN HIGH FREQUENCY

CROSS-REFERENCE TO RELATED APPLICATIONS

This application claims the benefit of U.S. Provisional Application No. 63/162,798, filed Mar. 18, 2021, which is hereby incorporated by reference in its entirety.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIGS. 5A and 5B respectively illustrate a mapping between logical channels, transport channels, and physical channels for the downlink and uplink.

FIGS. 12A and 12B respectively illustrate examples of three downlink and uplink beam management procedures.

FIGS. 16A, 16B, 16C, and 16D illustrate example structures for uplink and downlink transmission.

FIG. 17 illustrates an example of various DCI formats used for various purposes.

FIG. 24 illustrates one or more capabilities for a PDCCH monitoring as per an aspect of an embodiment of the present disclosure.

FIG. 25A illustrates an example of a multi-slot span as per an aspect of an embodiment of the present disclosure.

FIG. 25B illustrates an example of a multi-slot span as per an aspect of an embodiment of the present disclosure.

FIG. 26A illustrates an example of a wireless device capability of a number of blind decodings for a first SCS as per an aspect of an embodiment of the present disclosure.

FIG. 26B illustrates an example of a wireless device capability of a number of blind decodings for a second SCS as per an aspect of an embodiment of the present disclosure.

FIG. 28 illustrates an example embodiment of a buffering offset capability as per an aspect of an embodiment of the present disclosure.

DETAILED DESCRIPTION

Figure 1A:
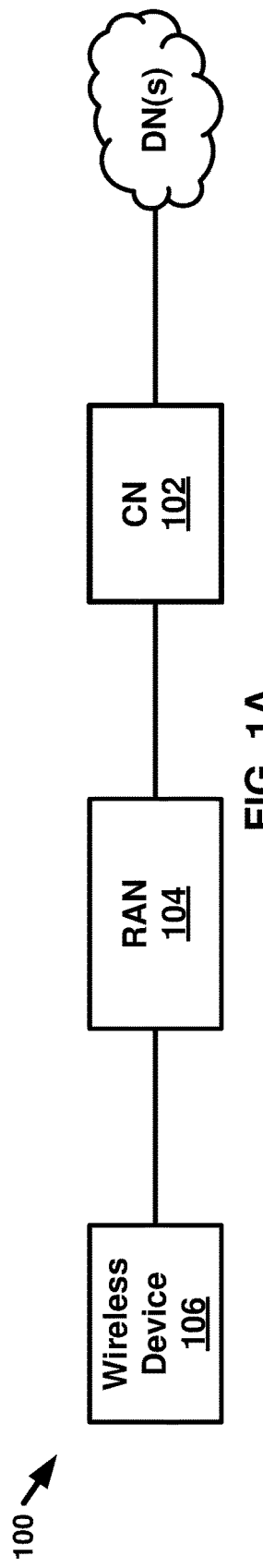
FIGS. 1A and 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
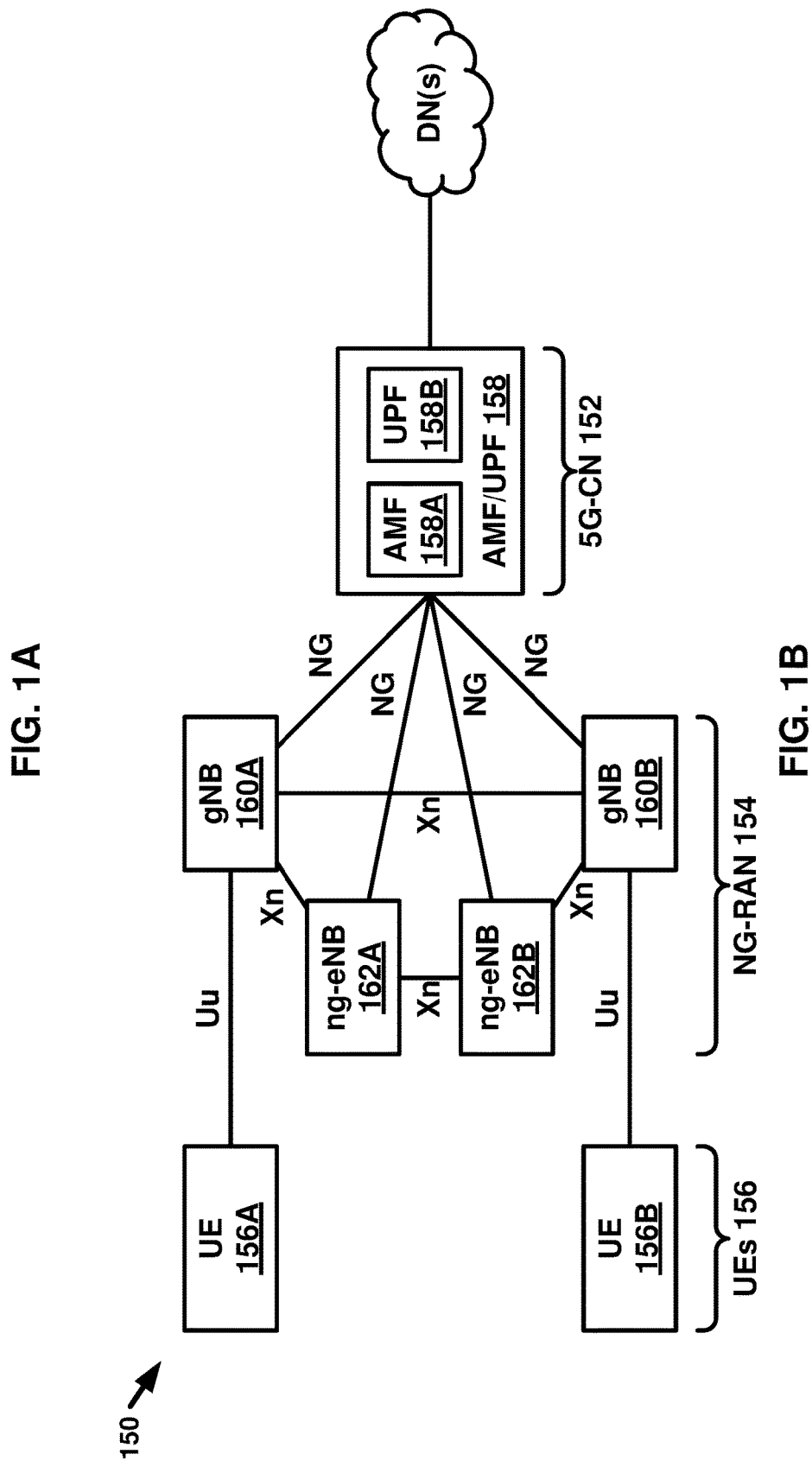

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
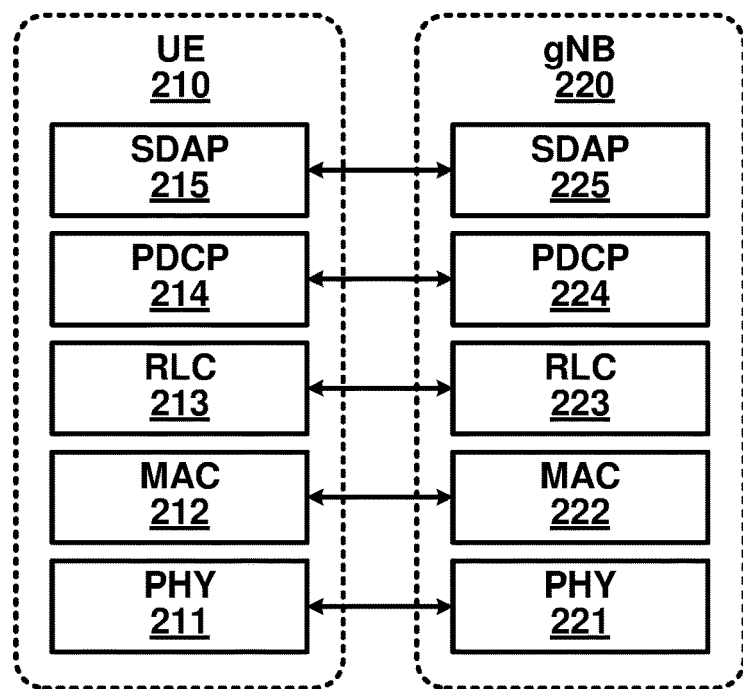
FIGS. 2A and 2B respectively illustrate a New Radio (NR) user plane and control plane protocol stack.
Figure 2B:
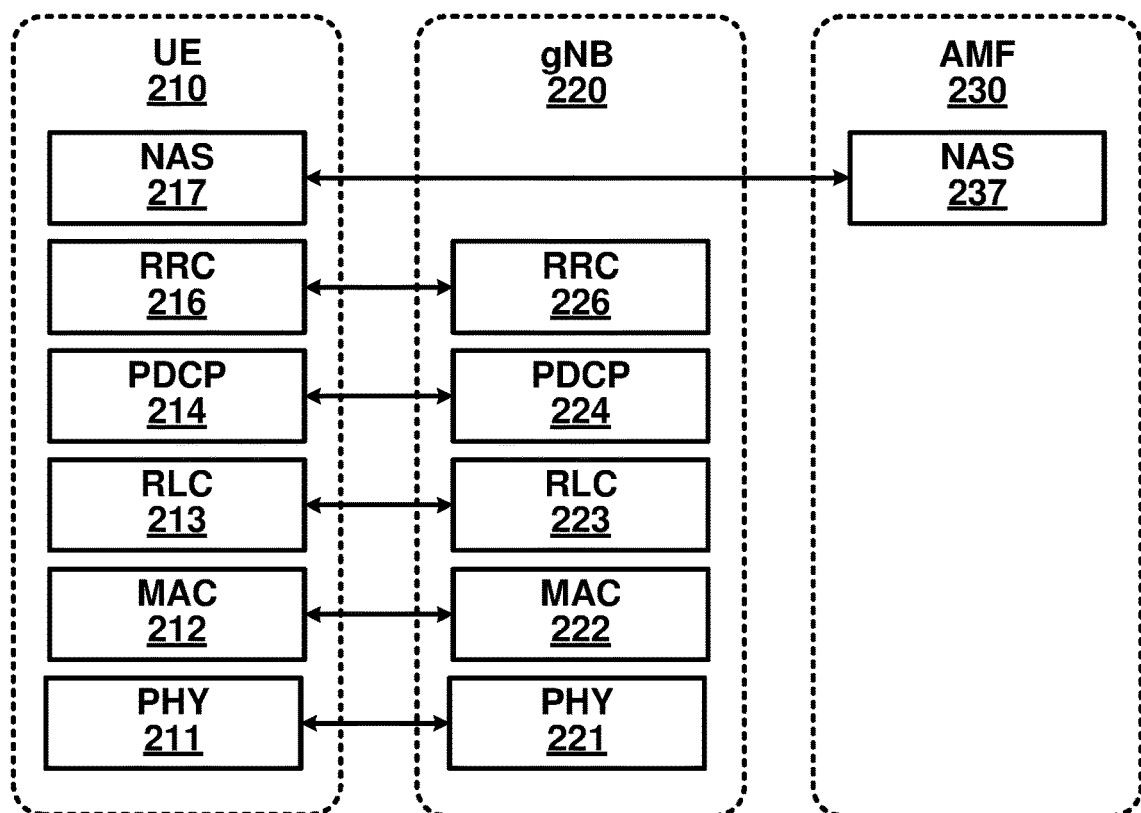

FIGS. 2A and 2B respectively illustrate examples of NR user plane and NR control plane protocol stacks for the Uu interface that lies between a UE 210 and a gNB 220. The protocol stacks illustrated in FIGS. 2A and 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
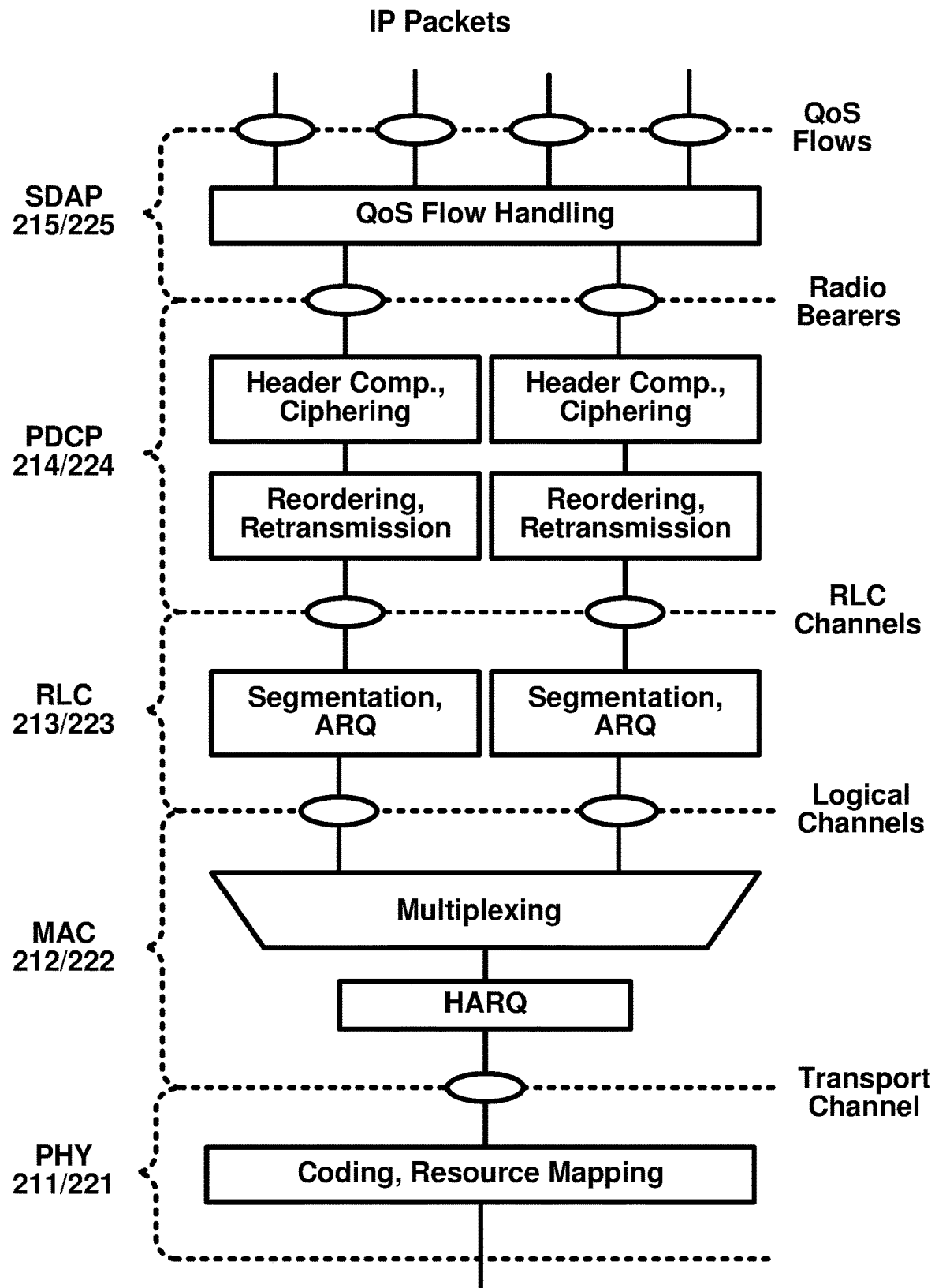
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIGS. 2A and 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources). The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m)

through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIGS. 5A and 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIGS. 5A and 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
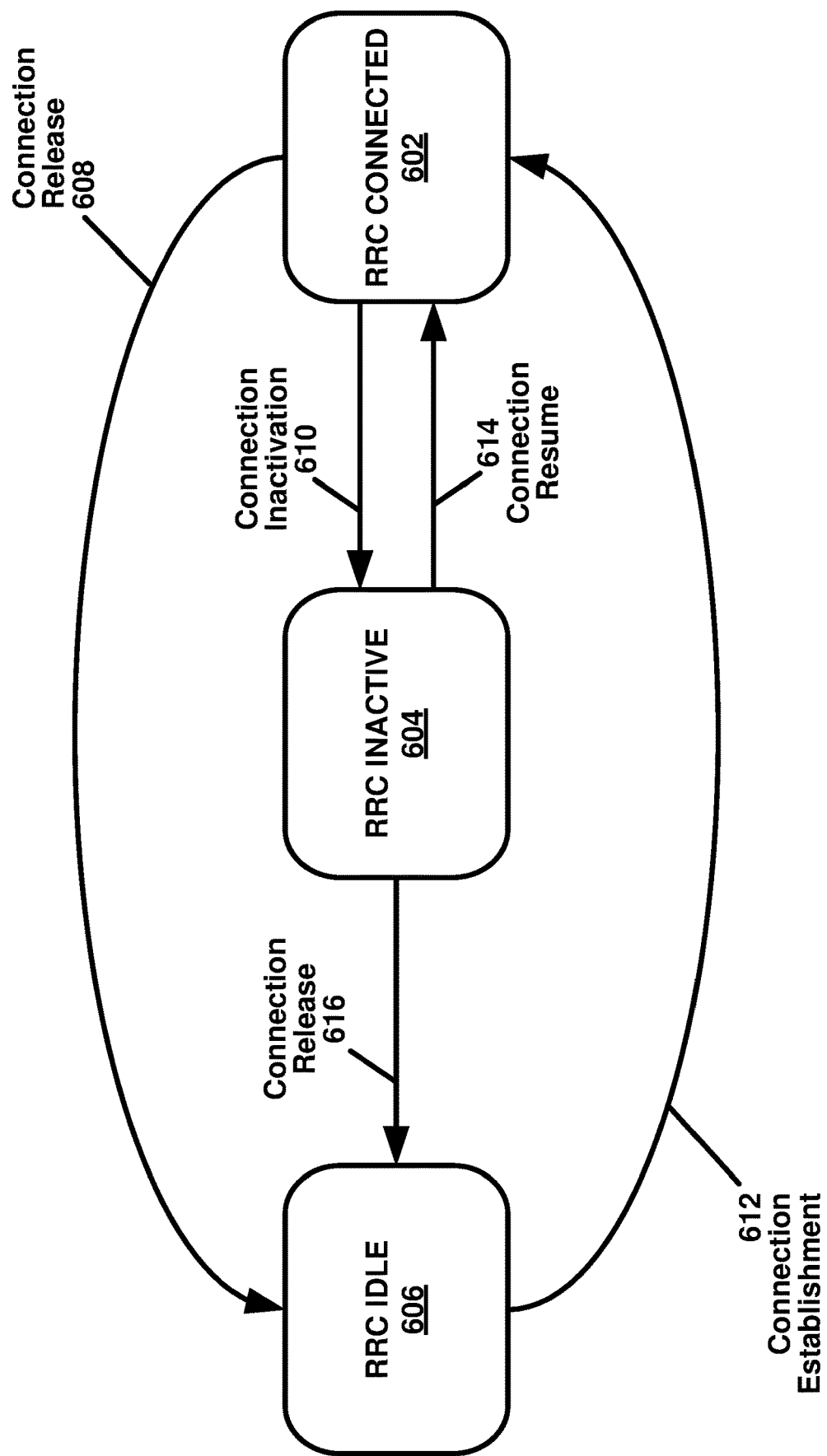
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIGS. 2A and 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIGS. 2A and 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
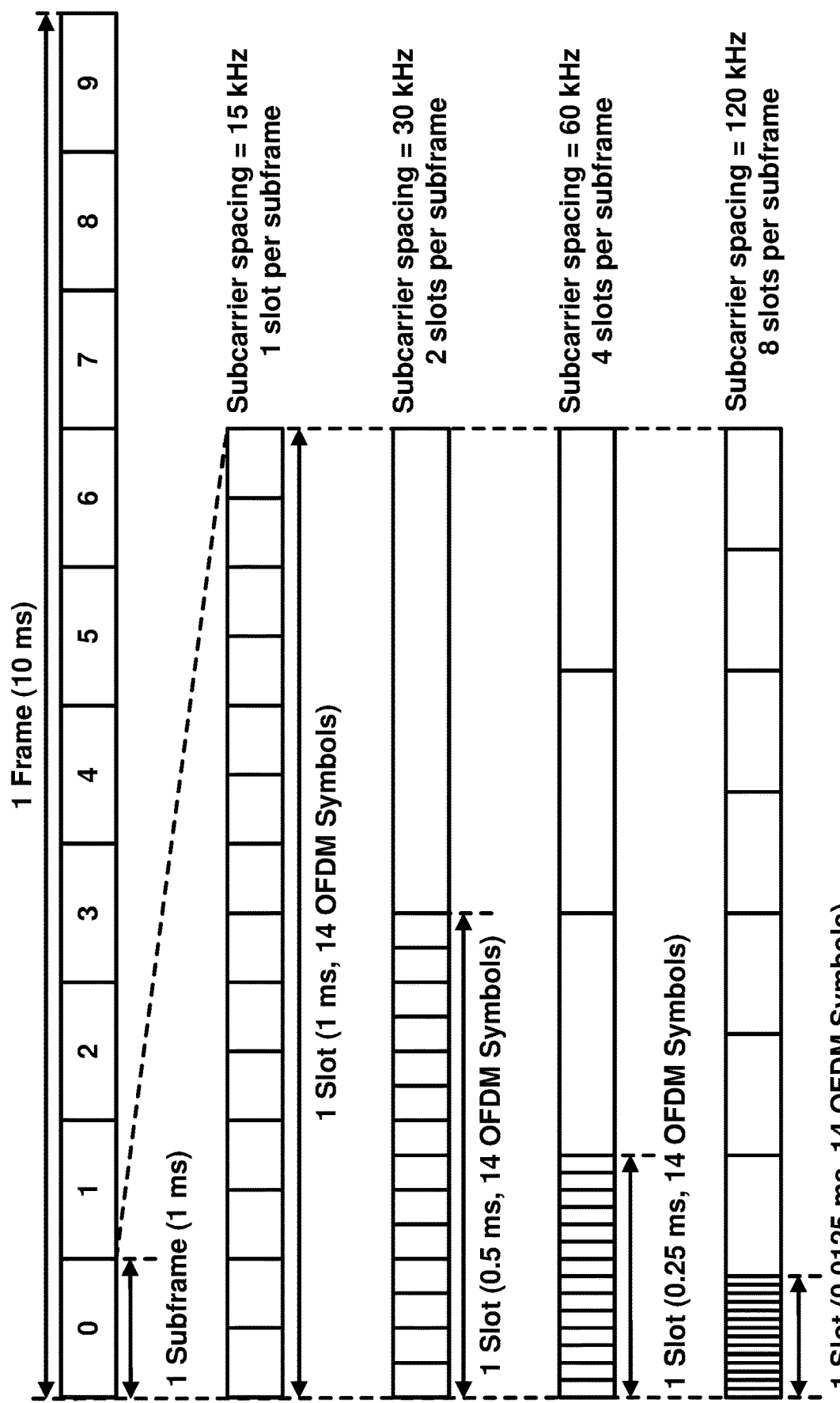
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
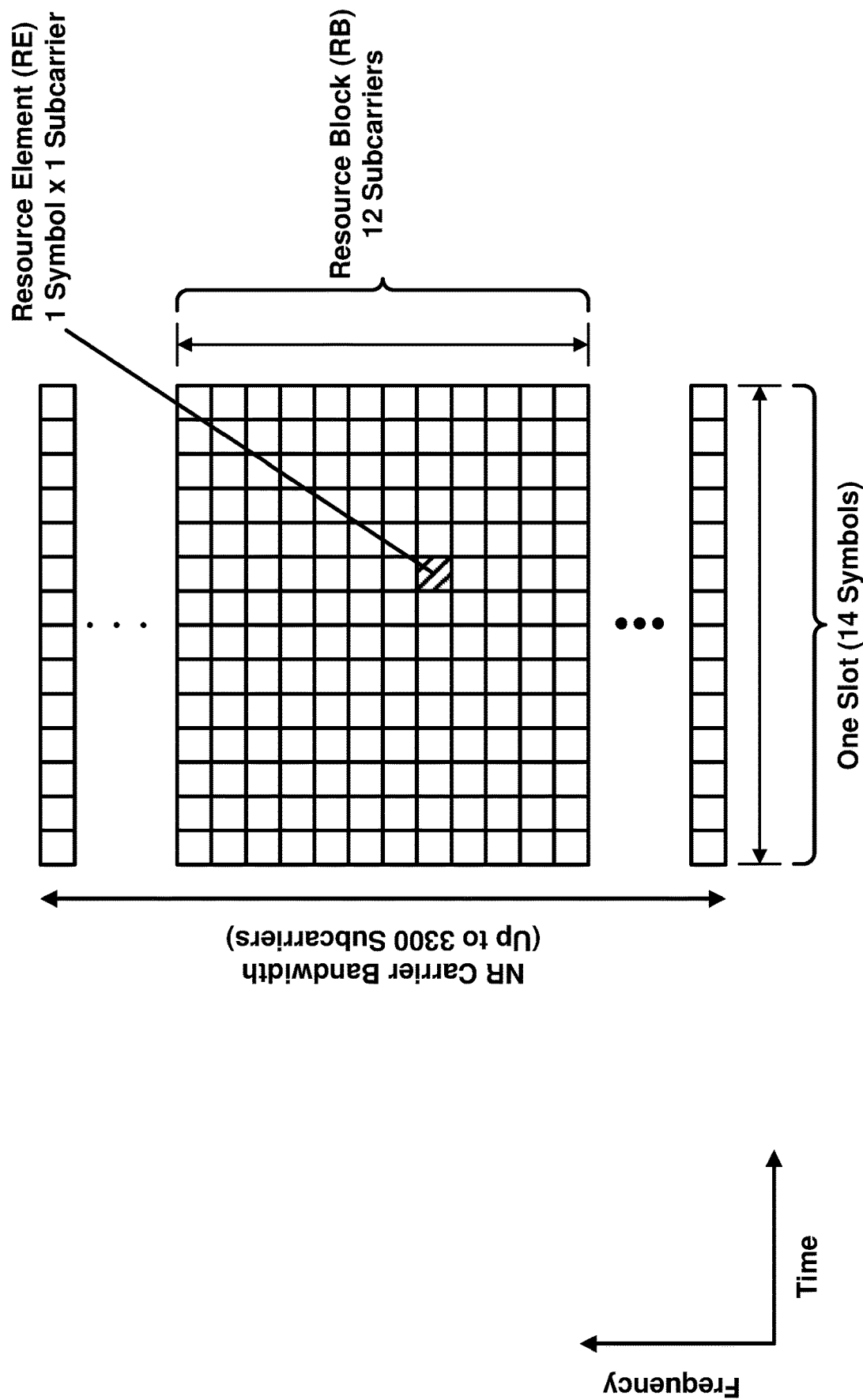
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
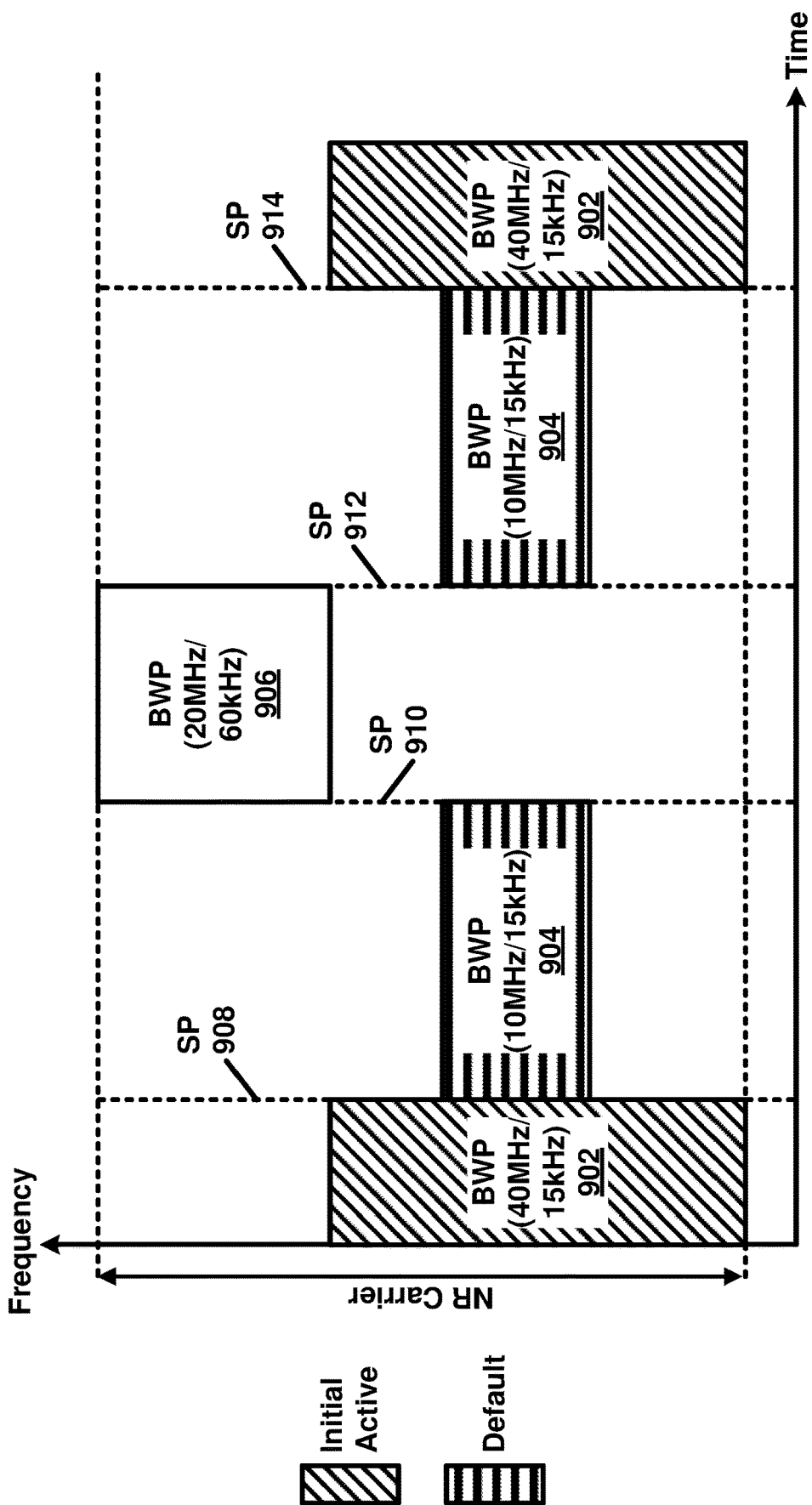
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

4.2 Carrier Aggregation

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
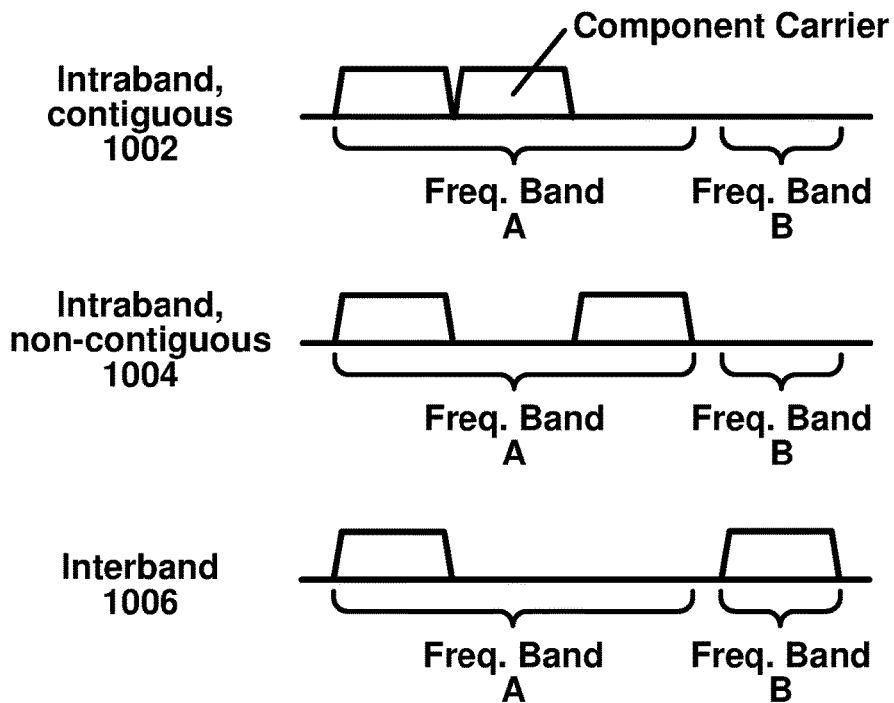
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
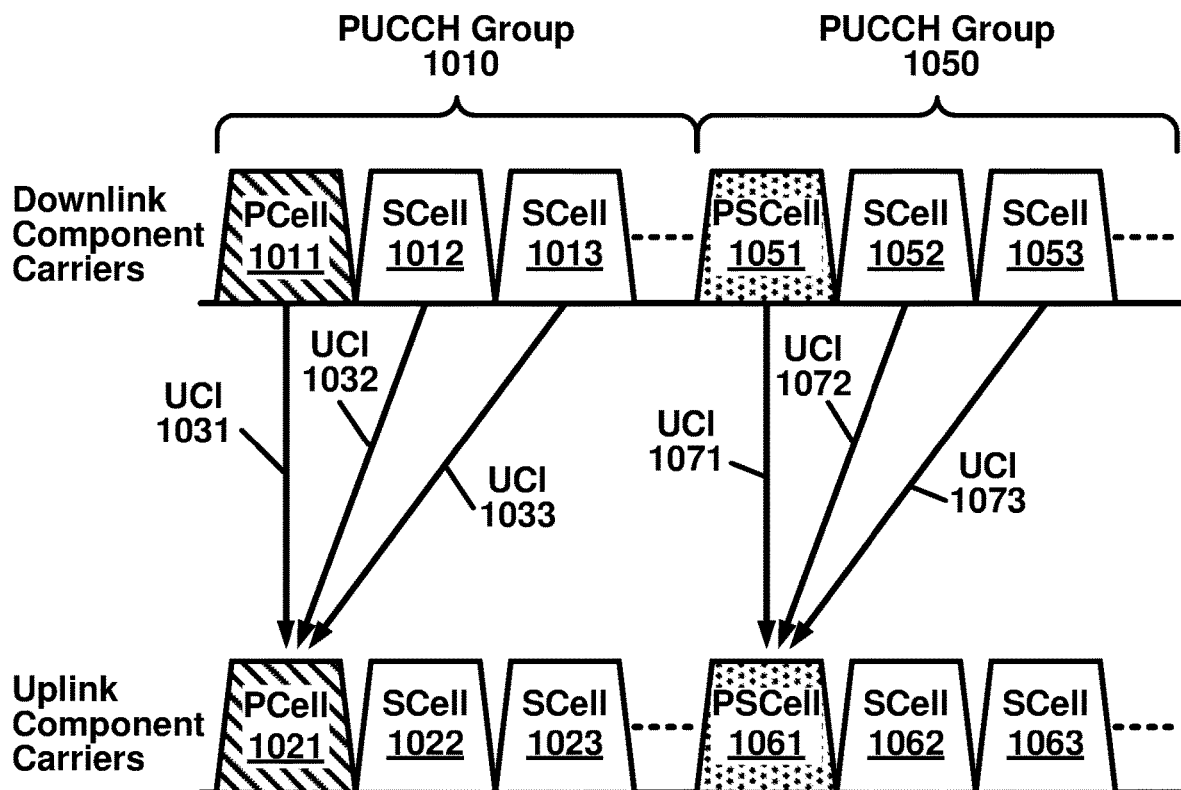
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell1011, an Scell1012, and an Scell1013. The PUCCH group 1050 includes three downlink CCs in the present example: a Pcell1051, an Scell1052, and an Scell1053. One or more uplink CCs may be configured as a Pcell1021, an Scell1022, and an Scell1023. One or more other uplink CCs may be configured as a primary Scell (PSCell) 1061, an Scell1062, and an Scell1063. Uplink control information (UCI) related to the downlink CCs of the PUCCH group 1010, shown as UCI 1031, UCI 1032, and UCI 1033, may be transmitted in the uplink of the Pcell1021. Uplink control information (UCI) related to the downlink CCs of the PUCCH group 1050, shown as UCI 1071, UCI 1072, and UCI 1073, may be transmitted in the uplink of the PScell1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell1021 and the PScell1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
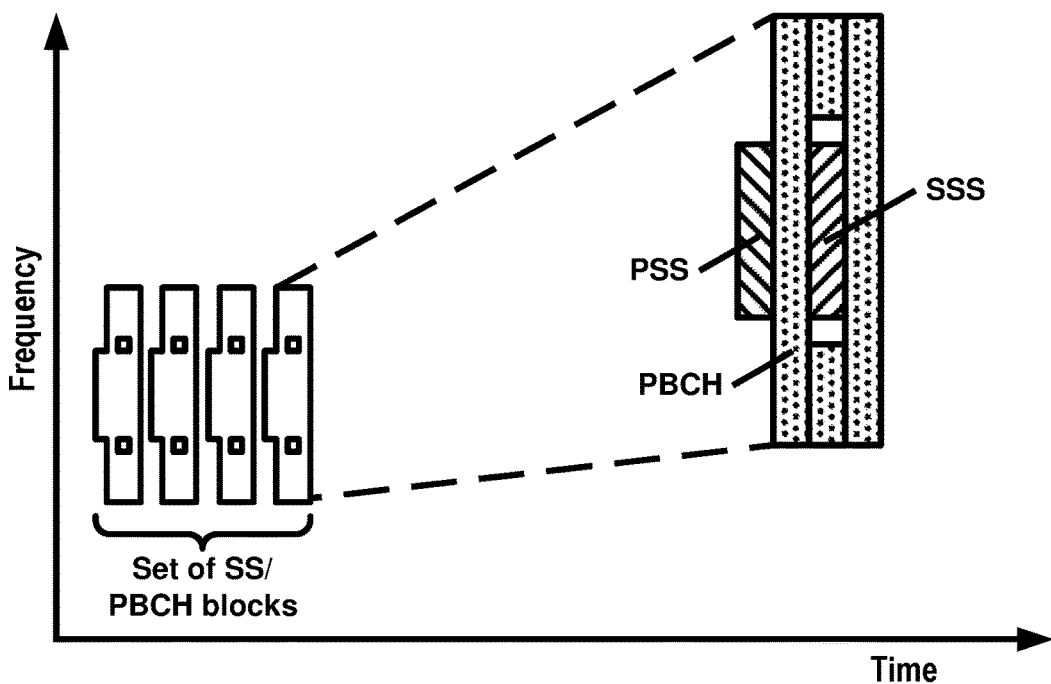
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
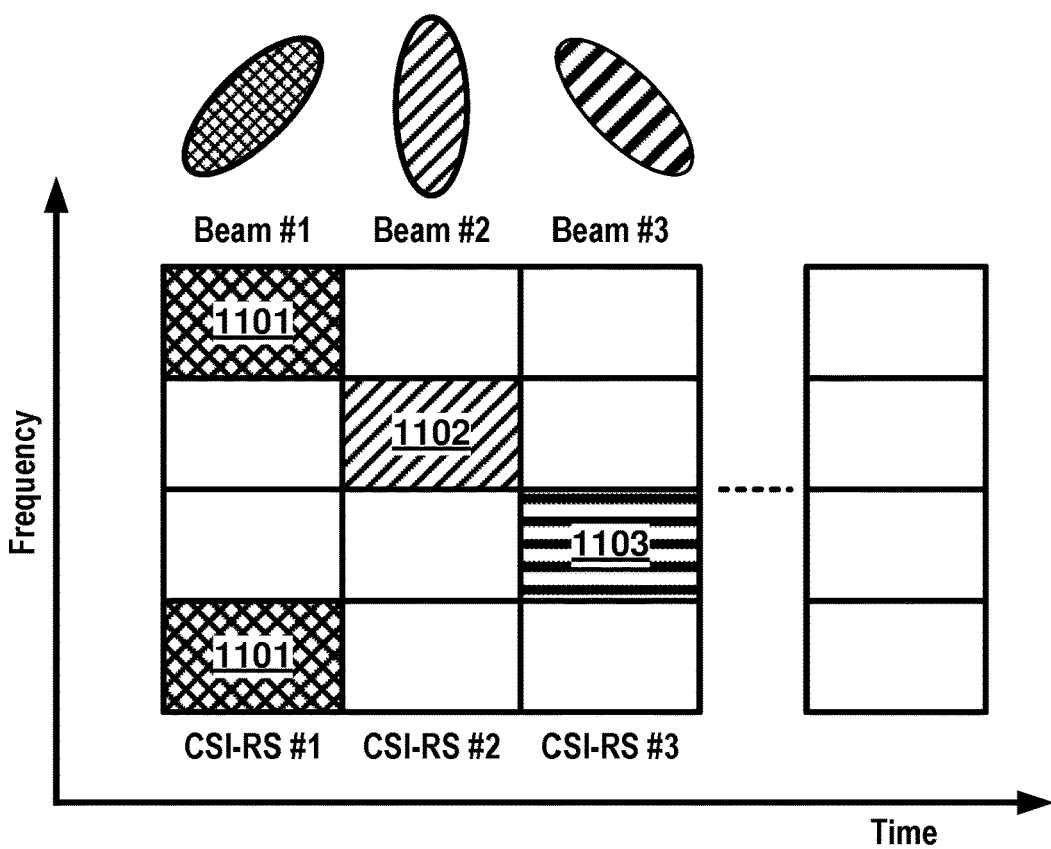
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RCC_INACTIVE state may initiate the random access procedure to request a connection setup to a network. The UE may initiate the random access procedure from an RCC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
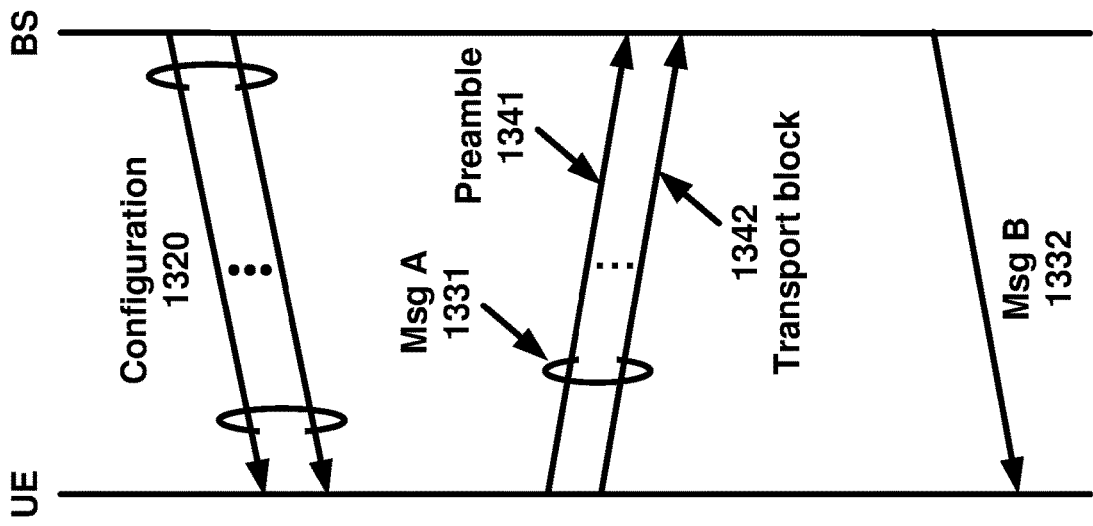
FIGS. 13A, 13B, and 13C respectively illustrate a four-step contention-based random access procedure, a two-step contention-free random access procedure, and another two-step random access procedure.
Figure 13B:
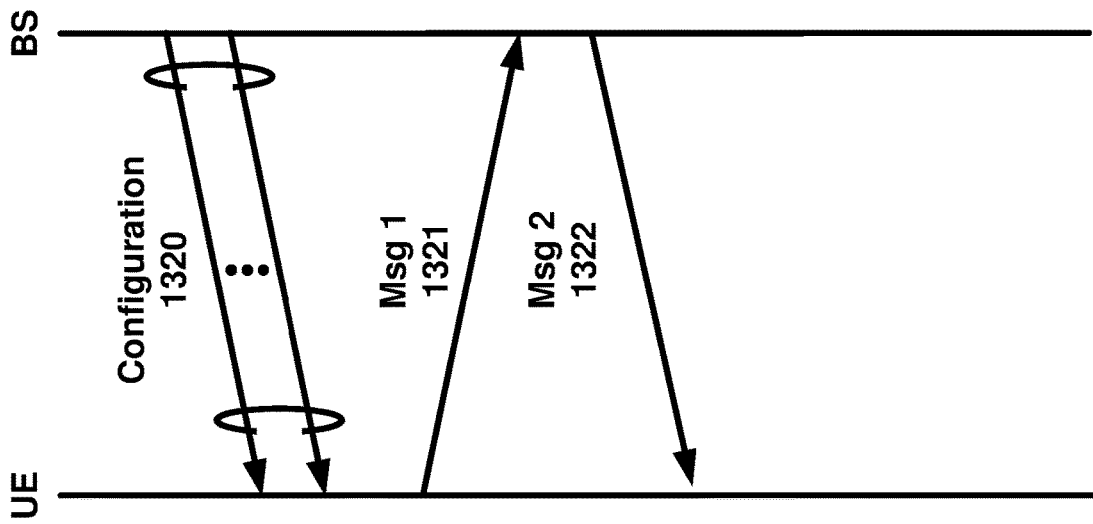
Figure 13A:
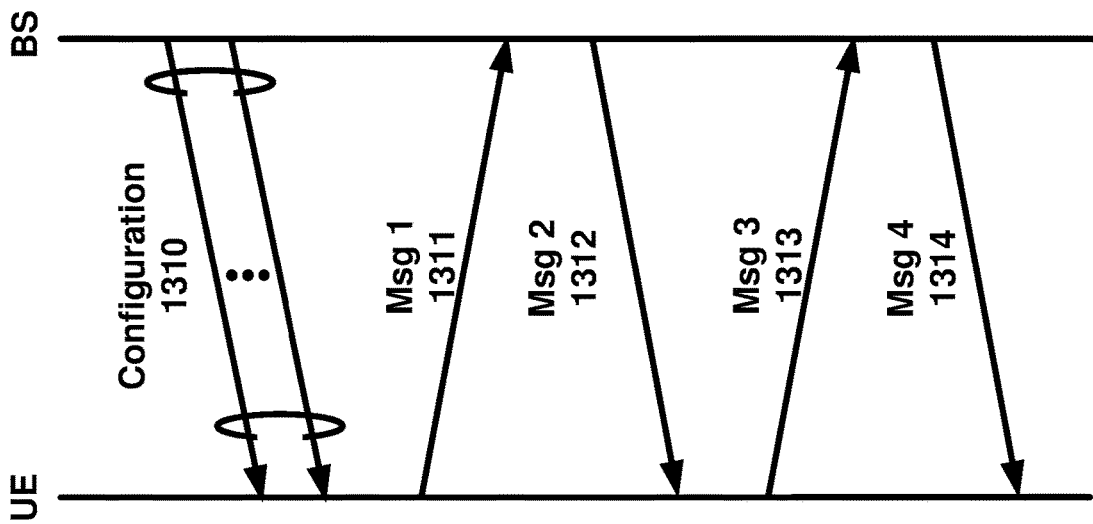

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RCC_CONNECTED state and/or in an RCC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×fid+14×80×8×ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgment for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
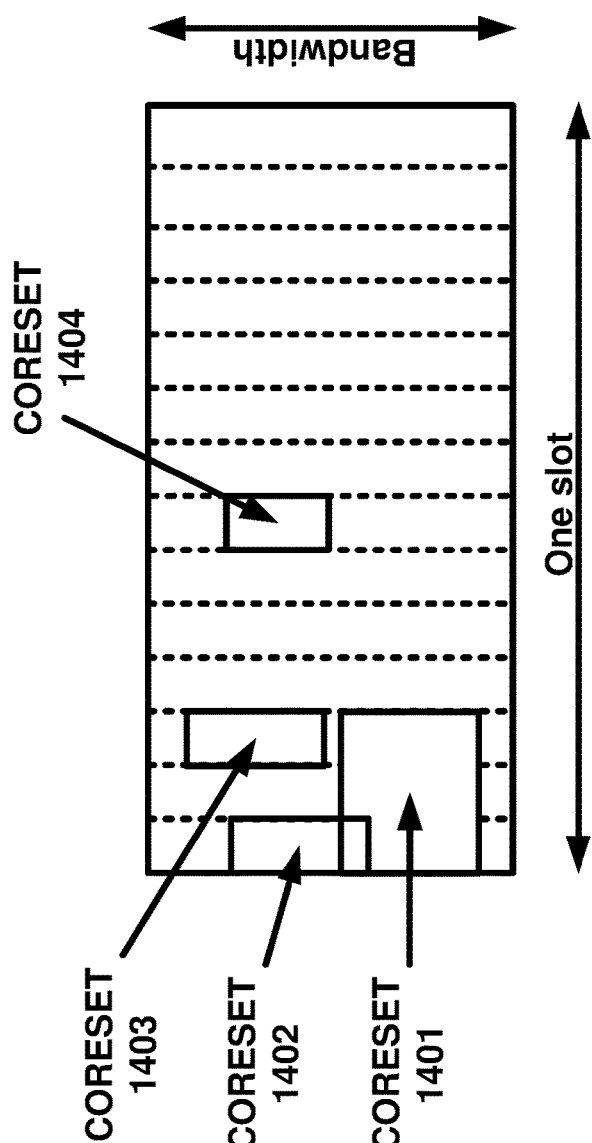
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
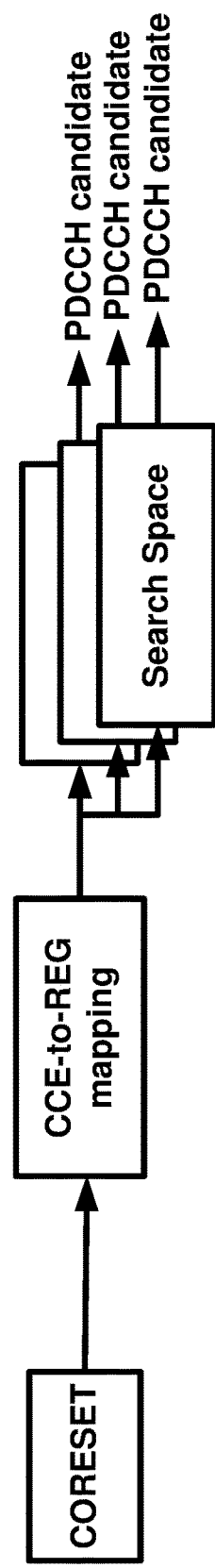
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
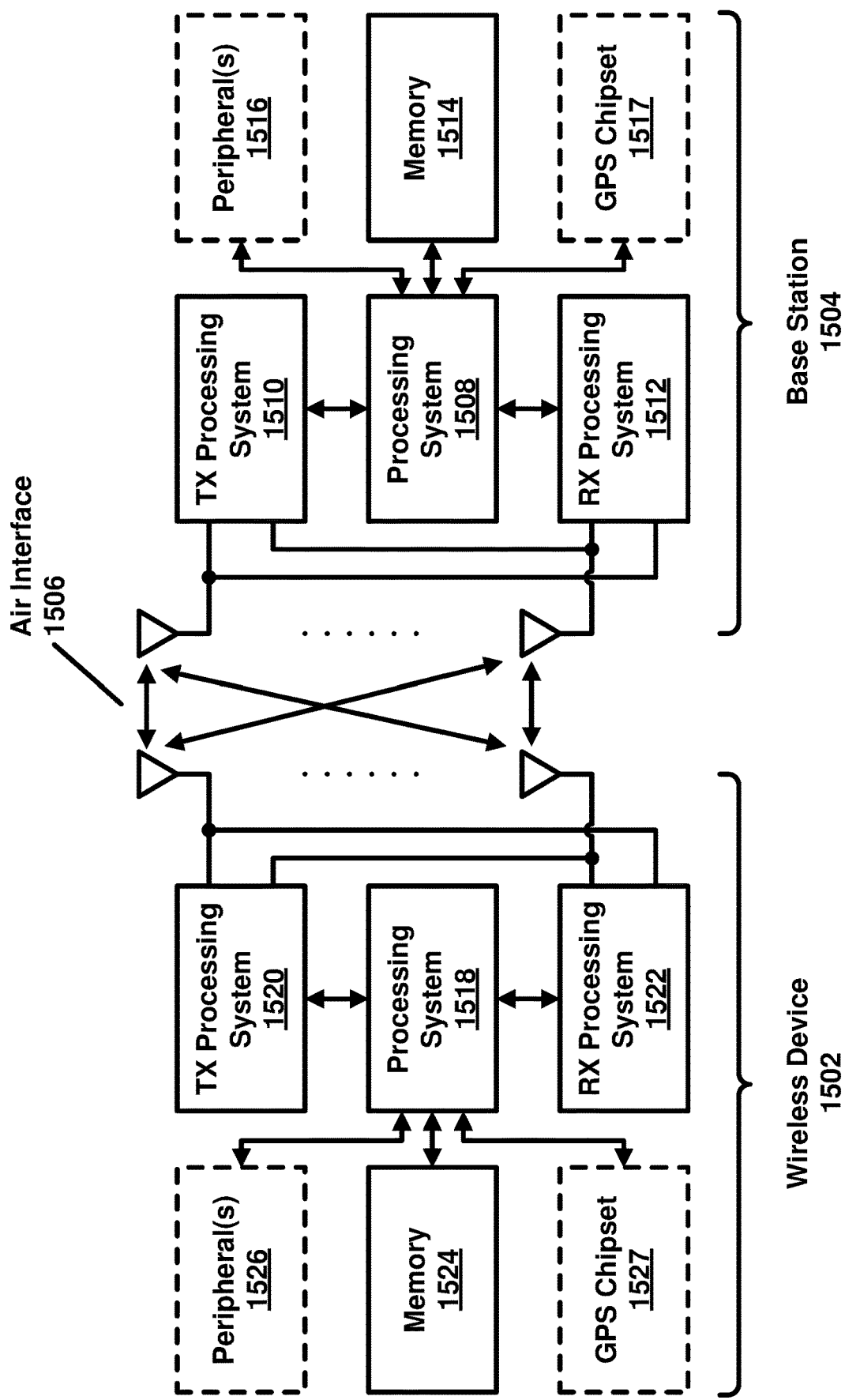
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g., two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

In an example, a base station and a wireless device may use a plurality of downlink control information (DCI) formats to communicate control information to schedule downlink data and/or uplink data or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

FIG. 17 illustrates example cases of various DCI formats. In an example, a DCI format 0_0 and a DCI format 1_0 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 1_2 may be referred as a compact DCI format for scheduling uplink and downlink respectively. A base station may configure one or more DCI formats for scheduling downlink and/or uplink resources. FIG. 17 illustrates that a DCI format 0_0, 0_1 and 0_2 may be used to schedule uplink resource(s) for one or more PUSCHs. A DCI format 1_0, 1_1 and 1_2 may be used to schedule downlink resource(s) for one or more PDSCHs. A DCI format 2_0, 2_1, 2_2, 2_3, 2_4, 2_5 and 2_6 may be used for a group-common DCI transmission. Each format of DCI format 2_x may be used for different information. For example, the DCI format 2_4 may be used to indicate uplink resources for a group of wireless devices. In response to receiving a DCI based on the DCI format 2_4, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIBs.

For example, the wireless device may determine one or more first DCI sizes of one or more first DCI fields of a DCI format 0_1 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_1. In FIG. 19, there are one or more second DCI fields that may present in the DCI format 0_1 regardless of the wireless device specific RRC message(s). For example, the DCI format 0_1 may comprise a 1-bit DL/UL indicator where the bit is configured with zero ('0') to indicate an uplink grant for the DCI format 0_1. DCI field(s) shown in dotted boxes may not be present or a size of the DCI field(s) may be configured as zero. For example, a carrier indicator may be present when the DCI format 0_1 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_1 schedules a resource for an uplink carrier or a supplemental uplink. The UL/SUL indicator field may be present when the wireless device is configured with a supplemental uplink for a scheduled cell of the DCI. Otherwise, the UL/SUL indicator field may not be present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18-19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW(BW+1)/2), wherein BW is the bandwidth of the active uplink BWP).

The wireless device may determine a resource allocation indicator value (RIV) table, where an entry of the table may comprise a starting PRB index and a length value. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW(BW+1)/2)–K bits to indicate the uplink resource(s) based on the resource allocation type 1, when frequency hopping is enabled.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. A new data indicator (NDI) field may indicate whether the DCI schedules the uplink resource(s) for a new/initial transmission or a retransmission. A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists.

A DCI field of hybrid automatic repeat request (HARQ) process number (HARQ process #in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The DCI format 0_1 may have a first downlink assignment index ($1^{st}$ DAI) and/or a second DAI ($2^{nd}$ DAI). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of code block group (CBG) transmission information (CBGTI) may indicate HARQ-ACK feedback(s) for one or more CBGs. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs. A field of SCell dormancy indication (Scell dormancy) may indicate transitioning between a dormant state and a normal state of one or more secondary cells.

Figure 18:
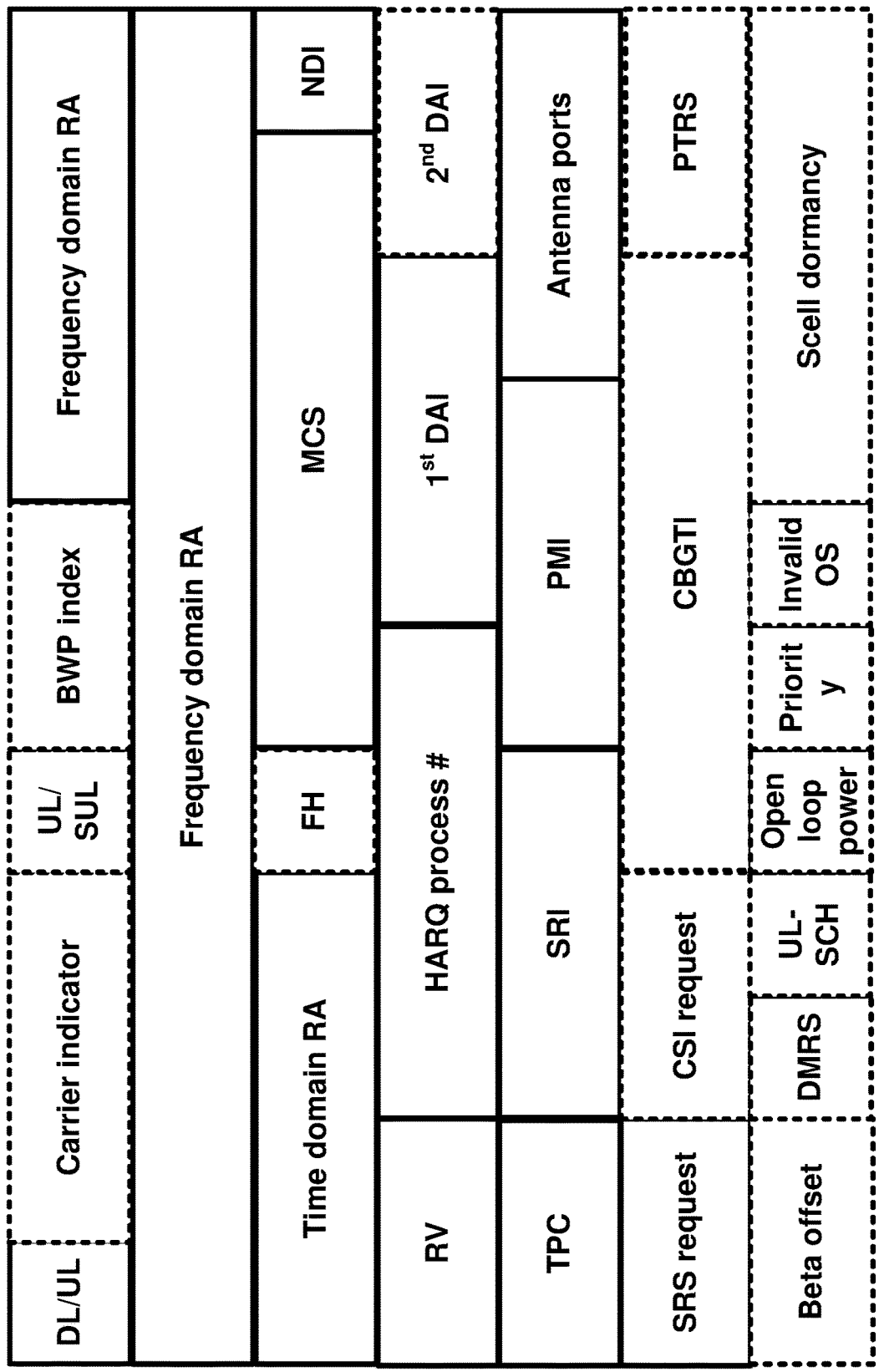
FIG. 18 illustrates an example DCI format for scheduling uplink resource of a single cell.
Figure 19:
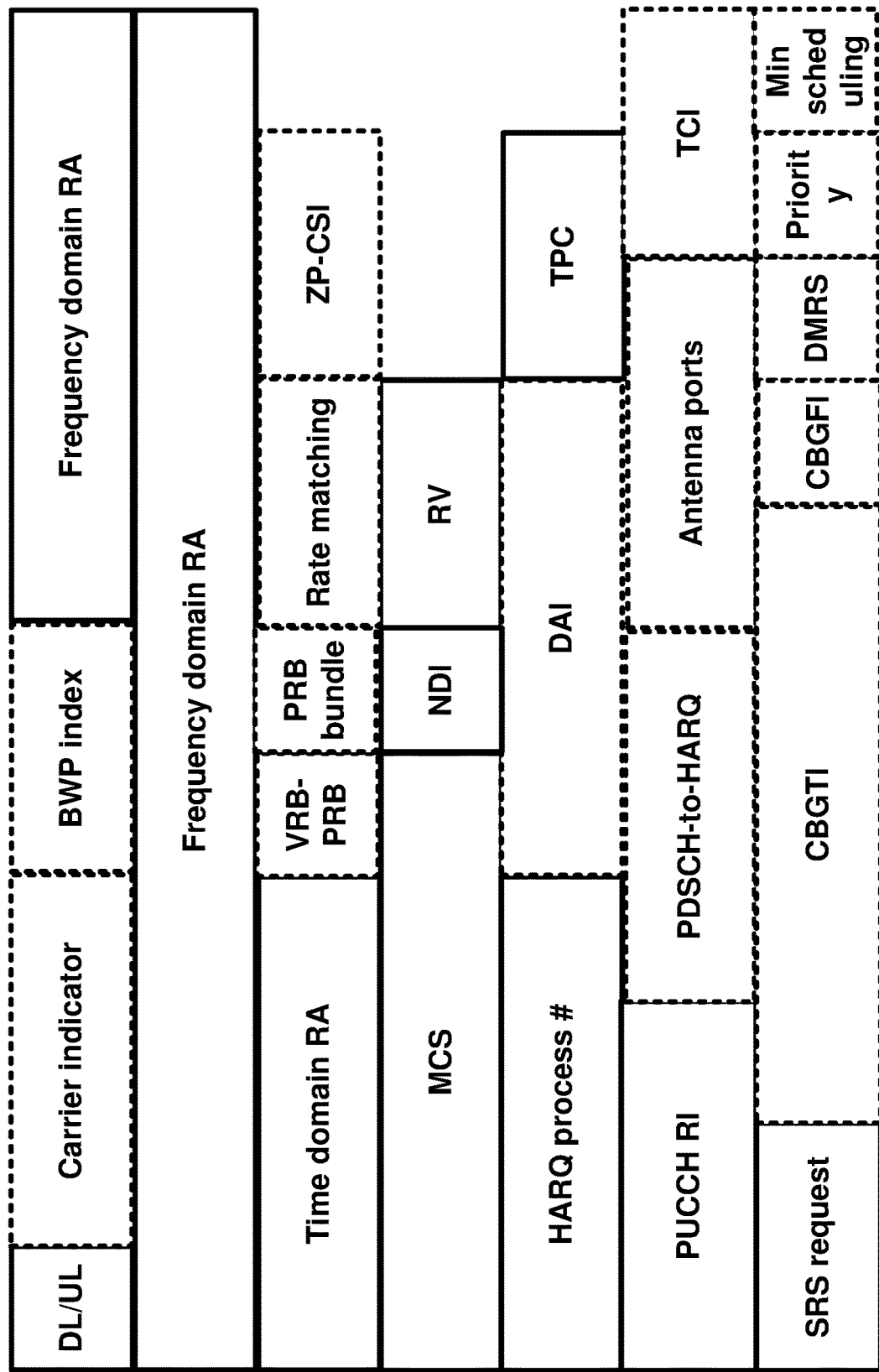
FIG. 19 illustrates an example DCI format for scheduling downlink resource of a single cell.

Note that additional DCI field(s), though not shown in FIG. 18, may present for the DCI format 0_1. For example, a downlink feedback information (DFI) field indicating for one or more configured grant resources may present for an unlicensed/shared spectrum cell. For example, the unlicensed/shared spectrum cell is a scheduled cell. When the DCI format 0_1 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

FIG. 18 shows an example of a DCI format 1_1. For example, the DCI format 1_1 may schedule a downlink resource for a scheduled downlink cell. The DCI format 1_1 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 18), an antenna ports, a transmission configuration indication (TCI), a SRS request, a CBG transmission information (CBGTI), a CBG flushing out information (CBGFI), DMRS sequence initialization (DMRS), a priority indicator (priority), and a minimum applicable scheduling offset indicator.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_1 may also include MCS, NDI and RV for a second transport block, in response to a max number of codewords scheduled by DCI may be configured as two. The DCI format 1_1 may not include MCS, NDI and RV field for the second transport block, in response to the max number of codewords scheduled by DCI may be configured as one. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states. For example, the CBGTI may indicate whether to flush a soft buffer corresponding to a HARQ process indicated by the HARQ process #. For example, the Min scheduling field may indicate enable or disable applying a configured minimum scheduling offset (e.g., when a minimum scheduling offset is configured) or select a first minimum scheduling offset or a second minimum scheduling offset (e.g., when the first minimum scheduling offset and the second minimum scheduling offset are configured).

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW/K1(BW/K1+1)/2) and the resource allocation type1 granularity. E.g., the BW is the bandwidth of the active uplink BWP. E.g., the K1 is the resource allocation type1 granularity).

The wireless device may determine a resource allocation indicator value (RIV) table, where an entry of the table may comprise a starting PRB index and a length value. The wireless device may determine the RIV table based on the resource allocation type 1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1 (BW/K1+1)/2)−K bits to indicate the uplink resource(s) based on the resource allocation type 1, when frequency hopping is enabled. Otherwise, the base station/wireless device may use ceil(log 2(BW/K1 (BW/K1+1)/2) bits to indicate the uplink resource(s) based on the resource allocation type 1.

In an example, a base station may transmit one or more messages comprising configuration parameters of a BWP of a cell. The configuration parameters may comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process #in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may comprise a bit size for the HARQ process #field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index ($1^{st}$ DAI) and/or a second DAI ($2^{nd}$ DAI). The configuration parameters may comprise a parameter to indicate whether to use DAI for the DCI format 0_2 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), though not shown in FIG. 18, may present for the DCI format 0_1/0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

FIG. 19 shows an example of a DCI format 1_1 and/or 1_2. For example, the DCI format 1_1 or 1_2 may schedule a downlink resource for a scheduled downlink cell. The DCI format 1_1 or 1_2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 19), an antenna ports, a transmission configuration indication (TCI), a SRS request, DMRS sequence initialization (DMRS), and a priority indicator (priority).

The base station may transmit one or more messages indicating configuration parameters for the DCI format 1_2. The configuration parameters may comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_2 may also include MCS, NDI and RV for a second transport block, in response to a max number of codewords scheduled by DCI may be configured as two. The DCI format 1_2 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state.

In an example, during a DRX mode, the UE may power down most of its circuitry when there are no packets to be received. The UE may monitor PDCCH discontinuously in the DRX mode. The UE may monitor the PDCCH continuously when a DRX operation is not configured. During this time the UE listens to the downlink (DL) (or monitors PDCCHs) which is called DRX Active state. In a DRX mode, a time during which UE does not listen/monitor PDCCH is called DRX Sleep state.

In an example, a frequency range of 52.6 to 71 GHz (e.g., a frequency region 3, a frequency range 3, a third frequency range, a third frequency region) may support additional numerologies. For example, the additional numerologies may comprise a 120 kHz subcarrier spacing with a normal CP. For example, the additional numerologies may comprise a 240 kHz subcarrier spacing with the normal CP. For example, the additional numerologies may comprise a 480 kHz subcarrier spacing with the normal CP and/or an extended CP. For example, the additional numerologies may comprise a 960 kHz subcarrier spacing with the normal CP and/or the extended CP.

Figure 20:
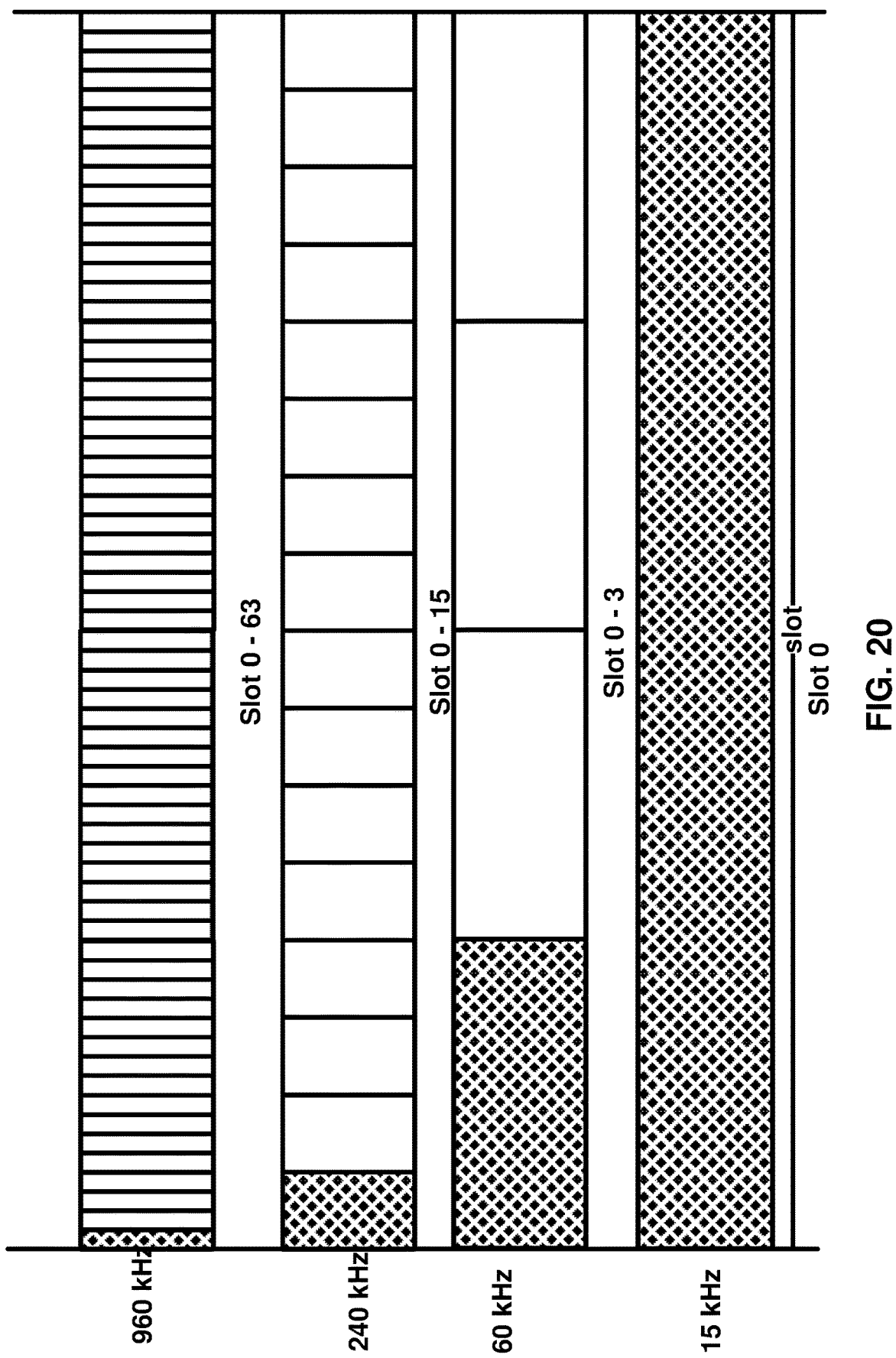
FIG. 20 illustrates an example of different numerologies as per an aspect of an embodiment of the present disclosure.

FIG. 20 illustrates an example of different numerologies that the wireless device may support for one or more cells in different frequency ranges. For example, 15 kHz subcarrier spacing with the normal CP and/or the extended CP may be supported in a frequency region 1 (e.g., FR1). For example, 60 kHz (and/or 120 kHz) subcarrier spacing with the normal CP and/or the extended CP may be supported in a frequency region 2 (e.g., FR2). For example, 240 kHz and/or 480 kHz and/or 960 kHz subcarrier spacings with the normal CP and/or the extended Cp may be supported in a frequency region 3 (e.g., FR3).

A length of a slot with the 15 kHz subcarrier spacing may be 1 msec. A length of a slot with a subcarrier spacing that is 15 kHz*2^u may be ½^u msec. For example, a length of the slot with a subcarrier spacing 120 kHz is ⅛=0.125 msec. A length of a slot with a subcarrier spacing 240 kHz is 1/16=62.5 us. A length of a slot with a subcarrier spacing 960 kHz is 1/64=16 us.

In a millisecond, one slot may be present with a subcarrier spacing of 15 kHz, 4 slots with 60 kHz subcarrier spacing, 16 slots with 240 kHz subcarrier spacing and 64 slots with 960 kHz subcarrier spacing.

Figure 21:
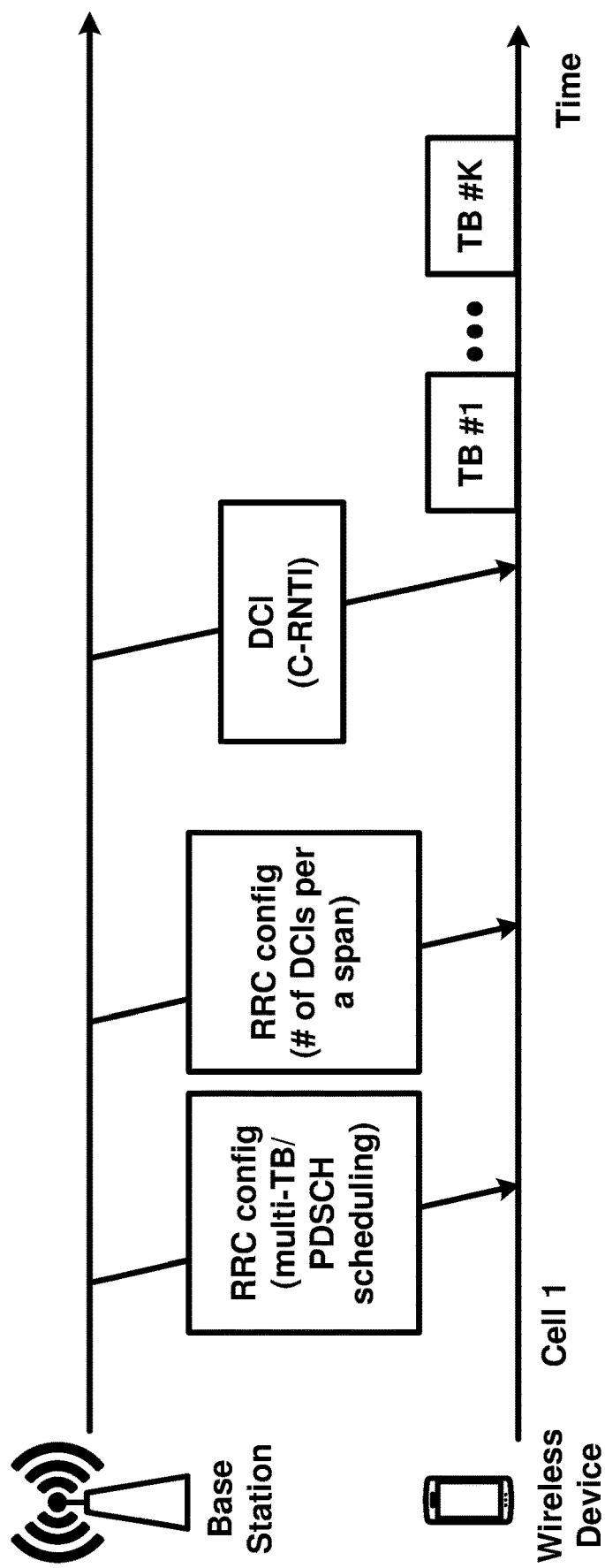
FIG. 21 illustrates an example of embodiments of a multi-PDSCH scheduling as per an aspect of an embodiment of the present disclosure.

FIG. 21 illustrates an example of embodiments of a multi-PDSCH scheduling as per an aspect of an embodiment of the present disclosure. When a wireless device is configured with a multi-PDSCH scheduling for a serving cell, the wireless device may receive a DCI that indicates resource assignment(s) and/or CSI/SRS requests for one or more PDSCHs via the serving cell. Each PDSCH of the one or more PDSCHs may comprise one or more transport blocks. A first PDSCH of the one or more PDSCHs may comprise a first transport block. A second PDSCH of the one or more PDSCHs may comprise a second transport block. The first transport block may be different from the second transport block. The DCI may comprise one or more NDI bits or one or more NDI fields. Each NDI bit of the one or more NDI bits or each NDI field of the one or more NDI fields may correspond to each of the one or more PDSCHs. The DCI may comprise one or more RV bits or one or more RV fields. Each RV bit of the one or more RV bits or each RV field of the one or more RV fields may correspond to the each of the one or more PDSCHs.

In an example, a multi-PDSCH scheduling may be configured for a cell based on a cross-carrier scheduling and/or a self-carrier scheduling. For example, when the cross-carrier scheduling is used, a second cell (e.g., cell 2) is a scheduled cell by a first cell (e.g., cell 1). For example, when the self-carrier scheduling is used, a scheduling cell may be same to a scheduled cell. The first cell may operate with a first numerology (e.g., 15 kHz with a normal CP). The second cell may operate with a second numerology (e.g., 960 kHz with an extended CP or 480 kHz with an extended CP). During 1 msec, the first cell may have 1 slot. During 1 msec, the second cell may have a plurality of slots (e.g., 32 slots with 480 kHz, 64 slots with 960 kHz).

The base station may transmit one or more RRC messages indicating configuration parameters. The configuration parameters may comprise/indicate a multi-PDSCH scheduling for the second cell. The configuration parameters may comprise/indicate a number of PDSCHs schedulable by a single DCI. For example, a maximum number of PDSCHs by a single DCI may be indicated by the configuration parameters. A DCI, of a multi-PDSCH scheduling, may comprise resource assignment(s) for one or more PDSCHs, where a number of the one or more PDSCHs or one or more slots scheduled with the one or more PDSCHs is less than or equal to the maximum number of PDSCHs. For example, the configuration parameters may comprise/indicate a number of DCIs that may be transmitted/scheduled via a span or a PDCCH monitoring occasion or a slot of the scheduling cell. The base station may transmit one or more second RRC messages indicating second configuration parameters. The second configuration parameters may comprise/indicate a cross-carrier scheduling for the second cell. For example, the first cell is indicated as a scheduling cell. The first cell may schedule the second cell.

The DCI may be CRC-scrambled with a first RNTI (e.g., C-RNTI, CS-RNTI). The DCI may schedule a first TB (TB #1) via a first PDSCH, a second TB (TB #2) via a second PDSCH, and so on. For example, FIG. 21 illustrates that up to K TBs via K PDSCHs are scheduled by the DCI. FIG. 21 illustrates that the DCI schedules the TB #1 to TB #K. For example, one or more slots of the one or more PDSCHs may be contiguous. For example, the one or more slots may be non-contiguous. The DCI may comprise a time domain resource allocation field that indicates time domain resources indicating the one or more slots. The time domain resource allocation field may indicate a starting symbol and a duration in each slot of the one or more slots. A first slot of the one or more slots may have a first starting symbol and a first duration. A second slot of the one or more slots may have a second starting symbol and a second duration. The first starting symbol may be different from the second starting symbol. The first duration may be different from the second duration.

The configuration parameters may indicate to enable or disable the multi-PDSCH scheduling. The second cell may operate with a plurality of TRPs/coreset pools. The one or more TBs or the one or more PDSCHs may be scheduled via the plurality of TRPs/coreset pools.

For example, a first PDSCH of the one or more PDSCHs may be associated with a first transmission and reception point (TRP) or a first coreset pool/group or a first group or a first TCI group. The second PDSCH of the one or more PDSCHs may be associated with a second TRP or a second coreset pool/group or a second group or a second TCI group. When the second cell is operating with a single TRP, the first TRP may e same as the second TRP. The first TRP or the first coreset pool is assumed to be present as a default for the single TRP operation.

A multi-PDSCH or a multi-TB DCI (DCI-M) may represent a DCI based on a multi-PDSCH scheduling or a multi-TB scheduling. For example, the one or more configuration parameters may comprise one or more control resource set (coreset)s and/or one or more search spaces. The DCI of the multi-PDSCH scheduling may be transmitted via the one or more coresets and/or the one or more search spaces. The one or more configuration parameters may comprise/indicate one or more RNTIs that may be used for the DCI of the multi-PDSCH scheduling. The one or more RNTIs may not comprise a C-RNTI. The one or more RNTIs may comprise the C-RNTI.

The base station may transmit one or more MAC CEs/one or more DCIs to activate the multi-PDSCH scheduling. For example, the one or more MAC CEs may comprise a MAC CE activating and/or deactivating one or more secondary cells. The base station may transmit one or more DCIs. The one or more DCIs may indicate a BWP switching from a first BWP to a second BWP of a cell. The first BWP is an active BWP of the cell. The first BWP may not comprise one or more coresets of the multi-PDSCH scheduling. The second BWP may comprise one or more second coresets of the multi-PDSCH scheduling. For example, the one or more MAC CEs may comprise indication(s) of activating and/or deactivating a multi-PDSCH scheduling. For example, the one or more DCIs may comprise an indication to activate or deactivate the multi-PDSCH scheduling of the second cell. For example, the configuration parameters may comprise/indicate a plurality of BWPs. A first BWP of the plurality of BWPs may comprise/indicate a first DCI format that is used for a multi-PDSCH scheduling. A second BWP of the plurality of BWPs may comprise/indicate a second DCI format that is used for a single-PDSCH scheduling. The wireless device may determine the multi-PDSCH scheduling is activated in response to the first BWP being an active BWP of the second cell. The wireless device may determine the multi-PDSCH scheduling is deactivated in response to the second BWP being an active BWP of the second cell.

Similar mechanisms may be applied for a PUSCH scheduling. Similarly, a multi-PUSCH scheduling may be used for scheduling one or more PUSCHs via a single DCI. For a cell, the multi-PDSCH scheduling and the multi-PUSCH scheduling may be configured/activated/deactivated simultaneously or may be independently configured/activated/deactivated. For example, when a first DCI format used for scheduling PDSCH(s) for a cell may be size-aligned with a second DCI format used for scheduling PUSCH(s) for the cell. When the first DCI format and the second DCI format are size-aligned, the multi-PDSCH and the multi-PUSCH scheduling may be both activated or both deactivated.

The wireless device may activate the multi-PDSCH (and/or multi-PUSCH) scheduling in response to receiving the one or more RRC messages. The one or more MAC CEs/the one or more DCIs may be optional. The base station may reconfigure to deactivate or activate the multi-PDSCH (or the multi-PUSCH) scheduling of a cell via RRC signaling. In response to activating the multi-PDSCH (or the multi-PUSCH) scheduling, the base station may transmit a DCI, based on the multi-PDSCH (or the multi-PUSCH) scheduling, comprising resource assignments for the first downlink/uplink carrier/cell (e.g., cell 2). The DCI may indicate a plurality of downlink/uplink resources for a repetition of a TB via one or more slots (e.g., TB #1, . . . TB #K are same).

In an example, a DCI, of a multi-PDSCH and/or a multi-PUSCH scheduling, may comprise a MCS field or one or more MCS fields. A value of the MCS field or one or more values of the one or more MCS fields may be applied to each of the one or more PDSCHs. The one or more values of the one or more MCS fields may be applied for one or more TBs scheduled via each PDSCH of the one or more PDSCHs. For example, the DCI may comprise a first MCS field indicating a value of MCS values (e.g., 32 values). The DCI may additionally comprise one or more second MCS fields where each of the one or more second MCS fields indicates a gap/offset compared to the first MCS field. For example, the each of the one or more second MCS fields may have k1 bits (e.g., k1=2) that is smaller than k2 bits of the first MCS field (e.g., k2=5).

In an example, the DCI may comprise one or more MCS fields where each of the one or more MCS fields may correspond to each of the one or more PDSCHs.

In an example, the DCI may comprise a first RV field indicating an index of a redundancy version for a first PDSCH. When two TBs may be scheduled for the first PDSCH, the first RV field may comprise two RV values where each corresponds to a first TB and a second TB of the two TBs.

The wireless device may determine one or more second RV values for one or more second PDSCHs of the one or more PDSCHs. The one or more second PDSCHs may be present when the one or more PDSCHs comprise additional PDSCHs than the first PDSCH. The wireless device may determine the one or more second RVs based on configuration parameters configured by the base station. For example, the configuration parameters may comprise a list of RV values, where each entry of the list of RV values comprises a set of RV values {the first RV value, a second RV value, a third RV value, and son on}. The first RV value is determined based on the first RV field. The second RV value may correspond to a second PDSCH of the one or more PDSCHs. The second PDSCH is a PDSCH occurring in a second earliest among the one or more PDSCHs. The third RV value may be applied or correspond to a third PDSCH (e.g., a third earliest PDSCH) of the one or more PDSCHs.

For example, the DCI may comprise a RV field indicating an index of the first RV. For example, the second RV may be determined based on the first RV and one or more configuration parameters. The configuration parameters may comprise/indicate a RV offset. The second RV may be determined as the index of (the first RV+the RV offset) mod K. The K is a number of RVs (e.g., K=4). An index of RV may be determined as an order in the RV sequence. For example, an index of RV 3 is 3, and an index of RV 1 is 4. Similarly, the DCI may comprise a HARQ process ID field indicating an index of the first HARQ process ID. The wireless device may determine the second HARQ process ID based on the first HARQ process ID and one or more configuration parameters. The configuration parameters may comprise/indicate a HARQ process ID offset or a list of HARQ process IDs of the one or more PDSCHs. For example, the wireless device may increment the HARQ process ID for each PDSCH of the one or more PDSCHs. For example, the wireless device may apply the HARQ process ID indicated by the DCI for an earliest PDSCH of the one or more PDSCHs. The wireless device may increment the HARQ process ID for a second earliest PDSCH of the one or more PDSCHs. The wireless device may determine a HARQ process ID of a PDSCH of the one or more PDSCHs as (HARQ process ID+i) % MAX HARQ process ID where i is an order of the PDSCH among the one or more PDSCHs or i is a slot offset of the PDSCH from a first slot of the earliest PDSCH of the one or more PDSCHs. The MAX HARQ process ID may represent a number of maximum HARQ processes that the wireless device is configured with or supports for the cell.

In an example, the DCI may comprise a first NDI bit for the first PDSCH of the one or more PDSCHs. The DCI may comprise a second NDI bit for the second PDSCH of the one or more PDSCHs. The DCI may comprise one or more NDI bits for the one or more PDSCHs. Each NDI bit of the one or more of NDI bits may correspond to each PDSCH of the one or more PDSCHs.

For example, the DCI may comprise a first frequency domain resource assignment field and a second frequency domain resource assignment field. The first frequency domain resource assignment field may indicate first resource(s) of the first TRP/coreset pool in frequency domain. The second frequency domain resource assignment field may indicate a second resource of the second TRP/coreset pool in frequency domain. For example, the DCI may comprise a first frequency domain resource assignment (RA) field. The first frequency domain RA field may indicate an entry of one or more frequency domain resource allocation lists. The entry may comprise a first field indicating first resource(s) of the first TRP/coreset pool and a second field indicating second resource(s) of the second TRP/coreset pool.

For example, the DCI may comprise a first time domain resource assignment field and a second time frequency domain resource assignment field. The first time domain resource assignment field may indicate first resource(s) of the first TRP/coreset pool in time domain. The second time domain resource assignment field may indicate a second resource of the second TRP/coreset pool in time domain. For example, the DCI may comprise a first time domain resource assignment (RA) field. The first time domain RA field may indicate an entry of one or more time domain resource allocation lists. The entry may comprise a first field indicating first resource(s) of the first TRP/coreset pool and a second field indicating second resource(s) of the second TRP/coreset pool. An entry of the one or more time domain resource allocation lists may comprise a plurality of fields/sub-entries.

In an example, a physical downlink control channel (PDCCH) may comprise one or more control-channel elements (CCEs). For example, the PDCCH may comprise one CCE, that may correspond to an aggregation level (AL)=1. For example, the PDCCH may comprise two CCEs, that may correspond to an AL of two (AL=2). For example, the PDCCH may comprise four CCEs, that may correspond to an AL of four (AL=4). For example, the PDCCH may comprise eight CCEs, that may correspond to an AL of eight (AL=8). For example, the PDCCH may comprise sixteen CCEs, that may correspond to an AL of sixteen (AL=16).

In an example, a PDCCH may be carried over one or more control resource set (coreset). A coreset may comprise N_rb_coreset resource blocks (RBs) in the frequency domain and N_symbol_coreset symbols in the time domain. For example, the N_rb_coreset may be multiple of 6 RBs (e.g., 6, 12, 18, . . . ,). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or a RB index. The wireless device may move to a next symbol in response to all RBs of the first symbol may have been indexed. The wireless device may map one or more REG indices for one or more 6 RBs of N_rb_coreset RBs within N_symbol_coreset OFDM symbols of the coreset.

In an example, a wireless device may receive configuration parameters from a base station. The configuration parameters may comprise one or more coresets. One coreset may be associated with one CCE-to-REG mapping. For example, a single coreset may have a single CCE mapping to physical RB s/resources of the single coreset. For example, a CCE-to-REG of a coreset may be interleaved or non-interleaved. For example, a REG bundle may comprise L consecutive REGs (e.g., iL, iL+1, . . . , iL+L-1). For example, L may be a REG bundle size (e.g., L=2 or 6 for N_symbol_coreset=1 and L=N_symbol_coreset or 6 when N_symbol_coreset is 2 or 3). A index of a REG bundle (e.g., i), may be in a range of [0, 1, . . . N_reg_coreset/L-1]. For example, N_reg_coreset may be defined as N_rb_coreset*N_symbol_coreset (e.g., a total number of REGs in the single coreset). For example, a j-th indexed CCE may comprise one or more REG bundles of {f(6j/L), f(6j/L+1), . . . , f(6j/L+6/L-1)}. For example, f(x) may be an interleaver function. In an example, f(x) may be x (e.g., j-th CCE may comprise 6j/L, 6j/L+1 . . . , and 6j/L+6/L-1), when the CCE-to-REG mapping may be non-interleaved. When the CCE-to-REG mapping may be interleaved, L may be defined as one of {2, 6} when N_symbol_coreset is 1 or may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R-1, c=0, 1, . . . , C-1, C=N_reg_coreset/(L*R), and R is one of {2, 3, 6}.

For example, the configuration parameters may comprise a frequencyDomainResources that may define N_rb_coreset. The configuration parameters may comprise duration that may define N_symbol_coreset. The configuration parameters may comprise cce-REG-MappingType that may be selected between interleaved or non-interleaved mapping. The configuration parameters may comprise reg-BundleSize that may define a value for L for the interleaved mapping. For the non-interleaved mapping, L=6 may be predetermined. The configuration parameters may comprise shfitIndex that may determine n_shift as one of {0, 1, . . . , 274}. The wireless device may determine/assume a same precoding for REGs within a REG bundle when precorder granularity (e.g., a precoderGranularity indicated/configured by the configuration parameters) is configured as sameAsREG-bundle. The wireless device may determine/assume a same precoding for all REGs within a set of contiguous RBs of a coreset when the precoderGranularity is configured as all-ContiguousRBs.

For a first coreset (e.g., CORESET #0) may be defined/configured with L=6, R=2, n_shift=cell ID, and precoderGranularity=sameAsREG-bundle.

In an example, a wireless device may receive up to M DCIs via a slot or a PDCCH monitoring occasion or a span of a scheduling cell. Each DCI of the M DCIs may schedule one or more PDSCHs for a scheduled cell. The wireless device may inform a wireless device capability of the M for a band/band combination or for each numerology pair between a scheduling cell and a scheduled cell.

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RBs, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+(N_start_BWP mode P))/P) where a size of a first RBG is P−N_start_BWP mode P, a size of a last RBG is (N_start_BWP+bandwidth) mode P wherein is (N_start_BWP+bandwidth) mode P is greater than zero, a size of other RBGs are P, and P is the rbg-Size. The bitmap of N_RBG bits with one bitmap bit per a corresponding RBG, such that the corresponding RBG may be scheduled. The one or more RBGs may be indexed in an order of increasing frequency, and indexing may start from a lowest frequency of the active BWP. The order of the bitmap may be determined such that RBG #0 to RBG #N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS. The frequency domain resource allocation field based on the resource allocation type 1 may use a resource allocation value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth-L_rbs+1)+(bandwidth−1−RB_ start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI. The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PUSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHz), almost contiguous allocation may be supported. In frequency range 2 (e.g., above 7 GHz and below 52.6 GHz), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M(M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M(M+1)/2 (e.g., RIV>=M(M+1)/2), the RIV may indicate a starting interlace index m_0 and a set of values 1 based on one or more set of values. For example, an entry may represent {RIV−M(M+1)/2, m_0, 1}. For example, the one or more set of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicaor-ForDCIFormat0_1 to 'puschRepTypeB' indicating a repetition type B. In response to being configured with 'puschRepTypeB', the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to 'puschRepTypeB' to apply the repetition type B for a second DCI based on a DCI format 0_2. When the base station may not configure PUSCHRepTypeIndicaor-ForDCIFormat0_1 indicating 'puschRepTypeB', the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLF value may define SLIV=14*(14−L+1)+(14−1−S) when (L−1) is larger than 7. For example, L would be greater than 0, and may be smaller than or equal to 14−S. In an uplink BWP with an extended CP, 12 OFDM symbols may be assumed for a slot. A SLIV value may be determined by 12*(L−1)+S or 12*(12−L+1)+(14−1−S) respectively based on L−1 being smaller than/equal to 6 or larger than 6. For the repetition type A, the configuration parameters may comprise/indicate a TypeA or Type B for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the typeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {{0, . . . , 13}, {1, . . . , 14}, {1, . . . , 14} for a repetition type A, {1, . . . , 27} fora repetition type B} for the normal CP, and {{0, . . . , 11}, {1, . . . , 12}, {1, . . . , 12}} for the extended CP.

For a repetition type A, a wireless device may determine a repetition number K based on a row of a time domain resource allocation table. The row may comprise a number of repetitions. The wireless device may determine based on an RRC parameter, 'pusch-AggregationFactor' when the row may not comprise the number of repetitions. The wireless device may determine a single transmission based on the row may not comprise the number of repetitions nor the 'pusch-AggregationFactor' is not configured. The wireless device may determine the single transmission for a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted when the slot may not have a sufficient number of uplink OFDM symbols for the PUSCH transmission. For a repetition type B, a wireless device may determine one or more slots for a number of nominal repetition number N. For a i-th nominal repetition, wherein i is 0, ..., N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+(i+1)*L−1)/N_slot_symbol), and an ending symbol in the second slot may be determined as mod (S+(i+1)*L−1, N_slot_symbol). The Ks may be determined as a starting slot indicated by the time domain resource allocation field of the DCI.

When the wireless device is configured with the repetition type B, the wireless device may determine invalid OFDM symbol for PUSCH repetitions based on a tdd-UL-DL-ConfigurationCommon/a tdd-UL-DL-ConfigurationDedicated and/or an InvalidSymbolPattern indicated by an RRC signaling. For example, the wireless device may determine a downlink symbol based on the tdd-UL-DL-ConfigurationCommon or the tdd-UL-DL-ConfigurationDedicated as an invalid OFDM symbol for the repetition type B. The base station may transmit the InvalidSymbolPattern, a bitmap of OFDM symbols over one slot or two slots. A bit of the bitmap may indicate '1' to invalidate a corresponding OFDM symbol. The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, a invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPatternIndicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a row of a time domain resource allocation may comprise one or more resource assignments for one or more contiguous PUSCHs. A K2 of the row may indicate a first PSCH of the one or more contiguous PUSCHs. Each PUSCH of the one or more contiguous PUSCHs may be indicated/scheduled with a separate SLIV value and a PUSCH mapping type.

A similar mechanism may be used to schedule a time domain resource for a downlink data.

Figure 22:
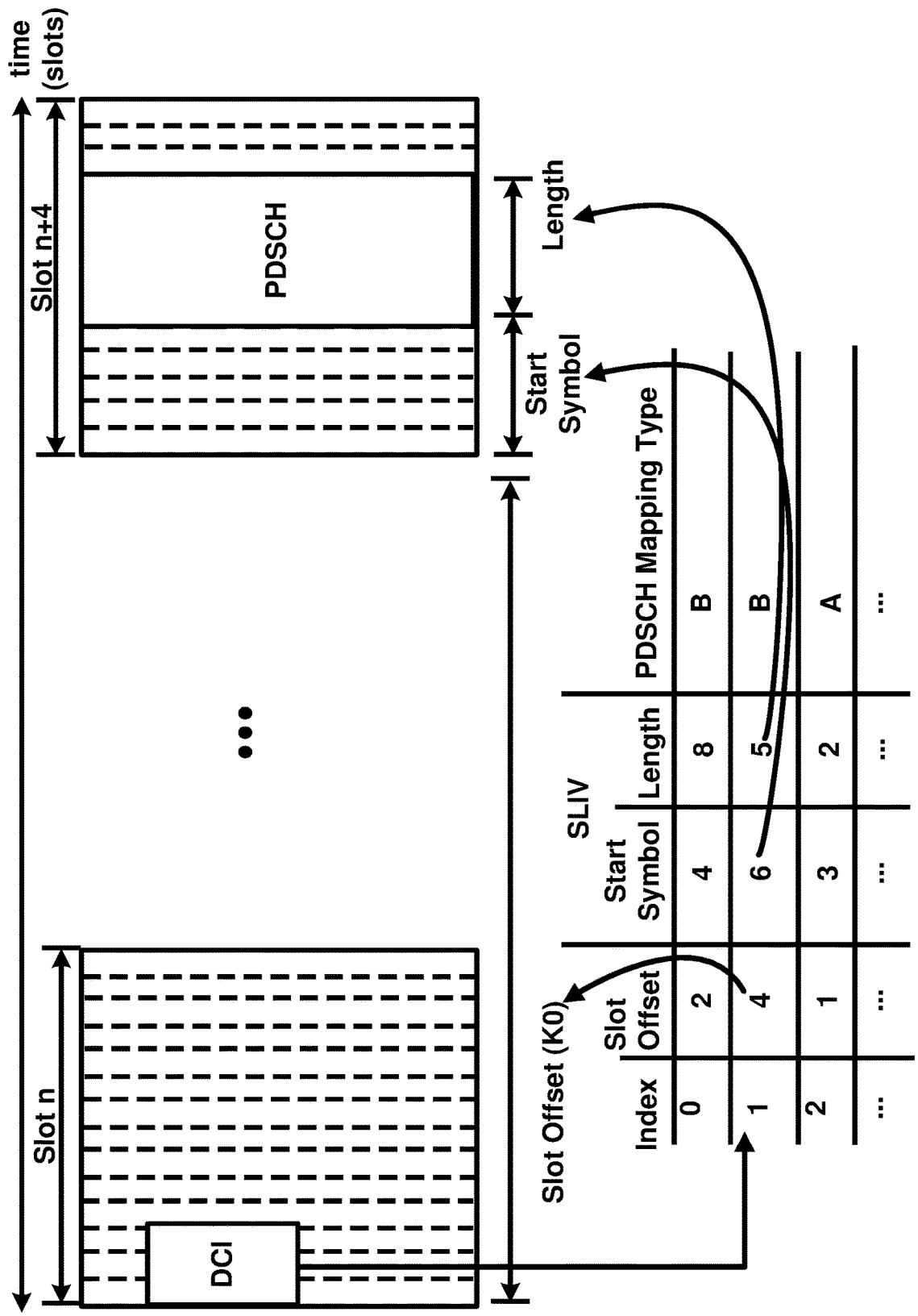
FIG. 22 illustrates a time domain resource allocation mechanism for downlink data as per an aspect of an embodiment of the present disclosure.

FIG. 22 illustrates a time domain resource allocation mechanism for downlink data as per an aspect of an embodiment of the present disclosure. A base station may transmit one or more RRC messages comprising/indicating configuration parameters. The configuration parameters may comprise/indicate a list of time domain resource allocation or a time domain resource allocation (TDRA) table. The list of TDRA or the TDRA table may comprise one or more entries/rows of TDRA. Each entry/row TDRA of the list of TDRA or the TDRA table comprises a slot offset (e.g., a scheduling offset, K0), a SLV value (e.g., indicating a starting symbol and a length) and a PDSCH mapping type (e.g., type A or type B). For example, each row may have an index that may be determined based on an order of the each row. For example, the index may be configured via the configuration parameters.

Based on the configuration parameters, the wireless device may determine a time domain resource allocation table shown in FIG. 22. For example, the time domain resource allocation (TDRA) table has a list of entries. Each entry comprises an index (e.g., an index of the entry, an index of a row of the entry in the time domain resource allocation table), a scheduling offset (or a slot offset, K0, k0), a SLIV (e.g., a starting symbol and a length) and a mapping type (e.g., PDSCH Mapping Type). The wireless device may receive the DCI in a slot n. The DCI may indicate an index=1 for the TDRA table. The wireless device may determine a scheduling offset value 1, and a starting symbol of 6 and a length of 5 based on an index=1 of the TDRA table. The wireless device may determine resources scheduled by the DCI, wherein the resources are in a slot n+4 (based on slot n and the scheduling offset 4) and symbols 6-11 of the slot n+4. The wireless device may receive a PDSCH via the resources. The wireless device may decode a transport block carried via the PDSCH based on the receiving the PDSCH.

In an example, a wireless device may have/support one or more capabilities (e.g., UE radio access capability parameters, radio access capability parameters, UE capabilities, wireless device capabilities). The wireless device may support a capability in response to the wireless device supporting a functionality indicated by the capability. The wireless device may have a capability where the base station configures a related functionality to the wireless device. For example, a capability of one or more capabilities may indicate whether the wireless device supports a carrier aggregation. Another capability may indicate a number of blind decodings and/or a number of non-overlapped CCEs in a slot. Another capability may indicate a number of antennas or a number of layers that the wireless device supports for a band and/or band combination. A capability may correspond to a functionality. One or more capabilities may correspond to a functionality.

The wireless device may indicate the one or more capabilities to a base station. The wireless device may support one or more second capabilities that are mandated by the wireless device to support. The wireless device may not indicate the one or more second capabilities. The base station may, based on the one or more capabilities and the one or more second capabilities, configure one or more configuration parameters (e.g., to support one or more functionalities) to the wireless device. The wireless device may support different functionalities between FDD and TDD, and/or between frequency range 1 (FR1) and frequency range 2 (FR2).

In an example, a wireless device may support one or more common search space (CSS) sets or one or more CSSs. For example, a Type0-PDCCH CSS set may be configured by pdcch-ConfigSIB1 in MIB or by searchSpaceSIB1 in PDCCH-ConfigCommon or by searchSpaceZero in PDCCH-ConfigCommon. The wireless device may monitor a DCI format with CRC scrambled by a SI-RNTI, via the Type0-PDCCH CSS (set) on a primary cell of the master cell group (MCG). For example, a Type0A-PDCCH CSS set may be configured by searchSpaceOtherSystemInformation in PDCCH-ConfigCommon. The wireless device may monitor a DCI format, via the Type0A-PDCCH CSS (set), with CRC scrambled by a SI-RNTI on the primary cell of the MCG. For example, a Type1-PDCCH CSS set may be configured by ra-SearchSpace in PDCCH-ConfigCommon. The wireless device may monitor a DCI format with CRC scrambled by a RA-RNTI, a MsgB-RNTI, or a TC-RNTI on the primary cell.

For example, a Type2-PDCCH CSS set may be configured by pagingSearchSpace in PDCCH-ConfigCommon. The wireless device may monitor a DCI format with CRC scrambled by a P-RNTI on the primary cell of the MCG. For example, a Type3-PDCCH CSS set may be configured by SearchSpace in PDCCH-Config with searchSpaceType=common. The wireless device may monitor DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI. For example, a USS set may be configured by SearchSpace in PDCCH-Config with searchSpaceType=ue-Specific. The wireless device may monitor DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

In an example, a wireless device may support one or more basic functionalities for a downlink control channel and procedure. For example, a capability (e.g., radio access capability) of the wireless device supporting the downlink control channel and the procedure may be referred as "Basic DL control channel". The one or more basic functionalities for the downlink control channel and procedure may comprise the followings. First, the wireless device may support one configured coreset for a BWP for a cell where the one configured coreset may be different from a coreset with index 0 (e.g., coreset #0). The wireless device may support at least two coresets (e.g., a coreset with index being different from zero (e.g., non coreset #0) and a coreset #0). The wireless device may support a resource allocation for a coreset based on a bitmap, where each bit of the bitmap corresponds to contiguous P PRBs (e.g., P=6) in frequency domain. The resource allocation may comprise a time domain resource allocation of a duration of Q1 to Q3 symbols (e.g., Q1=1, Q3=3) for a first frequency range (e.g., a frequency below 6 GHz or below 7 GHz).

The wireless device may support Type1-PDCCH CSS set (e.g., a CSS where the wireless device monitors DCIs for receiving random access responses), where Type1-PDCCH CSS set may be configured via SIB message(s) or MIB message(s). For Type1-PDCCH CSS set configured based on non-wireless device specific RRC parameters, Type0-PDCCH CSS set (e.g., a CSS where the wireless device monitors DCIs for receiving SIB1 messages), Type0A-PDCCH CSS set (e.g., a CSS where the wireless device monitors DCIs for receiving SIB messages other than SIB1), and/or Type2-PDCCH CSS set (e.g., a CSS where the wireless device monitors DCIs for receiving paging messages/short messages), the wireless device may support up to Q3 symbols for a coreset (e.g., Q3=3) in a second frequency range (e.g., FR2).

For a Type1-PDCCH CSS set configured via a wireless device specific RRC signaling and/or for a type3-PDCCH CSS set (e.g., a CSS where the wireless device monitors group-common DCIs) and/or for one or more USS, the wireless device may support up to Q2 symbols for a coreset (e.g., Q2=2) for the second frequency range.

The wireless device may support a bundle size, of resource element groups (REGs) for a control channel elements (CCEs) of a coreset, of 2 or 3 RBs or 6 RBs. The wireless device may support interleaved or non-interleaved CCE-to-REG mapping. The wireless device may support precoder granularity of a REG bundle size. The wireless device may support a determination of a DM-RS scrambling sequence. The wireless device may support one or more TCI states for a coreset. The wireless device may support at least one CSS and at least one USS configurations for a unicast PDCCH transmission for a BWP of a cell. The wireless device may support aggregation levels, of 1, 2, 4, 8 and 16, for a PDCCH. The wireless device may support up to K (e.g., K=3) search space sets for a BWP of a secondary cell. The wireless device may support that a type1-PDCCH CSS set configured via a wireless device specific RRC signaling, a type3-PDCCH CSS set, and/or one or more USSs scheduled via first Q1-Q3 symbols (e.g., Q1=1 and Q3=3) of a slot (e.g., OFDM symbol 0, 1, and 2).

For Type1-PDCCH CSS set without a wireless device specific RRC signaling and for a Type0-PDCCH CSS/Type0A-PDCCH CSS/Type2-PDCCH CSS, a monitoring occasion may be in any symbol(s) of a slot. A Type1-PDCCH CSS without a wireless device specific RRC signaling and for a Type0-PDCCH CSS/Type0A-PDCCH CSS/Type2-PDCCH CSS within a single span may be confined within Q3 (e.g., Q3=3) consecutive symbols of a slot. A span may comprise one or more consecutive symbols where one or more monitoring occasions of one or more search spaces may be present.

The wireless device may support monitoring DCIs based on one or more DCI formats. The one or more DCI formats may comprise a DCI format 0_0, a DCI format 1_0, a DCI format 0_1 and a DCI format 1_1. The wireless device may support a number of PDCCH blind decodings per a slot based on a subcarrier spacing of an active BWP of a cell. For example, the wireless device may support M1 (e.g., 44) for a 15 kHz SCS active BWP of the cell.

For example, the wireless device may support M2 (e.g., 36) for a 30 kHz SCS active BWP of the cell. the wireless device may support M3 (e.g., M3=22) for a 60 kHz SCS active BWP of the cell. The wireless device may support M4 (e.g., M4=20) for a 120 kHz SCS active BWP of the cell.

In an example, a wireless device may monitor one or more monitoring occasions of one or more search spaces in a span. The one or more search spaces may be associated with one or more coresets of an active BWP of a cell. The span may be determined as one or more consecutive (OFDM) symbols in a slot, where the one or more monitoring occasions are present over the span. Each PDCCH monitoring occasion (e.g., determined based on a search space set configuration) may be within one span. The wireless device may have a capability indicating a combination (X, Y). The wireless device may support a PDCCH monitoring occasions in any symbol of a slot with a minimum time gap/separation (e.g., a minimum gap, a minimum separation, a gap, a space, an offset, a minimum offset, a minimum space, a separation) between first symbols of two consecutive/adjacent spans, including across slots, may be X. A span may start at a first symbol of a slot, where a first PDCCH monitoring occasion may start. The span may end at a second symbol of the slot where a second PDCCH monitoring occasion may end. The first PDCCH monitoring occasion may be same or different from the second PDCCH monitoring occasion. A span may be up to Y symbols. For example, a maximum number of symbols in a span may be less than or equal to Y.

The wireless device may support one or more combinations (X, Y) for a SCS for an active BWP of a cell.

Figures 23A, 23B:
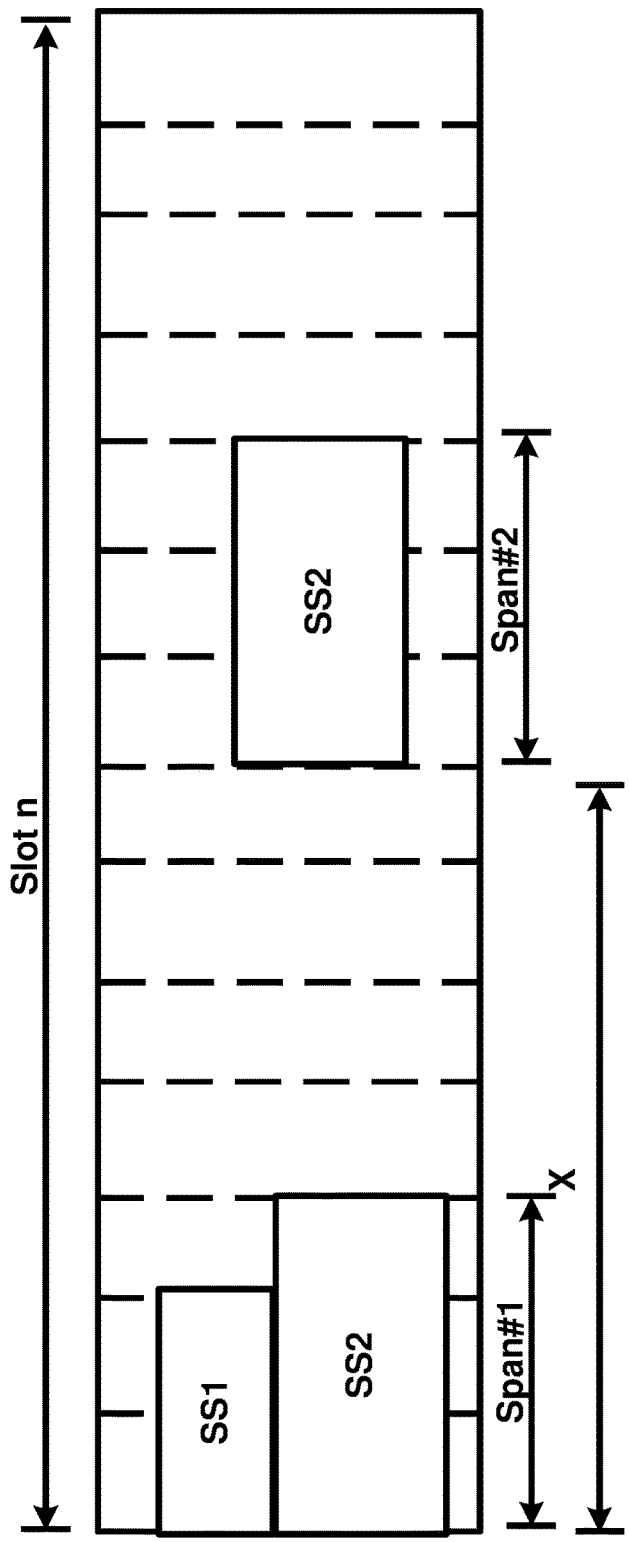
FIG. 23A illustrates an example diagram of a span in a slot as per an aspect of an embodiment of the present disclosure.
FIG. 23B illustrates one or more combinations of (X, Y) as per an aspect of an embodiment of the present disclosure

FIG. 23A illustrates an example diagram of a span in a slot as per an aspect of an embodiment of the present disclosure. For example, a first PDCCH monitoring occasion based on a first search space (SS1) may present in first and second symbols of a slot n. A second PDCCH monitoring occasion based on a second search space (SS2) may present in [1-3] symbols of the slot n. A first span (span #1) may be determined between [1-3] symbols of the slot n. A second span (span #2) may be determined between [8-10] symbols of the slot n. A minimum time gap/separation between the first span and the second span may be less than or equal to X (e.g., X=7). A maximum number for the first span and the second span may be Y (e.g., Y=3). The wireless device may support (X=7, Y=3) in FIG. 23A.

FIG. 23B illustrates one or more combinations of (X, Y) that the wireless device supports for one or more subcarrier spacings as per an aspect of an embodiment of the present disclosure. For example, the wireless device may support K number of blind decodings for a (X, Y) combination for a subcarrier spacing. For example, the wireless device may support up to K=44 blind decodings when (X, Y)=(7, 3) with a subcarrier spacing of 15 kHz (e.g., a SCS of an active BWP of a cell is 15 kHz). The wireless device may support up to K=36 with a SCS of 30 kHz with (X, Y)=(7, 3). The wireless device may support up to 14 blind decodings with a SCS of 15 kHz and (X, Y)=(2, 2), and 12 blind decodings with a SCS of 30 kHz and (X, Y)=(2, 2).

The wireless device may indicate one or more combinations from {(2, 2), (4, 3), (7, 3)} per a SCS. For example, when the wireless device may indicate a plurality of combinations from {(2, 2), (4, 3), (7, 3)}, the wireless device may determine a smallest Y based on one or more search space configurations of an active BWP of a cell. The wireless device may determine a combination based on the smallest Y. The wireless device may determine a number of blind decodings based on the combination of (X, Y) where the Y is the smallest Y.

FIG. 24 illustrates one or more capabilities, of a wireless device (a set of a wireless device capability, a capability with one or more combinations, a list of capabilities for one or more combinations and/or the like), for a PDCCH monitoring as per an aspect of an embodiment of the present disclosure. In an example, the wireless device may support or indicate one or more capabilities for. For example, a pdcch-Monitoring-r16 may indicate whether the wireless device supports PDCCH search space monitoring occasions in any symbol of the slot with a minimum time separation between two consecutive transmissions of PDCCH with a span up to two OFDM symbols for two OFDM symbols or a span up to three OFDM symbols for four and seven OFDM symbols. The different value may be reported for PDSCH processing type 1 and PDSCH processing type 2, respectively.

In an example, a pdcch-MonitoringAnyOccasionsWithinSpanGap may indicate whether the wireless device supports PDCCH search space monitoring occasions in any symbol of a slot with minimum time separation between two consecutive transmissions of PDCCH with a span up to two OFDM symbols for two OFDM symbols or a span up to three OFDM symbols for four and seven OFDM symbols.

In an example, a pdcch-MontioringCA-r16 may indicate a number of CCs for monitoring a maximum number of blind detections and non-overlapped CCEs per span. When the wireless device is configured with a downlink carrier aggregation, this capability may indicate that the wireless device may support a span based PDCCH monitoring.

In an example, a crossCarrierSchedulingProcessing-DiffSCS-r16 may indicate a cross-carrier scheduling processing capability of the wireless device for supporting downlink carrier aggregation. For example, the cross-carrier scheduling processing capability may support up to X unicast DCI scheduling for downlink scheduling for a scheduled carrier/cell. X may be determined based on a pair of (a first SCS of a scheduling cell, a second SCS of a scheduled cell). For example, the pair may be one of {(15, 120), (15, 60), (30, 120)} kHz where X may be one of {1, 2, 4}. For example, the pair may be one of {(15, 30), (30,60), (60,120)} kHz where X may be {2}. The wireless device may apply the X for a span in a slot of the scheduling cell.

In an example, a wireless device may support one or more cells in a third frequency region (e.g., FR3), where a frequency of the third frequency region may be between [52.6, 71] GHz. The third frequency region may be between [f1>=52.6 GHz and f2<=71 GHz]. The wireless device may support one or more subcarrier spacing for the one or more cells. For example, the one or more SCS may comprise at least one of {120 kHz, 240 kHz, 480 kHz, 960 kHz}. When an active BWP of a cell of the one or more cells operates based on 480 kHz or 960 kHz, a duration of a slot may be smaller than 32 us or 16 us.

In an example, the wireless device may support one or more blind decodings based on a single-slot span monitoring occasion. For example, the wireless device may have a span in each slot of the active BWP of the cell. The wireless device may support M number of blind decodings and P number of non-overlapped CCEs based on a single-slot span monitoring occasion. For example, M may be 4 for 480 kHz and M may be 2 for 960 kHz.

In an example, a wireless device may support a capability of a multi-slot PDCCH monitoring. The wireless device may support up to M blind decodings within a multi-slot span and up to P non-overlapped CCEs within the multi-slot span. A multi-slot span may comprise or span over a plurality of slots of an active BWP of a scheduling cell. For example, the wireless device may support the capability of the multi-slot PDCCH monitoring in response to a SCS of an active BWP of the scheduling cell is one of {480 kHz, 960 kHz, 240 kHz}. The wireless device may transmit a capability of the capability for each SCS of {240 kHz, 480 kHz, 960 kHz} and/or a band/band combination.

In an example, the capability of the multi-slot PDCCH monitoring may be determined based on a fixed pattern of N slots. For example, the wireless device may determine N slots based on a pre-determined pattern (e.g., a span is between slots with indices between [n+0, n+N−1] wherein (n % N)=0). For example, the wireless device may determine the N slots based on a pattern configured by an RRC/SIB/MIB message. For example, the wireless device may determine a starting slot with an index P where the wireless device may monitor/receive a cell-defining SSB. The wireless device may determine N that is a dividend of 64 or 32 (e.g., N=2, 4, 8, 16). The wireless device may determine an ending slot of N multi-slot span that is P+N−1. A span may be between [slot P, slot P+N−1]. The wireless device may determine a starting slot with an index P, where the wireless device may monitor/receive a type0-PDCCH CSS (or a type2-PDCCH CSS, or a type0A-PDCCH CSS).

In an example, a wireless device may support a capability (e.g., pdcch-Monitoring-R16 (X, Y)). The capability may comprise a combination of (X, Y) for a subcarrier spacing. For example, X may determine consecutive OFDM symbols of a span. The span may comprise one or more monitoring occasions. Y may determine a minimum time gap/separation between two consecutive/adjacent spans. For example, X may determine consecutive slots of a span. The span may comprise one or more monitoring occasions. Y may determine a minimum time gap/separation between first slot of a first span and first slot of a second span, where the first span and the second span is adjacent or consecutive spans. For example, Y may be determined as a minimum gap/separation between two monitoring occasions based on a search space configuration, where the two monitoring occasions are adjacent or consecutive. For example, Y may be determined as a minimum periodicity that a search space for an active BWP of a cell may be configured with.

FIG. 25A illustrates an example of a multi-slot span as per an aspect of an embodiment of the present disclosure. For example, a span may be determined based on one or more consecutive symbols of a slot. A size/duration of the span may be up to Y symbols. Y may be greater than 3 symbols. FIG. 25A illustrates that a first span spans five OFDM symbols (e.g., Y=5). A second span may span three OFDM symbols (e.g., <=Y). In an example, a span may be determined as a slot where the wireless device may be configured with one or more monitoring occasions in the slot. The one or more monitoring occasions may occur consecutively or non-consecutively in time over the slot. For example, a first monitoring occasion based on a second search space (SS2) may occur symbols [9-11] in a slot n and a second monitoring occasion based on a first search space (SS1) may occur in symbols [4-5] in the slot n. The first monitoring occasion and the second monitoring occasion may not be contiguous. The span may comprise one or more contiguous or non-contiguous monitoring occasion in a slot.

A minimum time gap/separation between two spans may be determined based on first symbol of first slot of a first span and first symbol of first slot of a second span. The first span and the second span may be adjacent or consecutive spans. First symbol of first slot may be symbol 0 (or 1) of first slot of the first span. First symbol of first slot may be symbol 0 (or 1) of first slot of the second span. First symbol may or may not comprise a monitoring occasion. First slot of the first span may comprise a monitoring occasion. First slot of the second span may comprise a monitoring occasion.

FIG. 25B illustrates an example of a multi-slot span as per an aspect of an embodiment of the present disclosure. In an example, a span may be determined based on one or more consecutive slots. A size/duration of the span may be up to Y slots. Y may be smaller than or equal to K slots (e.g., K=2, 4). A span may start a slot with index n such that n % K=0 or n % (K*X)=0. X may be determined as a minimum time gap/separation between two consecutive/adjacent spans. The X may be measured between first slot of a first span of the two spans and a second slot of a second span of the two spans. In FIG. 25B, a span may span two slots (e.g., slot n and slot n+1) with Y=2 slots and a minimum gap X may be X slots. In each span, a number of consecutive slots with one or more monitoring occasions may be smaller than or equal to Y.

In an example, a wireless device may support a multi-slot PDCCH monitoring capability based on a sliding window of N slots. For example, the wireless device may support M blind decodings and/or P non-overlapped CCEs within any sliding window of size N slots. The base station may configure one or more search spaces, wherein one or more monitoring occasions based on the one or more search spaces are within M blind decodings and P non-overlapped CCEs within a sliding window of N slots. The wireless device may determine a sliding window of N slots based on a current slot n and N sliding window size (e.g., [slot n, slot n+N−1]). The wireless device may support in every sliding window, up to M blind decodings and/or P non-overlapped CCEs. For example, the wireless device may support M and/or P between [slot n, slot n+N−1], [slot n+1, slot n+N], . . . , slot [n+k, slot n+k+N−1], . . . and/or the like.

The wireless device may determine a sliding window or update the sliding window in every slot (e.g., the wireless device may support M and/or P between [slot n, slot n+N−1], [slot n+1, slot n+N] . . . , slot [n+k, slot n+k+N−1], . . . and/or the like). The wireless device may determine or update the sliding window in every P slots (e.g., the wireless device may support M and/or P between [slot n, slot n+N−1], [slot n+P, slot n+P+N−1] . . . , slot [n+k*P, slot n+k*P+N−1], . . . and/or the like). For example, P may be 2 or 4 or N.

The wireless device may report one or more capabilities of one or more multi-slot PDCCH monitoring for a cell. The base station may transmit one or more RRC messages indicating one multi-slot PDCCH monitoring of the one or more capabilities of the one or more multi-slot PDCCH. The one or more RRC messages may indicate/comprise configuration parameters. The configuration parameters may comprise/indicate one or more search spaces for the cell. The wireless device may determine one of the one or more capabilities, for the cell, based on the configuration parameters.

For example, the first SCS is 960 kHz. The wireless device may determine a number of blind decoding for a combination of (X, Y) for a SCS of an active BWP of a cell. FIG. 26A illustrates an example of a wireless device capability of a number of blind decodings for a first SCS as per an aspect of an embodiment of the present disclosure. For example, when (X, Y)=(3, 64), the wireless device may support up to 44 blind decodings. For example, X=3 may indicate a length of a span in terms of symbols in a slot or in terms of slots. Y may be a minimum time gap/separation between two consecutive spans or may be a sliding window size. In case a sliding window is used for a multi-slot PDCCH monitoring capability, a value of X may be ignored or assumed to be 1 slot or K slots that may be used to increment/update a sliding window. For example, the wireless device may support smaller number of blind decodings for smaller time gap/separation between two consecutive spans. The wireless device may support smaller number of blind decodings for larger duration of a span. For example, the wireless device may support 2 blind decodings for a single-slot (e.g., Y=1) PDCCH monitoring capability. In case of the single-slot PDCCH monitoring capability, X may represent a number of symbols for a span in a slot.

FIG. 26B illustrates an example of a wireless device capability of a number of blind decodings for a second SCS as per an aspect of an embodiment of the present disclosure. The second SCS may be 480 kHz. FIG. 26B is a similar example to FIG. 26A for a different subcarrier spacing.

In an example, a wireless device may receive one or more RRC messages indicating a list of TDRA entries or a TDRA table. The list of TDRA entries or the TDRA table may comprise one or more TDRA. A TDRA of the one or more TDRA may comprise a scheduling offset (or a slot offset k0) and a SLIV value. For example, for downlink scheduling, a k0 may be in a range of [0, 31].

In an example, the one or more RRC messages may indicate configuration parameters. The configuration parameters may indicate a self-carrier scheduling, for example, one or more search spaces/coresets for an active BWP of a cell. A subcarrier spacing of the active BWP of the cell may be one of {240 kHz, 480 kHz or 960 kHz}. The configuration parameters may indicate a multi-PDSCH scheduling. The wireless device may receive a DCI indicating resources for one or more PDSCHs across one or more slots. The resources may be contiguous or non-contiguous over the one or more slots. Each of the one or more PDSCHs may transmit at least one transport block or the one or more PDSCHs may be used for repeating one or more transport blocks. The one or more slots may be contiguous or non-contiguous. In the example, the wireless device may receive the DCI in a slot n. Based on the DCI, the wireless device may be scheduled with a PDSCH in the slot n, a slot n+1, ..., a slot n+31.

In an example, the wireless device may process the received DCI with a processing delay d. For example, the processing delay d may be larger than a slot. In existing technologies, the wireless device may buffer downlink signals (e.g., OFDM signal received via antenna ports based on FIG. 16C) between the slot n and a slot n+d. For example, the wireless device may need one or more values of one or more DCI fields of the DCI to be able to perform receiving the buffered downlink signals. The wireless device may acquire (e.g., resource element mapping, DM-RS sequence, layer mapping, scrambling and/or the like in FIG. 16C) the one or more values after processing delay d since the slot n.

For example, based on the buffered data, the wireless device may receive a PDSCH scheduled at the slot n. Implementation of existing technologies may increase buffering requirement of the wireless device with higher subcarrier spacing or shorter slot duration. For example, when the processing time d is larger than a slot or a few slots, the wireless device may need to buffer downlink signals up to the processing time d. This may require buffering of the processing time d slots. In an example, when a wireless device supports (X=3 slots, Y=32 slots) capability, a processing time of the wireless device may be 32 slots. Implementation of existing technologies may require buffering of up to 32 slots when the capability is used. Implementation of existing technologies may not be scalable with higher subcarrier spacing and/or shorter duration of a slot and/or a multi-slot PDCCH monitoring capability.

In an example, a wireless device may support a buffering capability. For example, the wireless device may transmit a set of wireless device capabilities of a downlink control channel (e.g., PDCCH) monitoring. Each of the set of wireless device capabilities may indicate a combination of a duration (Y) of a span (e.g., a span duration X) and a minimum time gap/separation (X) (e.g., a minimum gap X, a minimum time gap X, a minimum separation X, a minimum time separation X) between two consecutive spans. The wireless device may receive one or more RRC messages indicating configuration parameters. The configuration parameters may comprise a combination of a first X and a first Y, wherein the combination of the first X and the first Y is one of the wireless device capabilities. The wireless device may determine a buffering offset based on the combination of the first X and the first Y. For example, the buffering offset may be equal to, or smaller than, X. For example, the buffering offset may be X−1 slots. For example, the buffering offset may be X−K slots, where K may be a capability of the wireless device. The wireless device may determine a value K for a subcarrier spacing. The wireless device may indicate the value K to a base station. For example, the buffering offset may be X.

The wireless device may receive one or more PDSCHs scheduled via a DCI, received in a slot n, based on the buffering offset. For example, the wireless device may receive the one or more PDSCHs in response to first slot of the one or more PDSCHs being later than the buffering offset from the slot n. The wireless device may drop one or more second PDSCHs of the one or more PDSCHs in response to resources of the one or more second PDSCHs occurring before the buffering offset from the slot n. The wireless device may transmit one or more negative feedbacks for the one or more second PDSCHs in response to dropping the one or more second PDSCHs.

In an example, the wireless device may support up to receive up to M DCIs via a span. The wireless device may indicate a capability of M to the base station. The configuration parameters may comprise/indicate a maximum number of DCIs (m) scheduled per span. The wireless device may determine the buffering offset for the combination of the first X and the first Y based on the maximum number of DCIs. For example, the buffering offset may be X−K when the maximum number of DCIs is one. For example, the buffering offset may be increased as the maximum number of DCIs increases.

In existing technologies, a cross-slot scheduling may be enabled or disabled via RRC and/or DCI signaling. When a cross-slot scheduling is disabled, the wireless device may need to support k0=0 (e.g., a same slot scheduling). This may increase a complexity of the wireless device when a multi-slot scheduling is enabled/configured. In an example, when the cross-slot scheduling for a power saving is enabled, the wireless device may be configured with a minimum scheduling offset. A base station may schedule a PDSCH via a DCI, where resources for the PDSCH occurs after a sum of the buffering offset and the minimum scheduling offset from receiving the DCI.

In existing technologies, a minimum scheduling offset may be applied for data scheduling regardless of a search space or a coreset where a DCI for the data is transmitted. This may increase a latency for example for data scheduled via a fallback DCI format (e.g., SIB, RAR transmission). In an example, the configuration parameters may comprise a first search space with a first periodicity. The configuration parameters may comprise a second search space with a second periodicity. For example, the first periodicity may be smaller than X. The X may be a multiple of the first periodicity. For example, the second periodicity may be equal to X. The wireless device may determine a number of blind decodings (M) at a monitoring occasion of the first search space. The wireless device may determine a total number of blind decodings of the first search space within X as M*(X/P1) where P1 is the first periodicity. The wireless device may determine a total number of blind decodings of a search space within X based on a number of monitoring occasions of the search space within X and a number of blind decodings at each monitoring occasion. The wireless device may determine a first buffering offset for the first search space based on the first periodicity. The wireless device may determine a second buffering offset for the second search space based on the second periodicity. The wireless device may receive a first DCI via the first search space. The wireless device may determine a first valid slot of a PDSCH scheduled via the first DCI being later than or equal to a time after the first buffering offset since receiving the first DCI. the wireless device may receive a second DCI, at a slot m, via the second search space. The wireless device may determine a second valid slot of a second PDSCH scheduled via the second DCI being later than or equal to a time after the second buffering offset from the slot m. The wireless device may determine different buffering offsets for different search spaces and/or different coresets.

Example embodiments may reduce a complexity of the wireless device by limiting a buffering requirement. Example embodiments may allow flexible configuration of one or more search spaces with different periodicities with a multi-slot PDCCH monitoring capability.

Figure 27:
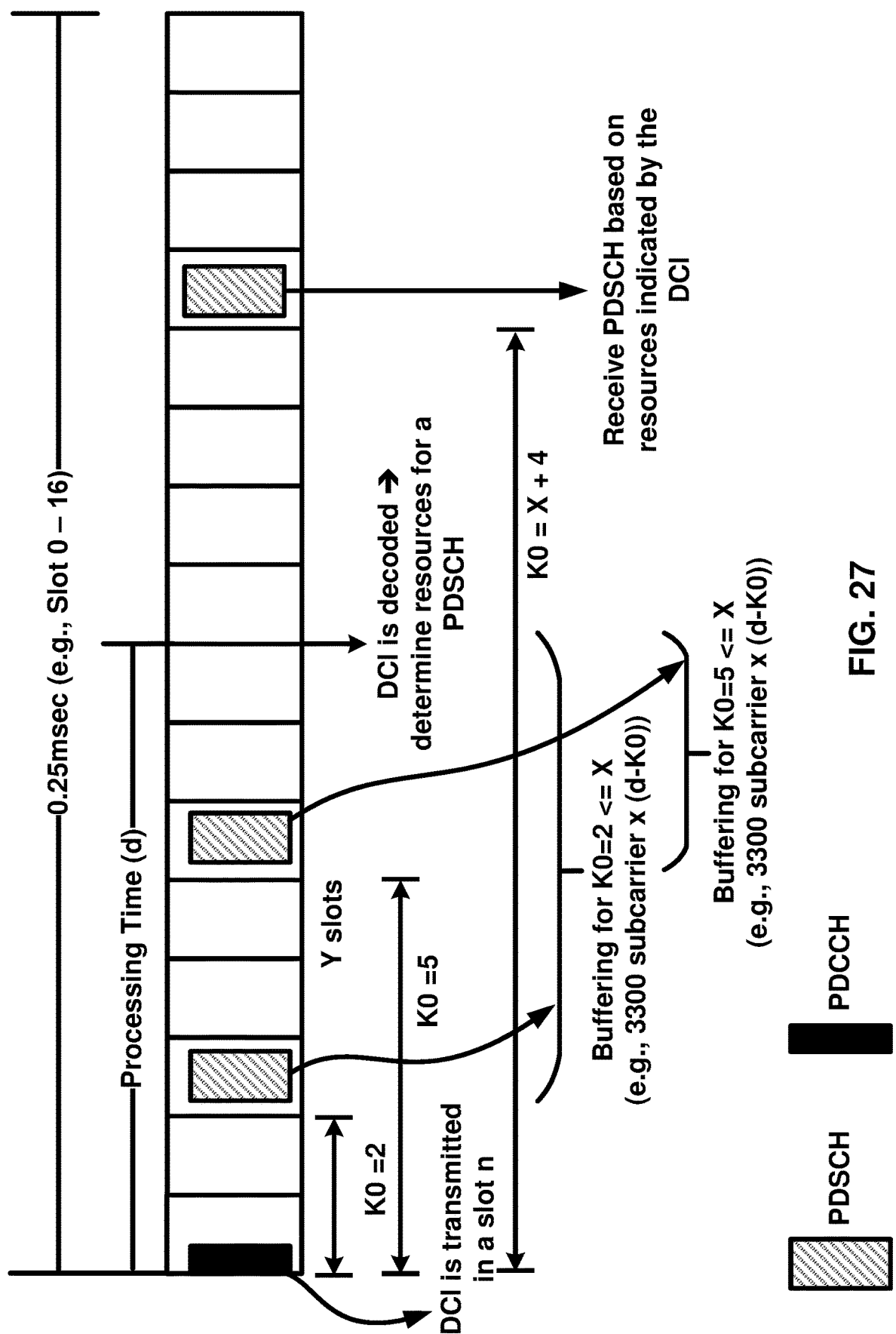
FIG. 27 illustrates an example embodiment of a scheduling offset as per an aspect of an embodiment of the present disclosure.

FIG. 27 illustrates an example embodiment of a scheduling offset as per an aspect of an embodiment of the present disclosure. A base station may transmit one or more RRC messages indicating configuration parameters. The configuration parameters may indicate/comprise a serving cell, for a wireless device, with one or more bandwidth parts. For example, an active BWP of the one or more BWPs may be configured/enabled/activated/operated with a first subcarrier spacing (and a normal/extended CP). For example, the first SCS is 960 kHz in FIG. 27. The wireless device may determine 16 slots within 0.25 msec. For example, a number of symbols within 0.25 msec with 15 kHz is smaller than 4. For example, a single slot may be present within 0.25 msec with 60 kHz SCS. The wireless device may support a processing time (d) to receive/decode a DCI. For example, the processing time may be between first symbol when the wireless device receives the DCI and last symbol when the wireless device finishes decoding of the DCI. For example, the processing time may between first slot when the wireless device receives the DCI and last slot when the wireless device finishes decoding of the DCI. The processing time may be between last symbol when the wireless device receives the DCI and last symbol when the wireless device finishes decoding of the DCI.

FIG. 27 illustrates that the processing time (d) is 8 slots. For example, the wireless device may support a single processing time d for a subcarrier spacing. For example, d=8 may be supported for 960 kHz. FIG. 27 shows an example of a multi-slot PDCCH monitoring capability. For example, the base station may transmit a DCI in a slot n. The wireless device may perform one or more blind decodings of one or more candidates of a PDCCH monitoring occasion in the slot n. The wireless device may attempt to decode each candidate of the one or more candidates to identify the DCI. The wireless device may support the one or more blind decodings within the processing time d. The wireless device may finish decoding of the one or more blind decodings of the one or more candidates by the slot n+d−1. The DCI may comprise a time domain resource allocation field indicating an entry of a TDRA table. The entry of the TDRA table may comprise a slot offset (or a scheduling offset, K0) and a SLIV value. The slot offset may be in [0, . . . , 31]. In case K0=2 (e.g., a PDSCH scheduled by the DCI may be present or received in a slot n+2) is indicated by the DCI, the wireless device may not know the TDRA entry until the slot n+d−1. The wireless device needs to buffer the slot n+2 until the slot n+d−1. In case K0=5, the wireless device may need to buffer a slot n+5 until the slot n+d−1. In an example, a maximum number of subcarriers that the wireless device may support in a frequency domain may be 300. The wireless device may need to buffer downlink signals at least the maximum number of subcarriers (e.g., 3300) multiplied by a number of slots to buffer (e.g., d−K0 slots, 14*(d−K0)). For example, the wireless device may need to buffer 6*14*3300=277K resource elements for K0=2. For example, the wireless device may need to buffer 3*14*330=139K resource elements for K0=5.

When the wireless device may support a plurality of carriers/cells, where buffering requirement for a carrier/cell is about 400 K resource elements with a processing time=8, the buffering requirements may linearly increase based on a number of the plurality of carriers/cells. A complexity of the wireless device may significantly increase with higher subcarrier spacing and/or a multi-slot PDCCH monitoring capability.

In FIG. 27, the DCI may indicate a scheduling/slot offset K0=X+4, where X=d. The wireless device may finish decoding of the DCI by the slot n+d. The wireless device may not need additional buffering requirement for the PDSCH as the wireless device has acquired information by the DCI before resources of the PDSCH. The wireless device may receive the PDSCH based on the resources indicated by the DCI in the slot n+X+4.

In an example, a wireless device may support a buffering offset capability (e.g., a minimum scheduling offset that the wireless device may support) for a combination of (X, Y, a maximum number of DCIs per span (M)). FIG. 28 illustrates an example embodiment of a buffering offset capability as per an aspect of an embodiment of the present disclosure. For example, a maximum number of DCIs per span may indicate a capability that the wireless device may receive up to the maximum number of DCIs scheduling resources for one or more PDSCHs via a PDCCH monitoring span or a PDCCH monitoring occasion or a slot or during a X. The wireless device may support at least one DCIs for each PDCCH monitoring span or each PDCCH monitoring occasion or each slot or each X slots. The wireless device may support a buffering offset (BO) that is smaller than or equal to X for a combination of (X, Y, 1). For example, the BO may be X−1. For example, the BO may be X. The wireless device may support increased BO values for higher or larger number of DCIs per span/PDCCH monitoring occasion/slot/X slots.

A table of the one or more buffering offset capabilities for one or more combinations of (X, Y, M) may be (pre-)configured to the wireless device. The wireless device may be configured with the table via one or more RRC signaling. The wireless device may transmit the table via one or more RRC signaling to the base station. The base station may configure a combination (X1, Y1, M1) among the one or more combinations of (X, Y, M) for a cell. The wireless device may determine a minimum scheduling offset (e.g., a buffering offset) based on the configured combination (X1, Y1, M1). For example, when the base station indicates/configures (32, 3, 8) for a cell, the wireless device may determine a buffering offset or a minimum scheduling offset for the cell as 48. The wireless device may determine a maximum number of DCIs per span/slot/X slots as 8 (e.g., M1).

In an example, the wireless device may apply the buffering offset as a minimum scheduling offset. For example, the wireless device may support receiving a DCI, scheduling a PDSCH, and the corresponding PDSCH with the minimum scheduling offset that (e.g., K0>=buffering offset) is larger than or equal to the buffering offset.

Figure 29:
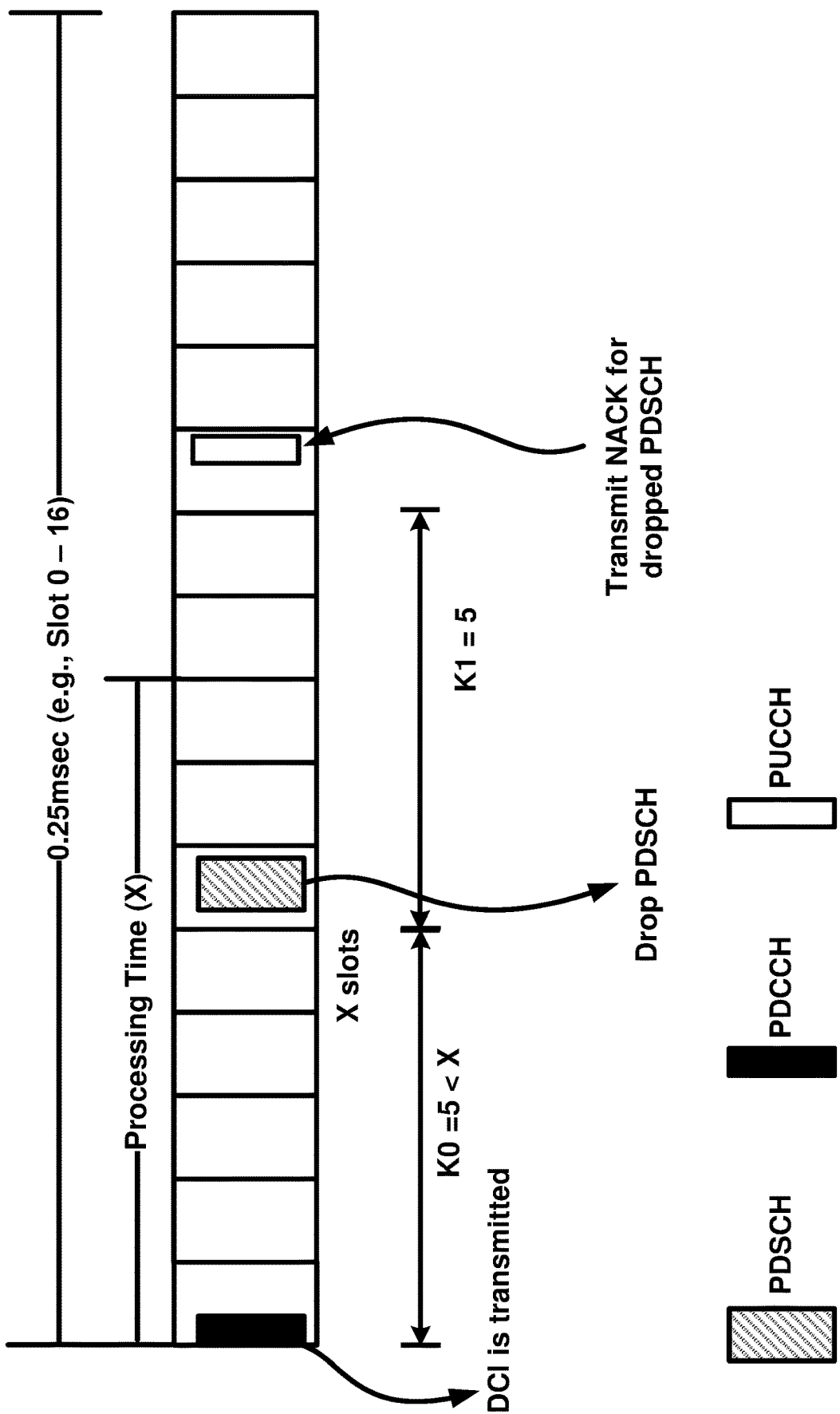
FIG. 29 illustrates an example embodiment as per an aspect of an embodiment of the present disclosure.

FIG. 29 illustrates an example embodiment as per an aspect of an embodiment of the present disclosure. The wireless device may receive a first DCI, in a slot n, indicating a scheduling offset K0=5 and a HARQ feedback timing indicator (e.g., PDSCH-to-HARQ) K1=5. The wireless device may decode the first DCI at a slot n+X−1. The wireless device may support a minimum scheduling offset or a buffering offset with X−1 where X is a minimum time gap/separation between two consecutive spans or X is a processing time of the first DCI or X is a periodicity of a search space scheduling the first DCI. The wireless device may drop the PDSCH scheduled by the first DCI in response to the scheduling/slot offset being smaller than the minimum scheduling offset or the buffering offset. The wireless device may transmit a negative acknowledgment for the PDSCH via a PUCCH resource or a PUSCH resource at slot n+10 (e.g., n+K0+K1) in response to dropping the PDSCH. For example, when the DCI schedule one or more transport blocks via the PDSCH, the wireless device may transmit one or more NACKs corresponding to the PDSCH.

For example, when the first DCI schedules resources for a plurality of PDSCHs with a scheduling offset K0=5, the wireless device may drop one or more PDSCHs of the plurality of PDSCHs based on time gap between the slot n and one or more slots of the one or more PDSCHs. For example, the first DCI schedules 4 PDSCHs starting from slot n+5 in consecutive slots (e.g., slot n+5, slot n+6, slot n+7, slot n+8), the wireless device may drop first two PDSCHs scheduled via slot n+5 and slot n+6 based on the buffering offset. The wireless device may receive or attempt to receive last two PDSCHs scheduled via slot n+7 and slot n+8 in response to a gap between the slot n and the slot n+7 or between slot n and the slot n+8 being equal to or greater than the buffering offset or the minimum scheduling offset. The wireless device may transmit HARQ-ACK feedback in a slot n+8+K1 (e.g., n+13), where the HARQ-ACK feedbacks comprise NACKs for first two dropped PDSCHs, and ACK(s) and/or NACK(s) for last two PDSCHs (ACK if decoding is successful for a PDSCH or for a TB, NACK if decoding is unsuccessful for the PDSCH or for the TB).

For example, the wireless device may support one or more processing times (and/or one or more buffering offset capabilities) for a subcarrier spacing. Each of the one or more processing times may correspond to a maximum number of DCIs that the wireless device may receive in a span or a monitoring occasion or a slot or a PDCCH monitoring occasion. For example, the wireless device may support one or more processing times for a subcarrier spacing. Each of the one or more processing times may correspond to a search space type (e.g., CSS or USS, or CSS other than type2-PDCCH CSS and type-2PDCCH CSS and USS) or a group of search spaces (e.g., a search space group 1, a search space group 2). For example, a first processing time of the one or more processing times may apply to a first search space group. A second processing time of the one or more processing times may apply to a second search space group. For example, the first processing time may be faster (or slower) than the second processing time. For example, the first processing time may be 1 slot. The second processing time may be X based on a configured (X, Y) (e.g., a minimum time gap and a duration of a span). For example, the first processing time may be a largest value of X (among possible combinations of (X, Y) for a subcarrier spacing). The second processing time may be X based on the configured (X, Y). The first search space group may comprise one or more of a Type0-PDCCH CSS, Type0A-PDCCH CSS, Type1-PDCCH CSS, and Type2-PDCCH CSS. The second search space group may comprise one or more of a Type3-PDCCH CSS and USS(s). For example, the first search group may be configured via RRC signaling (e.g., one or more search spaces with a group index=0). The second search space group may be configured via RRC signaling (e.g., one or more search spaces with a group index=1). For example, the first group may comprise one or more search space configured/indicated with one or more fallback DCI formats (e.g., DCI format 0_0, DCI format 1_0). The second search space group may comprise one or more second search spaces configured/indicated with one or more non-fallback DCI formats (e.g., DCI format 0_1, DCI format 1_1, DCO format 0_2, DCI format 1_2) and group-common DCI formats (e.g., DCI format 2_0, DCI format 2_1, DCI format 2_2, DCI format 2_3, and/or the like).

For example, the wireless device may apply the first processing time (e.g., first minimum processing time and/or first minimum buffering offset) for one or more first DCIs CRC-scrambled with a first RNTI (e.g., first RNTI is one of SI-RNTI, RA-RNTI, P-RNTI, and/or a RNTI used for a broadcast/multicast/sidelink message). The wireless device may apply the second processing (e.g., second minimum processing time and/or second minimum buffering offset) time for one or more second DCIs CRC-scrambled with a second RNTI (e.g., the second RNTI is one of C-RNTI, CS-RNTI, C-MCS-RNTI, PI-RNTI, SFI-RNTI, INT-RNTI, and/or the like).

For example, one or more processing times may be determined based on one or more capabilities of PDCCH monitoring. For example, as shown in FIG. 26A, the wireless device may report one or more blind decoding capabilities for a combination of (X, Y). For example, the base station may determine a total number of blind decodings in a duration X that the wireless device supports as follows. For example, when X is 8, the base station may configure one or more search spaces with periodicity 1 or K<8 (e.g., K=2 or 4). A number of blind decodings of a monitoring occasion or a span based on the one or more search spaces may not exceed P (e.g., a number of BDs supported with X=1 or smaller than 8). The wireless device may determine P that is a BD capabilities of X1 where X1 is largest value among smaller values than X (e.g., 1 in FIG. 26A and P=2 in FIG. 26A). The wireless device may multiply P*(X/X1) to determine a total number of BDs based on the one or more search spaces regardless of one or more periodicities associated with or configured with the one or more search spaces. In an example, the wireless device may determine a total number of BDs based on the one or more periodicities of the one or more first search spaces (e.g., how many monitoring occasions within X for each search space of the one or more search spaces). For example, in FIG. 26A, the total number of BDs is 16. The wireless device may determine a remaining BD budget for one or more second search spaces configured for one or more periodicities greater than or equal to X (e.g., 8). The wireless device may subtract a capability (e.g., 20 with X=8) by the total number of BDs of smaller X1 values (e.g., 16). The wireless device may determine the remaining budgets for the one or more second search spaces.

In an example, the configuration parameters may indicate/comprise a value of (X, Y) for a cell among one or more (X, Y) values indicated by the wireless device. For example, (X, Y)=(3, 16) based on FIG. 26A. The wireless device may support a number of BDs, in a span with a minimum gap of X/2, with M(X/2)/S. The wireless device may be configured with one or more search spaces with one or more periodicities where each periodicity P1 is between X/2<=P1<X based on the number of BDs with the minimum gap of X/2 (e.g., based on (X/2, Y) span configuration). The number of BDs may be determined as M (X/2)/S, where M (X/2) is a BDs that the wireless device supports for a span configuration of (X/2, Y) (e.g., 20 in FIG. 26A) and S is a scaling factor (e.g., S=2). The number of BDs may be supported for (X/2, Y) may be 10 when (X, Y) is configured for the wireless device. The wireless device may be configured with the one or more search spaces where a number of blind decodings in a span (based on (X/2, Y)) is smaller than or equal to the number of BDs. For example, the scaling factor may be a first minimum gap X (e.g., a configured span gap) divided by a second minimum gap for a smaller span (e.g., the second minimum gap=X/2). For example, the wireless device may determine a second number of BDs for a third span (X/8, Y) as 2/8=0 (e.g., S=8) or 2/2=1 (e.g., S=2).

The wireless device may indicate a capability for a scaling factor for each (X, Y) pair and/or for each subcarrier spacing.

In an example, a wireless device may indicate (e.g., transmit a RRC signaling to a base station with a capability) a first BD capability for a single-slot PDCCH monitoring for a first SCS. The wireless device may, additionally, indicate a second BD capability for the single-slot PDCCH monitoring for the first SCS. The first BD capability may indicate a number of BDs that the wireless device may support when a multi-slot PDCCH monitoring is not enabled/configured. The second BD capability may indicate a number of BDs that the wireless device may support when the multi-slot PDCCH monitoring is enabled/configured. For example, the first BD capability may be 2 with 960 kHz. For example, the second BD capability may be 1 with 960 kHz. A base station may configure whether the single-slot PDCCH is enabled. The wireless device may apply the first BD capability in response to the multi-slot PDCCH monitoring is not enabled or configured. The wireless device may apply the second BD capability in response to the multi-slot PDCCH monitoring is enabled and the single-slot PDCCH monitoring is also enabled.

Before a RRC connection (e.g., at initial access procedure) or before the wireless device receives UE-specific RRC signaling or RRC messages, the wireless device may determine that a single-slot PDCCH monitoring is enabled. In an example, before the RRC connection or before receiving RRC messages or before being configured via UE-specific RRC signaling, the wireless device may assume the first BD capability for receiving Type0-PDCCH CSS, Type0A-PDCCH CSS, Type1-PDCCH CSS, and Type2-PDCCH CSS. The wireless device may assume the first BD capability for receiving scheduling DCIs for groupcast data (e.g., broadcast/multicast traffic). The wireless device may assume the first BD capability until a multi-slot PDCCH monitoring is enabled/configured. In an example, before the RRC connection, the wireless device may assume the second BD capability for receiving Type0-PDCCH CSS, Type0A-PDCCH CSS, Type1-PDCCH CSS, and Type2-PDCCH CSS. The wireless device may assume the second BD capability until the base station may indicate to configure/enable a single-slot PDCCH monitoring for one or more USSs.

For example, the first BD capability may correspond to an entry with index=4 in FIG. 26A or FIG. 26B (e.g., a single-slot PDCCH monitoring capability). The wireless device may indicate additional capability (e.g., the second BD capability). For example, the wireless device may support the second BD capability that may correspond to an entry with index=5 in FIG. 26A or FIG. 26B. The wireless device may indicate whether the wireless device supports a single-slot PDCCH monitoring occasion (e.g., based on the second BD capability) when a multi-slot PDCCH monitoring is enabled/configured.

The wireless device may determine a number of BDs, for one or more search spaces with one or more periodicities smaller than X, based on the second capability (in response to a multi-slot PDCCH monitoring is enabled). The wireless device may determine a second number of BDs, for one or more second search spaces with one or more second periodicity larger than or equal to X, based on a remaining capability. For example, the wireless device may determine the remaining capability as M (X, Y)–the second capability*X where M (X,Y) denotes a BD capability that the wireless device supports for a combination of (X, Y). For example, when X=8, M (8, Y)=20 in FIG. 26A. The wireless device may determine the remaining capability as 20−1*8=16. For example, the second BD capability may be 1 in the example.

Before RRC connection (e.g., at initial access procedure) or before the wireless device receives UE-specific RRC signaling or RRC messages a wireless device may determine that a multi-slot PDCCH monitoring is enabled, where a minimum time gap/separation (X) between two consecutive spans may be assumed as a pre-determined value (e.g., 8 for 960 kHz, 4 for 480 kHz, 2 for 240 kHz) or determined based on one or more possible values of X for a subcarrier space of an initial BWP of a cell. The wireless device may determine X as a largest (or smallest) among the one or more possible values of X for one or more combination (X, Y) for the subcarrier spacing. The one or more combinations may comprise combination(s) of (X, Y) regardless the wireless device supports or not. The wireless device may determine a duration (Y) of a span based on a second pre-determined value (e.g., 3) or based on a smallest (or a largest) among values of the one or more combinations.

Before RRC connection (e.g., at initial access procedure) or before the wireless device receives UE-specific RRC signaling or RRC messages a wireless device may receive a SIB indicating a combination of (X, Y) for an initial access procedure. The wireless device may determine a multi-slot PDCCH monitoring is enabled in response to X being larger than 1. The wireless device may determine a single-slot PDCCH monitoring is enabled in response to X being equal to 1. The wireless device may utilize the combination (X, Y) for a PDCCH monitoring capability/functionality until the wireless device may receive a reconfiguration message indicating a second combination (X, Y). The wireless device may update the configuration (X, Y) for a PDCCH monitoring configuration/capability.

In an example, a wireless device may identify a cell-defining SSB (e.g., based on RSRP of one or more SSBs) and may acquire a PBCH of the cell-defining SSB. The wireless device may read MIB via the PBCH. The wireless device may attempt to receive a DCI scheduling resources for a SIB1. The wireless device may monitor one or more candidates via Type0-PDCCH CSS. The wireless device may determine a combination of a minimum time gap (X) between two consecutive spans and a maximum duration (Y) of a span for Type0-PDCCH CSS based on one or more following examples. For example, a MIB/PBCH may indicate a value of (X, Y). For example, the MIB may indicate a value Y. For example, the MIB may indicate a sliding window N for the Type0-PDCCH CSS, where N may be same as Y. For example, the wireless device may determine a pre-defined combination of (X, Y) based on a subcarrier spacing of a coreset #0 (or initial BWP). For example, the pre-defined combination may be (8, 3) for 960 kHz and (4, 3) for 480 kHz. For example, the pre-defined combination may be (8, 1) for 960 kHz and (4, 1) for 480 kHz. Y may be a number of symbols. Y may be a number of slots. The wireless device may determine a combination of (X, Y) among one or more possible combinations of (X, Y) for the subcarrier spacing of the coreset #0, where the combination of (X, Y) may comprise a largest (or a smallest) X among the one or more possible combinations. When there are multiple combinations with a same largest (or smallest) X, the combination (X, Y) may comprise a smallest (or a largest) Y among the multiple combinations.

The wireless device may determine a second combination (X, Y) for other CSS in the initial BWP (e.g., Type0A-PDCCH CSS, Type1-PDCCH CSS, Type2-PDCCH-CSS). For a CSS, one or more following examples may be considered. For example, a SIB1 (or other SIB(s) at least for Type1-PDCCH CSS, and/or Type2-PDCCH CSS) may indicate a value of (X, Y). For example, the SIB (e.g., SIB1, or other SIB) may indicate a value Y. For example, the SIB (e.g., SIB1, or other SIB) may indicate a sliding window N for the CSS, where N may be same as Y. For example, the wireless device may determine a pre-defined combination of (X, Y) based on a subcarrier spacing of a coreset #0 (or initial BWP). For example, the pre-defined combination may be (8, 3) for 960 kHz and (4, 3) for 480 kHz. For example, the pre-defined combination may be (8, 1) for 960 kHz and (4, 1) for 480 kHz. For example, the pre-defined combination may be (1, 1) for 960 kHz and (1, 1) for 480 kHz. The wireless device may determine different combination of (X, Y) for different CSS (e.g., (X1, Y1) for Type1-PDCCH-CSS and (X2, Y2) for Type2-PDCCH-CSS). Y may be a number of symbols. Y may be a number of slots. The wireless device may determine a combination of (X, Y) among one or more possible combinations of (X, Y) for the subcarrier spacing of the coreset #0, where the combination of (X, Y) may comprise a largest (or a smallest) X among the one or more possible combinations. When there are multiple combinations with a same largest (or smallest) X, the combination (X, Y) may comprise a smallest (or a largest) Y among the multiple combinations. For example, the wireless device may determine the second combination (X, Y) is same as the combination (X, Y) for the Type0-PDCCH CSS. For example, the wireless device may determine the second combination (X, Y) for a CSS is same as the combination (X, Y) for the Type0-PDCCH CSS in response to the CSS being associated with the coreset #0. The SIB may indicate a value of (X, Y), of the second combination (X, Y), for a coreset that is not the coreset #0. A same (X, Y) may be used/assumed for one or more search spaces associated with a coreset.

The wireless device may determine a third combination (X, Y) for CSS other than CSS(s) used for initial access (e.g., Type0-PDCCH CSS, Type0A-PDCCH CSS, Type1-PDCCH CSS, Type2-PDCCH CSS) and/or USS based on one or more following examples. For example, the wireless device may determine the third combination (X, Y) may be same as the combination (X, Y) for the Type0-PDCCH CSS. The wireless device may determine the third combination (X, Y) may be same as the second combination (X, Y) for one or more of the Type0A-PDCCH CSS, Type1-PDCCH CSS and Type2-PDCCH CSS. The wireless device may receive a configuration parameter, via RRC signaling, indicating the third combination. The configuration parameter of the third combination may be configured for each search space or for the initial BWP. For different BWPs, different combination of (X, Y) may be configured. For different search spaces of a BWP, different combination of (X, Y) may be configured. For different coresets of a BWP, different combination of (X, Y) may be configured. For example, in initial BWP, the wireless device may assume the combination (X, Y), configured with or associated with the Type0-PDCCH CSS or for the coreset #0, may be used for one or more coresets/search spaces. The wireless device may be configured with a respective combination (X, Y) for other BWP (e.g., non-initial BWP).

In an example, a combination (X, Y) may be indicated based on a TDRA table for a cell. For example, the wireless device may determine a minimum value (smallest K0) among scheduling offsets (e.g., minimum value of possible k0 values) of entries of the TDRA table configured/specified for the cell. The wireless device may determine X that is equal to or smaller than the minimum value. When there are multiple (X, Y) combinations, which the wireless device supports, satisfies the condition (e.g., equal to or smaller than the minimum value (smallest K0)), the wireless device may determine a largest (or a smallest) X and/or a largest Y (or a smallest Y) among the multiple (X, Y) combinations. The wireless device may determine a predetermined value for Y. The wireless device may determine the X based on configured TDRA entries of the TDRA table regardless of whether a power saving technique is enabled or not or regardless whether some entries of the TDRA table may not be used. The wireless device may support a number of blind decoding based on the determined (X, Y) combination.

In an example, the wireless device may support, without a capability signaling (e.g., mandatory capability), one or more combinations (X, Y)=(a minimum time gap/separation between two consecutive spans, a maximum duration of a span) that are supported in initial access (e.g., the combination(s) for a Type0-PDCCH CSS, Type0A-PDCCH CSS, Type1-PDCCH CSS, Type2-PDCCH CSS)). The wireless device may receive configuration parameters indicating a first combination (X, Y) for the initial BWP. The wireless device may update a current combination (e.g., configured combination for the initial BWP) (X, Y) configuration for the initial BWP based on the first combination (X1, Y1) (e.g., the current combination (X, Y)=(X1, Y1)). The wireless device may determine a number of blind decodings/number of non-overlapped CCEs based on the current combination (X, Y). The wireless device may not expect that the first combination (X1, Y1) with a larger value X1 than X (e.g., current combination (X, Y) before update, X1<=X). The wireless device may update the current combination (X, Y) configuration for a BWP based on a most recent configuration of a second combination (X, Y).

The wireless device may not signal whether the wireless device supports the one or more combinations. In a BWP, other than initial BWP, the wireless device may be configured with one or more second combination (X, Y) for CSS(s) for DCI formats/DCIs scrambled with broadcast RNTI(s) (e.g., SI-RNTI, P-RNTI, RA-RNTI). The wireless device may update a (X, Y) configuration for the BWP based on the first combination (X1, Y1). The wireless device may determine a number of blind decodings/number of non-overlapped CCEs based on the first combination (X1, Y1). The wireless device may not expect that the first combination (X1, Y1) with a larger value X1 than X (e.g., X1<=X). The wireless device may update the (X, Y) configuration for a BWP based on a most recent configuration of a second combination (X, Y).

In an example, a number of DCIs scheduled via a PDCCH monitoring occasion/a span/a slot based on broadcast RNTIs (e.g., SI-RNTI, P-RNTI, RA-RNTI) or groupcast RNTI (e.g., SFI-RNTI, INT-RNTI, and/or like) or multicast RNTI (e.g., SC-PTM RNTI, MBS-RNTI, and/or like) may be limited to one.

Example embodiments may enable to multiplex/mix single-slot PDCCH and a multi-slot PDCCH transmissions without increasing complexity of a wireless device. Example embodiments may enhance scheduling flexibility by a base station.

In an example, a wireless device may determine a first buffering offset or a first minimum scheduling offset for a combination of (X, Y) of a SCS. The wireless device may determine a second buffering offset or a second minimum scheduling offset for the combination of (X, Y) of the SCS. In the example, the X may be larger than 1 (e.g., a multi-slot PDCCH monitoring is enabled). In the example the SCS may be greater than 120 kHz. For example, the combination of (X, Y) may be configured to the wireless device via RRC signaling, where the combination of (X, Y) may be one of one or more combinations of (X, Y) that the wireless device supports for the SCS. For example, the wireless device may determine the combination of (X, Y) of the one or more combinations of (X, Y) based on one or more configuration parameters of an active BWP of a cell. The active BWP of the cell may be configured with the SCS. The one or more configuration parameters may comprise one or more search spaces and/or one or more coresets. For example, the wireless device may determine X as a minimum periodicity of the one or more search spaces. For example, the wireless device may determine Y as a maximum duration of spans based on the one or more search spaces.

The wireless device determine the X based on one or more second search spaces of the one or more search spaces. The one or more second search spaces may comprise one or more USSs. The one or more second search spaces may not comprise one or more CSSs. The one or more second search spaces may be the second search space group (e.g., search spaces configured with non-fallback DCI formats, USSs, based on RRC signaling).

The wireless device may apply the first buffering offset or the first minimum scheduling offset for DCIs scheduled via one or more first search spaces of the one or more search spaces. The one or more search spaces may comprise search space(s) configured for an active BWP of a cell, where the wireless device receives DCIs scheduling resources for the cell and/or where the wireless device receives DCIs via the cell. The one or more first search spaces may be the first search space group. The one or more second search spaces may be the second search group. The active BWP may be configured/indicated/associated with one or more search space groups. A search space of the one or more search spaces of the active BWP may belong to a search space group of the one or more search space groups. When a single search space group is configured or search space group is not configured, the wireless device may assume the first one or more search spaces may be equal to the one or more search spaces.

The wireless device may receive a first DCI indicating a first scheduling offset (K0 #1) via a search space of the one or more first search spaces, where the first scheduling offset is greater than or equal to the first buffering offset or the first minimum scheduling offset. The wireless device may receive a second DCI indicating a second scheduling offset (K0 #2) via a search space of the one or more second search spaces, where the second scheduling offset is greater than or equal to the second buffering offset or the second minimum scheduling offset. The wireless device may determine a minimum scheduling offset differently for each search space group or for each search space or for each coreset. The wireless device may determine a minimum scheduling offset differently for each DCI format (e.g., the first minimum scheduling offset for a fallback DCI format 1_0, and the second minimum scheduling offset for a non-fallback DCI format 1_1 or 1_2).

The first buffering offset or the first minimum scheduling offset may be determined based on a first processing capability (e.g., for the first search space group, the first search space type such as CSS, the first DCI format(s) such as fallback DCI format(s)). The second buffering offset or the second minimum scheduling offset may be determined based on a second processing capability (e.g., for the second search space group, the second search space type such as USS, the second DCI format(s) such as non-fallback DCI format(s)). The first buffering offset may be smaller than the second buffering offset. The first buffering offset may be larger than the second buffering offset.

Figure 30:
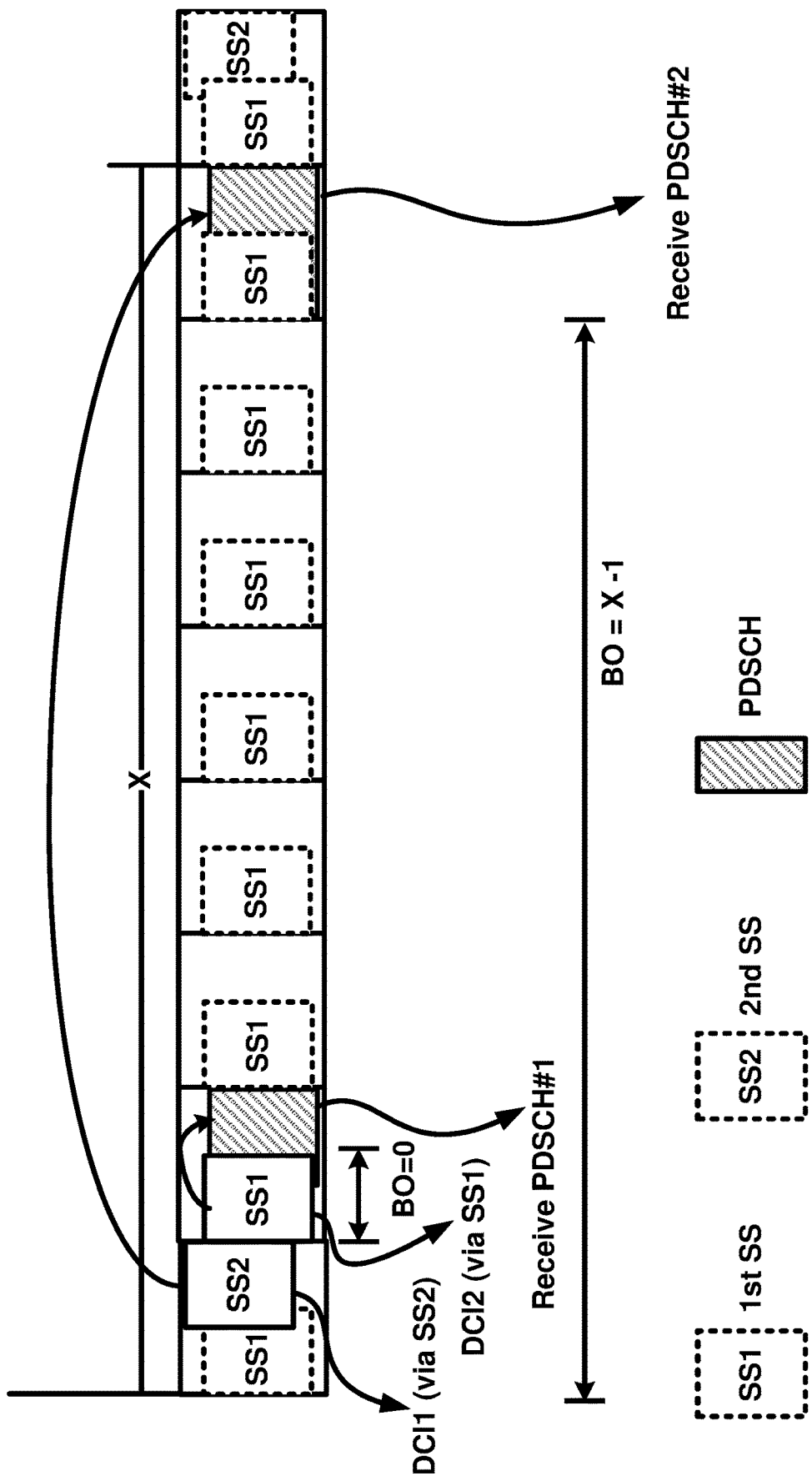
FIG. 30 illustrates an example embodiment as per an aspect of an embodiment of the present disclosure.

FIG. 30 illustrates an example embodiment as per an aspect of an embodiment of the present disclosure. The base station may transmit one or more RRC messages indicating configuration parameters. The configuration parameters may comprise/indicate a first search space (SS1) and a second search space (SS2) for a BWP of a cell. The BWP may be an active BWP of the cell. The first search space may be configured with a first periodicity P1=1 slot. The second search space may be configured with a second periodicity P2=X. For example, the first search space may belong to a first search space group. For example, the second search space may belong to a second search space group. Though not shown in FIG. 30, the first search space group and the second search group may switch via a DCI and/or MAC CE. For example, the DCI and/or MAC CE may indicate switching from the first search space group to the second search space group (and vice versa). The wireless device may activate one search space group at a given time.

The wireless device may determine a first buffering offset or a first minimum scheduling offset for the first search space group or the first search space. The wireless device may determine a second buffering offset or a second minimum scheduling offset for the second search space group or the second search space. The first search space may be a CSS. The second search space may be an USS. The first search space may be associated with a fallback DCI format 1_0. The second search space may be associated with a non-fallback DCI format e.g., 1_1.

For example, the first buffering offset/minimum scheduling offset may be 0. The wireless device may support a same-slot scheduling for the first search space group. For example, the second buffering offset/minimum scheduling offset may be X−1 (e.g., X=8). The wireless device receives a first DCI (DCI1) via the second search space at a slot n. The wireless device may apply the second minimum scheduling offset for the first DCI (e.g., 8). The wireless device may drop a PDSCH scheduled by the DCI in response to a scheduling offset between the first DCI and the PDSCH being smaller than X−1 (e.g., the second buffering offset or the second minimum scheduling offset). The wireless device may attempt to decode a PDSCH scheduled by the first DCI in response to a scheduling offset between the first DCI and the PDSCH being equal to or larger than X-1 (e.g., the second buffering offset or the second minimum scheduling offset). In FIG. 30, the wireless device may receive a second PDSCH (PDSCH #2) scheduled at a slot n+X-1 as a scheduling offset for the second PDSCH being equal to the X-1. The wireless device may determine a first slot where the wireless device receives the second PDSCH based on a scheduling/slot offset indicated by the first DCI (e.g., k0=0) and the second minimum scheduling offset (e.g., k0+the first BO).

The wireless device may receive a second DCI (DCI2) via the first search space at a slot n+1. The wireless device may apply the first minimum scheduling offset for the second DCI (DCI2). The first minimum scheduling offset may be zero. The wireless device may support a same-slot scheduling for the second DCI. The wireless device may receive a first PDSCH (PDSCH #1) via the slot n+1 as a scheduling gap between the second DCI and the first PDSCH being equal to the first minimum scheduling offset. The wireless device may determine a second slot where the wireless device receives the first PDSCH based on a scheduling/slot offset indicated by the second DCI (e.g., k0=0) and the first minimum scheduling offset (e.g., k0+the first BO).

The wireless device may determine one or more buffering offset or one or more minimum scheduling offsets for a BWP of a cell. The wireless device may apply the one or more buffering offset or the one or more minimum scheduling offsets associated with an active BWP of the cell.

In an example, a BWP may be configured with or associated with a plurality of groups. A wireless device may determine a plurality of minimum scheduling offsets, where each minimum scheduling offset may be applied for a group of the plurality of groups. For example, the wireless device may determine the plurality of groups based on one or more search spaces. A group may comprise search space(s) with periodicity(s) being smaller than or equal to a first threshold (e.g., 1 slot). A second group may comprise search space(s) with periodicity(s) being larger than the first threshold and being smaller than or equal to a second threshold (e.g., X slots).

The wireless device may determine the plurality of groups based on one or more coresets (e.g., the plurality of groups may correspond to a plurality of coreset pools, where each group of the plurality of groups may be a coreset pool of the plurality of coreset pools). A different minimum scheduling offset may be applied for each TRP and/or each panel and/or each coreset pool. For example, a group may comprise a coreset with an index<P. Another group may comprise a coreset with an index>=P.

For example, the wireless device may determine the plurality of groups based on a BWP index. For example, the wireless device may determine an initial BWP as a first group and may apply a first minimum scheduling offset. The wireless device may determine non-initial BWP as a second group and may apply a second minimum scheduling offset.

For example, the wireless device may determine the plurality of groups based on a subcarrier space of a BWP. For example, a first group may comprise one or more BWPs with SCS<=240 kHz. A second group may comprise one or more BWPs with SCS>240 and SCS<=480 kHz. A third group may comprise one or more BWPs with SCS>480 kHz. The wireless device may determine a first minimum scheduling offset (e.g., zero) for the first group. The wireless device may determine a second minimum scheduling offset (e.g., 4) for the second group. The wireless device may determine a third minimum scheduling offset (e.g., 8) for the third group.

Example embodiments may allow flexible scheduling by a base station. Example embodiments may support efficient multiplexing of cell broadcast scheduling and unicast scheduling.

Figure 31:
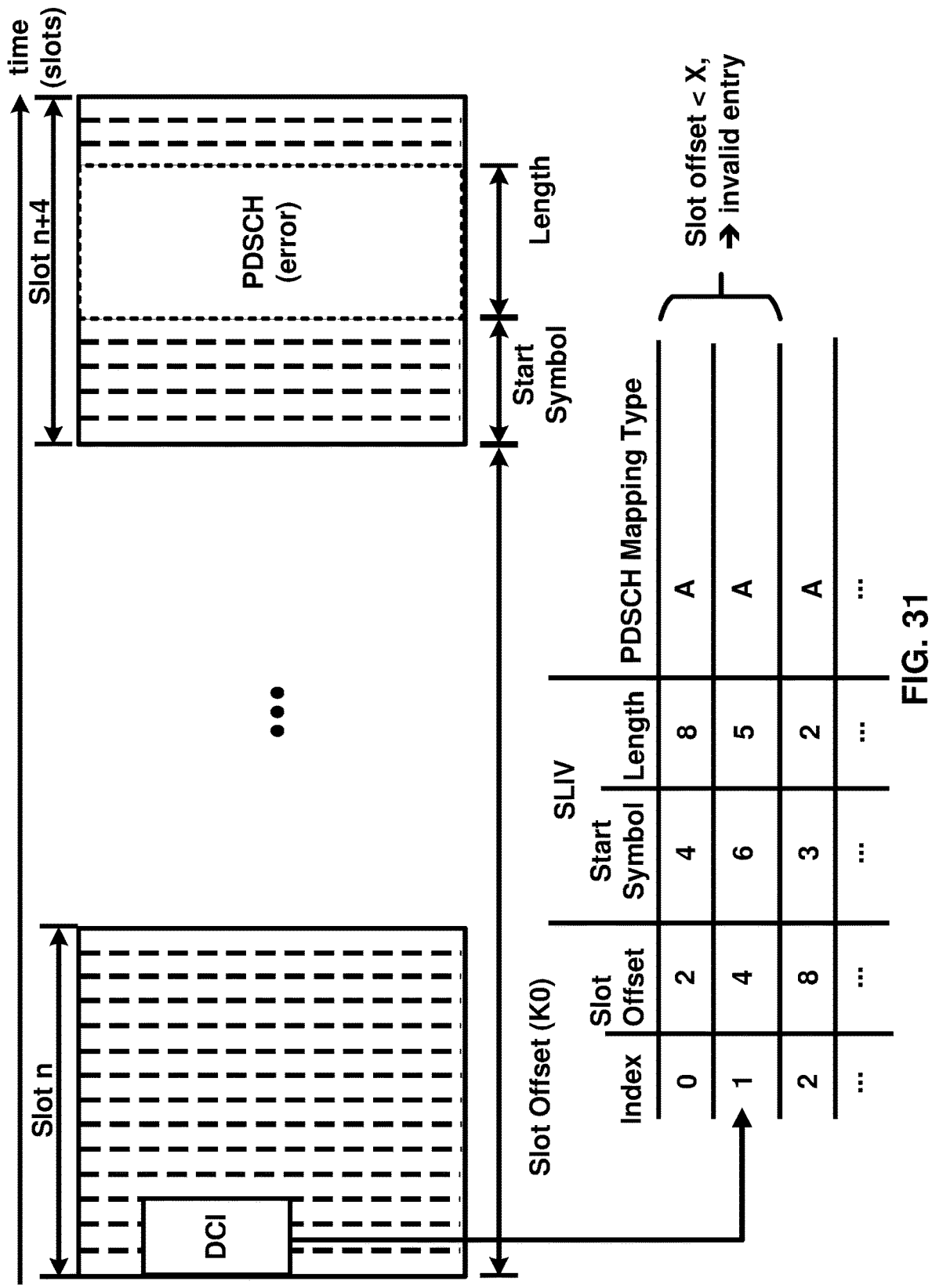
FIG. 31 illustrates an example embodiment as per an aspect of an embodiment of the present disclosure.

In an example, a wireless device may apply a minimum scheduling offset or a buffering offset for a DCI based on one or more examples. The one or more examples may comprise cases shown in FIG. 31-32. FIG. 31 illustrates an example embodiment as per an aspect of an embodiment of the present disclosure.

The wireless device may be configured with a list of TDRA entries or a TDRA table. For example, a DCI, transmitted in a slot n, may indicate second entry of the TDRA table (e.g., an index=1). The wireless device may determine a minimum scheduling offset or a buffering offset as 8 based on a multi-slot PDCCH monitoring capability of (8, Y). In FIG. 31, the X may be 8. The second entry may indicate a slot offset (e.g., a scheduling offset)=4, a SLIV value indicating that a starting symbol is 6 and a duration/length is 5. Based on the second entry, scheduled resources for a PDSCH by the DCI may be present in a slot n+4 (e.g., between OFDM symbols 6-11). The wireless device may determine the second entry as invalid for the DCI, in response to the slot offset/scheduling offset being smaller than a processing time (d) or X (e.g., a minimum gap for two consecutive spans). The wireless device may receive a second DCI indicating the second entry, where a second minimum scheduling offset for the second DCI may be smaller than 4. The wireless device may consider a PDSCH, scheduled by the second DCI with the second entry of the TDRA table, being valid in response to the slot offset/scheduling offset of the second entry being smaller than the second minimum scheduling offset.

The wireless device may determine a validity of a PDSCH scheduled by a DCI, configured/associated/applied with a minimum scheduling offset, indicating a scheduling offset. For example, the wireless device may determine the PDSCH is valid in response to the scheduling offset being larger than or equal to the minimum scheduling offset. The wireless device may determine the PDSCH is invalid in response to the scheduling offset being smaller than to the minimum scheduling offset.

In FIG. 31, the wireless device may determine the scheduled PDSCH invalid and may drop the PDSCH. The wireless device may transmit a feedback (e.g., NACK) for the dropped PDSCH.

In an example, a wireless device may ignore one or more TDRA entries of the TDRA table, where a scheduling/slot offset of a TDRA entry of the one or more TDRA entries is smaller than a minimum scheduling offset. The wireless device may increment an index of an TDRA entry for one or more second TDRA entries that are not ignored (or that are not invalidated). For example, in FIG. 31, a first entry and the second entry may be ignored or invalidated. An index=0 may start from a third entry where a scheduling offset is equal to the minimum scheduling offset. The wireless device may determine an index among the one or more second TDRA entries. The wireless device may determine a first set of the one or more second TDRA entries for the first search space group. The wireless device may determine a second set of the one or more second TDRA entries for the first search space group. For example, the first set may comprise one or more third TDRA entries with a scheduling offset>=a first minimum scheduling offset. For example, the second set may comprise one or more fourth TDRA entries with a scheduling offset>=a second minimum scheduling offset.

Figure 32:
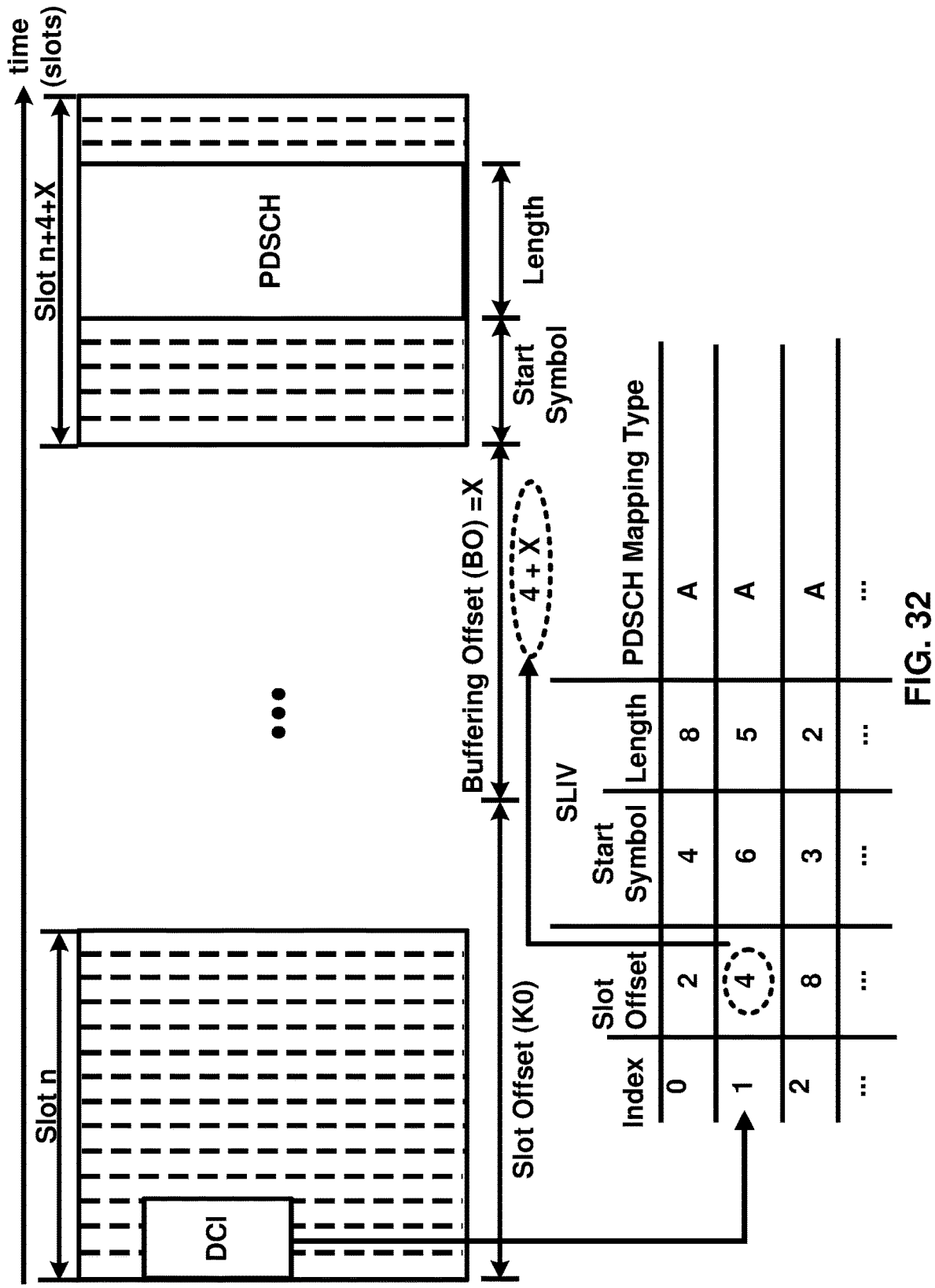
FIG. 32 illustrates an example embodiment as per an aspect of an embodiment of the present disclosure.

FIG. 32 illustrates an example embodiment as per an aspect of an embodiment of the present disclosure. In an example, a wireless device may determine a scheduling offset for a PDSCH scheduled by a DCI based on a slot/scheduling offset of a TDRA entry and a minimum scheduling offset or a buffering offset. For example, the scheduling offset may be determined as a sum of the slot/scheduling offset of the TDRA entry and the minimum scheduling offset (or the buffering offset). The DCI may indicate the TDRA entry. For example, the DCI may indicate an index=1 (e.g., 2nd entry of the TDRA table). The wireless device may determine the scheduling offset for the PDSCH as a sum of K0 and B0 (e.g., the scheduling offset=K0+X). The wireless device may determine resources of the PDSCH via a slot n+4+X based on the scheduling offset. For example, when the DCI indicates a third entry (e.g., index=2), the wireless device may determine a scheduling offset as 8+X (e.g., a slot offset+the minimum scheduling offset).

The wireless device may determine a first scheduling offset for a first PDSCH scheduled via a first DCI. The wireless device may determine a second scheduling offset for a second PDSCH scheduled via a second DCI. The first DCI may indicate a TDRA entry. The second DCI may indicate the TDRA entry. The TDRA entry may comprise a slot offset k0 and a SLIV value. The wireless device may determine the first scheduling offset as a sum of k0 and a first minimum scheduling offset. The wireless device may determine the second scheduling offset as a sum of K0 and a second minimum scheduling offset. For example, the first minimum scheduling offset may be determined based on the first search space group. The second minimum scheduling offset may be determined based on the second search space group.

In an example, a wireless device may receive one or more RRC messages indicating configuration parameters for a power saving technique such as a cross-slot scheduling. The configuration parameters may indicate a minimum scheduling offset for a BWP of a cell for the cross-slot scheduling. The wireless device may receive a DCI indicating enabling or disabling the minimum scheduling offset for the BWP. In response to receiving the DCI indicating enabling the minimum scheduling offset (e.g., enabling the cross-slot scheduling), the wireless device may ignore one or more time domain resource allocation entries, scheduled by a non-fallback DCI format, where a slot/scheduling offset is smaller than or equal to the minimum scheduling offset. The wireless device may determine a buffering offset based on a capability of the wireless device. The wireless device may determine a scheduling offset for a PDSCH based on the scheduling offset by a TDRA entry indicated by a scheduling DCI and the buffering offset. The base station may not disable applying the buffering offset at least for one or more combinations of (X, Y). When the base station disables the buffering offset, the wireless device may drop one or more PDSCHs with smaller scheduling gap/offset than the buffering offset.

Example embodiments may allow flexible scheduling by a base station. Example embodiments may increase reliability based on feedbacks by a wireless device when data is dropped.

Figure 33:
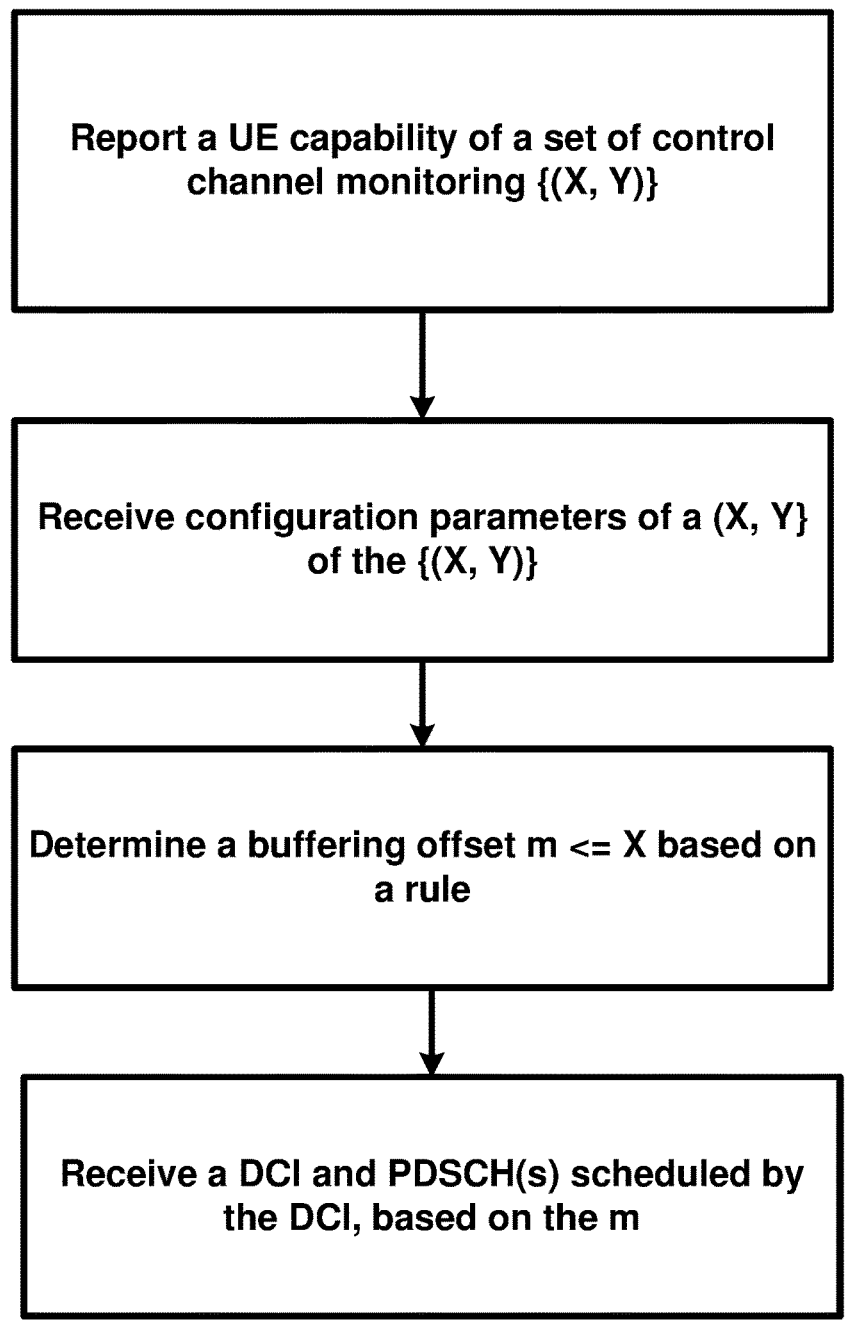
FIG. 33 illustrates a flow diagram of an example embodiment as per an aspect of an embodiment of the present disclosure.

FIG. 33 illustrates a flow diagram of an example embodiment as per an aspect of an embodiment of the present disclosure. The wireless device may report (e.g., indicate) a wireless device capability comprising a set of downlink control channel monitoring for one or more combinations of (X, Y). For example, X may represent a minimum time gap/separation between two spans (e.g., consecutive). Y may represent a maximum duration of a span. For example, X may indicate a sliding window size N. Y may be fixed as a slot. The wireless device may receive one or more RRC messages comprising configuration parameters. The configuration parameters may indicate/comprise a first X and a first Y from the one or more combinations (X, Y). The wireless device may determine a buffering offset m based on a rule, wherein the buffering offset is smaller than or equal to X. The wireless device may receive a DCI and one or more PDSCHs scheduled by the DCI based on m.

Figure 34:
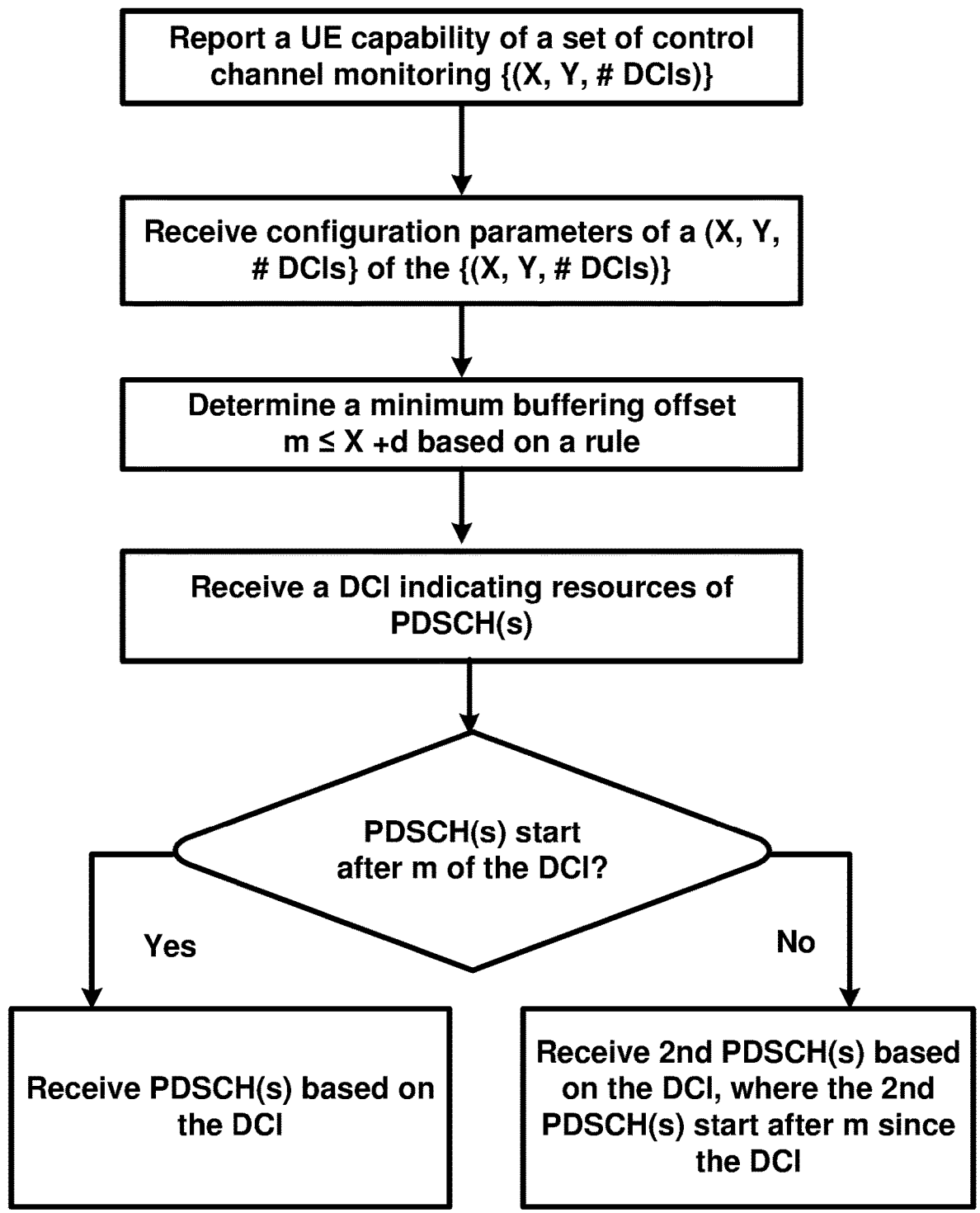
FIG. 34 illustrates a flow diagram of an example embodiment as per an aspect of an embodiment of the present disclosure.

FIG. 34 illustrates a flow diagram of an example embodiment as per an aspect of an embodiment of the present disclosure. The wireless device may report (e.g., indicate) a wireless device capability comprising a set of downlink control channel monitoring for one or more combinations of (X, Y, M). For example, X may represent a minimum time gap/separation between two spans (e.g., consecutive). Y may represent a maximum duration of a span. For example, M may represent a maximum number of DCIs that the wireless device may support to receive via a PDCCH monitoring occasion, a span, a slot, or Y slots. For example, X may indicate a sliding window size N. Y may be fixed as a slot. The wireless device may receive one or more RRC messages comprising configuration parameters. The configuration parameters may indicate/comprise a first X, a first Y and a first M from the one or more combinations (X, Y, M). The wireless device may determine a buffering offset m based on a rule, wherein the buffering offset is smaller than or equal to a sum of X and an additional margin (d). The wireless device may determine the additional margin based on the first M. For example, the additional margin may be zero when the number of M is one. For example, the additional margin may be greater than zero when the number of M is greater than zero.

The wireless device may receive a DCI and one or more PDSCHs scheduled by the DCI based on m. For example, the wireless device may determine whether the one or more PDSCHs start after m from a slot when the wireless device receives the DCI. The wireless device may receive the one or more PDSCHs in response to the one or more PDSCHs starting after m. The wireless device may receive one or more second PDSCHs of the one or more PDSCHs, where the one or more second PDSCHs start after m from the slot. The wireless device may drop one or more third PDSCHs of the one or more PDSCHs, where the one or more third PDSCHs start before m since the receiving the DCI. The wireless device may transmit negative feedbacks for the one or more third PDSCHs. The wireless device may transmit feedbacks for the one or more second PDSCHs. The wireless device may transmit feedbacks for the one or more PDSCHs.

Figure 35:
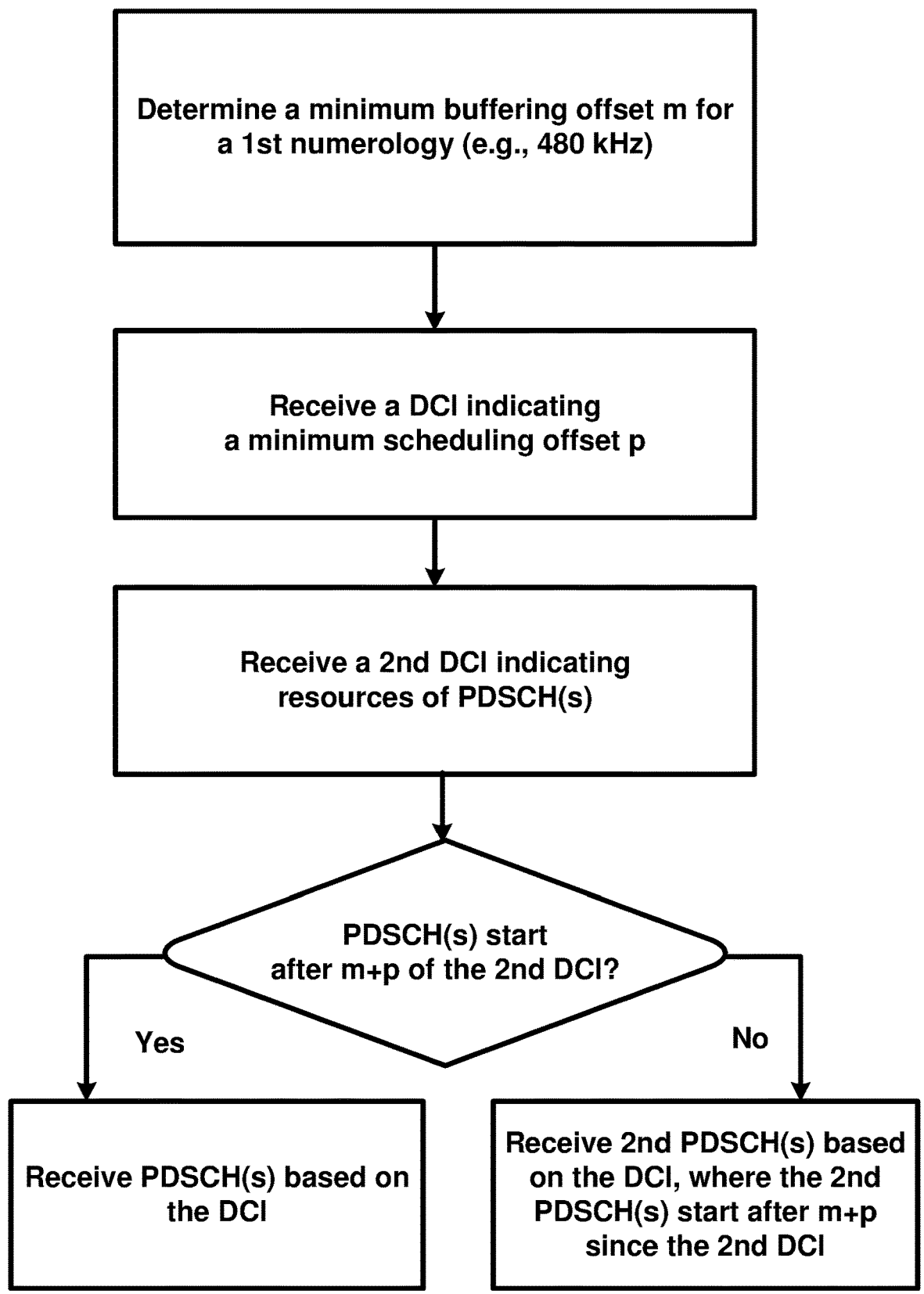
FIG. 35 illustrates a flow diagram of an example embodiment as per an aspect of an embodiment of the present disclosure.

FIG. 35 illustrates a flow diagram of an example embodiment as per an aspect of an embodiment of the present disclosure. The wireless device may determine a minimum buffering offset or a buffering offset m for a first numerology or a first SCS. The first numerology or the first SCS is for an active BWP of a cell. The wireless device may receive a DCI, for the active BWP of the cell, indicating a minimum scheduling offset p. The minimum scheduling offset may be applied to enable a cross-slot scheduling for power saving. The wireless device may expect that a PDSCH scheduled by a scheduling DCI may be scheduled at least after the minimum scheduling offset since receiving the scheduling DCI for the cell. The wireless device may receive a second DCI, via the active BWP of the cell, indicating resources of one or more PDSCHs via the cell.

The wireless device may determine whether the one or more PDSCHs start after m+p since receiving the second DCI. In response to the one or more PDSCHs starting after m+p since the receiving the second DCI, the wireless device may receive the one or more PDSCHs. The wireless device may attempt to decode one or more transport blocks carried via the one or more PDSCHs. The wireless device may receive one or more second PDSCHs, if any, of the one or more PDSCHs, where the one or more second PDSCHs start after m+p since the receiving the second DCI. The wireless device may drop one or more third PDSCHs of the one or more PDSCHs, where the one or more third PDSCHs start before m+p since the receiving the second DCI. The wireless device may transmit negative feedbacks for the one or more third PDSCHs. The wireless device may transmit feedbacks for the one or more second PDSCHs. The wireless device may transmit feedbacks for the one or more PDSCHs.

Figure 36:
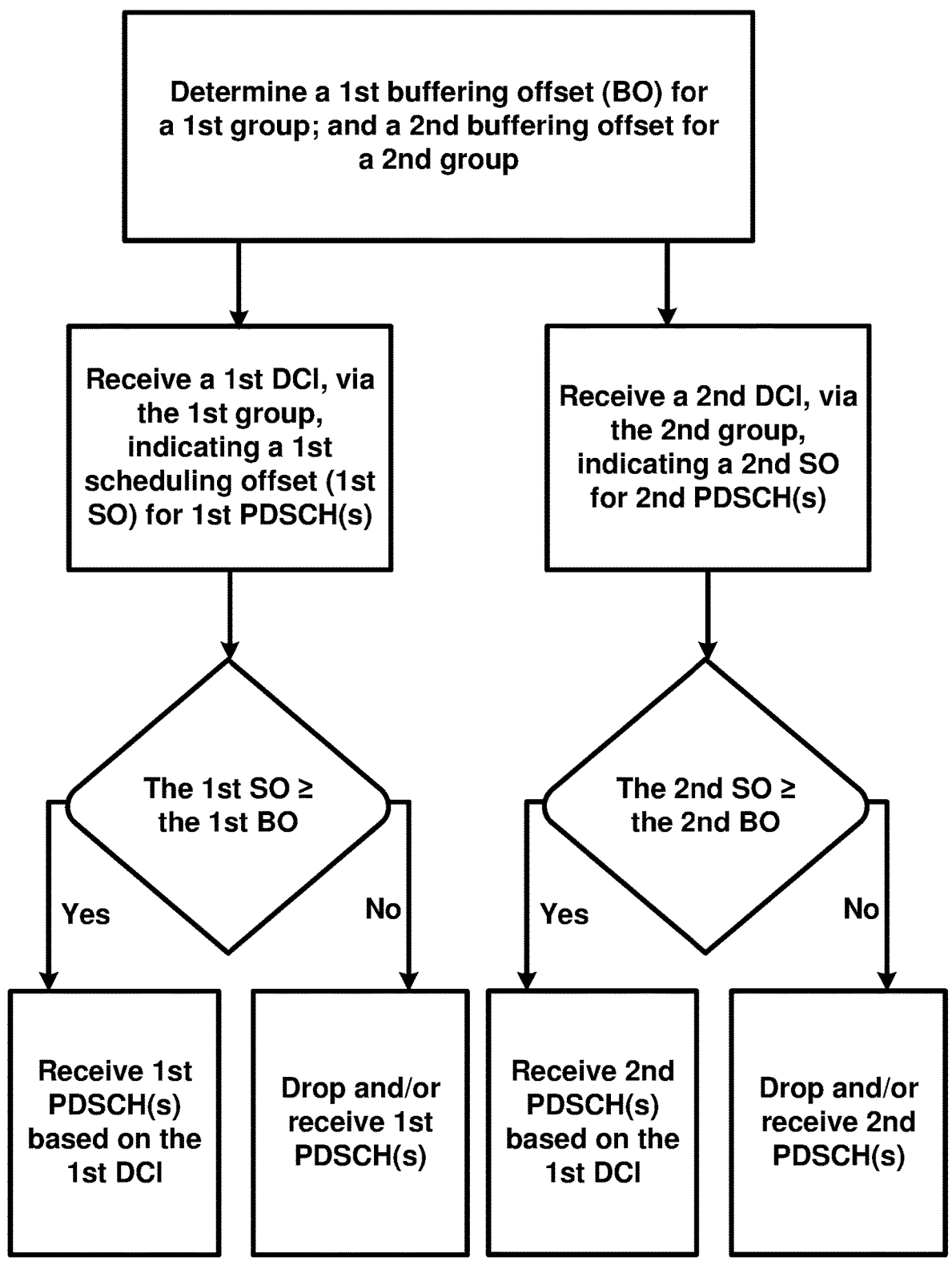
FIG. 36 illustrates a flow diagram of an example embodiment as per an aspect of an embodiment of the present disclosure.

FIG. 36 illustrates a flow diagram of an example embodiment as per an aspect of an embodiment of the present disclosure. In an example, the wireless device may receive configuration parameters for a multi-slot PDCCH monitoring based on a self-carrier scheduling. The configuration parameters may indicate a minimum time gap/separation (X) between two consecutive spans, where X is larger than 1. The wireless device may determine a first buffering offset or a first minimum buffering offset or a first minimum scheduling offset for a first group. The wireless device may determine a second buffering offset or a second minimum buffering offset or a second minimum scheduling offset for a second group. For example, the first group may comprise one or more common search spaces. For example, the second group may comprise one or more UE-specific search spaces. The wireless device may receive a first DCI, via the first group, indicating a first scheduling offset for one or more first PDSCHs. The wireless device may determine whether the first scheduling offset is larger than or equal to the first minimum scheduling offset or the first buffering offset in response to the receiving the first DCI via the first group. The wireless device may receive the one or more first PDSCHs in response to the first scheduling offset being larger than or equal to the first buffering offset. Otherwise, the wireless device may receive one or more third PDSCHs of the one or more first PDSCHs, wherein a gap between the DCI and the one or more third PDSCHs is larger than or equal to the first buffering offset.

The wireless device may receive a second DCI, via the second group, indicating a second scheduling offset for one or more second PDSCHs. The wireless device may determine whether the second scheduling offset is larger than or equal to the second minimum scheduling offset or the second buffering offset in response to the receiving the second DCI via the second group. The wireless device may receive the one or more second PDSCHs in response to the second scheduling offset being larger than or equal to the second buffering offset. Otherwise, the wireless device may receive one or more fourth PDSCHs of the one or more second PDSCHs, wherein a gap between the DCI and the one or more fourth PDSCHs is larger than or equal to the second buffering offset.

According to an embodiment, a wireless device transmits a set indicating a wireless device capability of a downlink control channel monitoring. The set may comprise one or more combinations of a span duration Y and a minimum time gap X between two consecutive spans for the wireless device capability. The wireless device may receive configuration parameters comprising a combination of a first minimum time gap X and a first span duration Y of the set. The wireless device may determine a buffering offset based on the combination of the first minimum time gap X and the first span duration Y. The buffering offset may be smaller than or equal to the first minimum time gap X. The wireless device may receive one or more physical downlink shared channels (PDSCHs) scheduled via a downlink control information (DCI) based on the buffering offset.

In an embodiment, the span comprises one or more consecutive symbols in a slot.

In an embodiment, a monitoring occasion of a search space is within the span.

In an embodiment, the span comprises one or more monitoring occasions.

In an embodiment, the span comprises one or more consecutive slots, wherein a number of the one or more consecutive slots is smaller than or equal to minimum time gap X.

In an embodiment, a monitoring occasion of a search space is within a slot of the span.

In an embodiment, the span comprises one or more monitoring occasions.

In an embodiment, the configuration parameters indicate a multi-slot downlink control channel monitoring based on the first minimum time gap X and the first span duration Y.

In an embodiment, the wireless device may determine a number of blind decoding that the wireless device supports in a duration X slots based on the first minimum time gap X and the first span duration Y.

In an embodiment, the wireless device may determine a processing time of the DCI based on the first X and the first span duration Y, wherein the processing time is minimum time gap X.

In an embodiment, the wireless device may determine a second processing time of a second DCI, wherein the second processing time is smaller than minimum time gap X.

In an embodiment, the wireless device may receive the second DCI via a search space, wherein the search space is a common search space.

In an embodiment, the wireless device may receive the second DCI based on a first DCI format, wherein the first DCI format is a DCI format 1_0.

In an embodiment, the wireless device may receive the second DCI based on a first radio network temporary identifier (RNTI), wherein the first RNTI is one of system information-RNTI (SI-RNTI), paging-RNTI (P-RNTI), and random access-RNTI (RA-RNTI).

In an embodiment, the wireless device may enable the buffering offset in response to receiving the combination of the first minimum time gap X and the first span duration Y.

In an embodiment, the wireless device may drop one or more second PDSCHs with smaller scheduling offsets than the buffering offset.

In an embodiment, the wireless device may transmit one or more negative acknowledgment corresponding to the dropped one or more second PDSCHs.

According to an embodiment, a wireless device may determine a buffering offset for a cell with a first subcarrier spacing. The buffering offset may be greater than zero and the first subcarrier spacing may be greater than 240 kHz. The wireless device may receive configuration parameters indicating one or more minimum scheduling offset values for the cell. The wireless device may receive a downlink control information (DCI) activating a value of the one or more minimum scheduling offset values. The wireless device may determine an allowed scheduling offset based on the value of the one or more minimum scheduling offset values and the buffering offset. The wireless device may decode downlink data based on receiving one or more physical downlink shared channels (PDSCHs) scheduled by a second DCI and based on the allowed scheduling offset.

According to an embodiment, a wireless device may receive one or more radio resource control (RRC) messages comprising configuration parameters. The configuration parameters may indicate enabling a multi-slot downlink control channel monitoring with a minimum time separation X between two consecutive spans. The minimum time separation X may be larger than 1. The configuration parameters may indicate a first search space group and a second search space group. The first search space group may comprise a first search space, and the second search space group may comprise a second search space. The wireless device may determine based on one or more wireless device capabilities a first minimum scheduling offset for the first search space group, and a second minimum scheduling offset for the second search space group. The wireless device may receive a first downlink control information (DCI), via the first search space in a first slot, indicating a first scheduling offset, and the wireless device may receive a second DCI, via the second search space in a second slot, indicating a second scheduling offset. The second scheduling offset may be the same or different from the first scheduling offset. The wireless device may determine: a third slot to receive a first PDSCH by summing the first minimum scheduling offset and the first scheduling offset; and a fourth slot to receiving a second PDSCH by summing the second minimum scheduling offset and the second scheduling offset. The wireless device may receive the first PDSCH via the third slot and the second PDSCH via the fourth slot. The wireless device may decode downlink data via the first PDSCH and the second PDSCH.

In an embodiment, the first search space is a common search space (CSS).

In an embodiment, the second search space is a UE-specific search space (USS).

In an embodiment, the wireless device may transmit the one or more wireless device capabilities to a base station.

In an embodiment, the first search space group comprises one or more common search spaces, which comprises the first search space, of a bandwidth part of a cell.

In an embodiment, the second search space group comprises one or more UE-specific search spaces, which comprises the second search space, of the bandwidth part of the cell.

In an embodiment, the first search group comprises one or more first search spaces, which comprises the first search space, of a bandwidth part of a cell, wherein the one or more first search spaces are configured with a fallback DCI format.

In an embodiment, the second search group comprises one or more second search spaces, which comprises the second search space, of the bandwidth part of the cell, wherein the one or more second search spaces are configured with a non-fallback DCI format.

In an embodiment, the first search group comprises one or more first search spaces, which comprises the first search space, of a bandwidth part of a cell, wherein the one or more first search spaces are associated with a first control resource set (coreset) pool.

In an embodiment, the second search group comprises one or more second search spaces, which comprises the second search space, of the bandwidth part of the cell, wherein the one or more second search spaces are associated with a second coreset pool.

In an embodiment, the configuration parameter comprising one or more first search spaces, comprising the first search space, for the first search space group.

In an embodiment, the configuration parameter comprising one or more second search spaces, which comprises the second search space, for the second search space group.

In an embodiment, the first minimum scheduling offset is zero.

In an embodiment, the second minimum scheduling offset is greater than zero.

According to an embodiment, a wireless device may determine based on one or more capabilities of the wireless device a first slot to receive a first PDSCH and a second slot to receive a second PDSCH. The first slot may be determined by summing a first minimum scheduling offset for a first search space group and a first scheduling offset. The first scheduling offset may be indicated by a first downlink control information (DCI) via a first search space of the first space group. The second slot may be determined by summing a second minimum scheduling offset for a second search space group and a second scheduling offset. The second scheduling offset may be indicated by a second DCI via a second search space of the second space group. The second scheduling offset may be the same or different from the first scheduling offset. The wireless device may receive the first PDSCH via the first slot and the second PDSCH via the second slot.

According to an embodiment, a wireless device may receive a synchronization signal and physical broadcast channel block (SSB) for a cell. The wireless device may determine a minimum time separation between two spans of downlink control channel monitoring based on a subcarrier spacing, of a control resource set (coreset) with a predetermined index, being equal to or higher than a threshold. The wireless device may determine a minimum scheduling offset based on the minimum time separation. The wireless device may receive data scheduled via a downlink control information (DCI) based on the minimum scheduling offset.

In an embodiment, the DCI is scrambled with a first radio network temporary identifier (RNTI).

In an embodiment, the first RNTI comprises one of system information RNTI (SI-RNTI), paging RNTI (P-RNTI), random access RNTI (RA-RNTI).

In an embodiment, the minimum time separation is greater than one slot.

In an embodiment, the predetermined index is zero.

In an embodiment, the threshold is 240 kHz.

In an embodiment, the minimum time separation is eight in response to the subcarrier spacing being 960 kHz.

In an embodiment, the minimum time separation is eight in response to the subcarrier spacing being 480 kHz.

In an embodiment, a time offset between resources of data and a slot of the DCI is greater than or equal to the minimum scheduling offset.

In an embodiment, the minimum scheduling offset is a value that the minimum time separation is subtracted by 1.

In an embodiment, the wireless device may determine a number of blind decodings, of an initial bandwidth part of the cell, based on the minimum time separation.

In an embodiment, the wireless device may comprise one or more wireless device capabilities, of an initial bandwidth part of the cell, based on the minimum time separation.

According to an embodiment, a wireless device may transmit one or more radio resource control (RRC) messages. The RRC messages may comprise one or more wireless device capabilities. The one or more wireless device capabilities may comprise a first wireless device capability and a second wireless device capability. The first wireless device capability may indicate a first number of blind decoding that the wireless device supports in a slot based on a first mode. The second wireless device capability may indicate a second number of blind decoding that the wireless device supports in a slot based on a second mode. The wireless device may transmit a preamble in response to initiating a random access procedure. The wireless device may receive a downlink control information (DCI) scheduling a random access response based on the first number of blind decoding. The wireless device may receive one or more second RRC messages indicating to enable the second mode. The wireless device may receive a second DCI, in response to the second mode being enabled, based on the second number of blind decoding.

In an embodiment, the wireless device may receive configuration parameters indicating a search space.

In an embodiment, the DCI is scheduled via the search space.

In an embodiment, the second DCI is scheduled via the search space.

In an embodiment, a periodicity of the search space is a slot.

In an embodiment, the first mode indicates the wireless device operates based on a single-slot downlink control channel monitoring.

In an embodiment, the second mode indicates the wireless device operates based on both single-single downlink control channel monitoring and a multi-slot downlink control channel monitoring.

What is claimed is:

1. A wireless device comprising:
one or more processors; and
memory storing instructions that, when executed by the one or more processors, cause the wireless device to:
transmit a wireless device capability message indicating that the wireless device supports a maximum number of downlink control information (DCIs) per a span, wherein the span comprises one or more consecutive symbols for physical downlink control channel (PDCCH) monitoring in a slot;
receive one or more configuration parameters, of a cell, for PDCCH monitoring indicating:
a time duration of the span comprising the one or more consecutive symbols for the PDCCH monitoring; and
a time gap between starting symbols of two consecutive spans;
determine a buffering time offset, for buffering data scheduled by a PDCCH transmission, based on the time gap between starting symbols of two consecutive spans, a subcarrier spacing of the cell, the maximum number of DCIs per span;
receive, in a first radio resource, a DCI scheduling a transport block (TB) in a second radio resource; and
drop the TB in response to a duration, in time, between the first radio resource and the second radio resource being less than, or equal to, the buffering time offset.

2. The wireless device of claim 1, wherein dropping the TB further comprises skipping buffering the TB.

3. The wireless device of claim 1, wherein instructions, when executed by the one or more processors, further cause the wireless device to:
receive, in a third radio resource, a second DCI scheduling a second TB in a fourth radio resource; and
determine to buffer the second TB in response to a second duration, in time, between the third radio resource and the fourth radio resource being greater than the buffering time offset.

4. The wireless device of claim 1, wherein the DCI indicates the duration between the first radio resource and the second radio resource.

5. The wireless device of claim 1, wherein:
the first radio resource is a first slot; and
the second radio resource is a second slot.

6. The wireless device of claim 1, wherein the buffering time offset is greater than one slot based on the subcarrier spacing of the cell.

7. The wireless device of claim 1, when executed by the one or more processors, further cause the wireless device to determine a processing time of the DCI based on the time gap and the time duration.

8. The wireless device of claim 1, wherein the one or more consecutive symbols of the span comprise one or more PDCCH monitoring occasions of one or more search spaces of a control resource set (CORESET) of an active bandwidth part (BWP) of the cell.

9. The wireless device of claim 1, wherein instructions, when executed by the one or more processors, further cause the wireless device to transmit, to a base station, a negative acknowledgement in response to dropping the TB.

10. The wireless device of claim 1, wherein instructions, when executed by the one or more processors, further cause the wireless device to determine a processing time of the DCI based on the time gap and the time duration.

11. A method comprising:
transmitting, by a wireless device, a wireless device capability message indicating that the wireless device supports a maximum number of downlink control information (DCIs) per a span, wherein the span comprises one or more consecutive symbols for physical downlink control channel (PDCCH) monitoring in a slot;
receiving one or more configuration parameters, of a cell, for PDCCH monitoring indicating:
a time duration of the span comprising the one or more consecutive symbols for the PDCCH monitoring; and
a time gap between starting symbols of two consecutive spans;
determining a buffering time offset, for buffering data scheduled by a PDCCH transmission, based on the time gap between starting symbols of two consecutive spans, a subcarrier spacing of the cell, and the maximum number of DCIs per span;
receiving, in a first radio resource, a DCI scheduling a transport block (TB) in a second radio resource; and
dropping the TB in response to a duration, in time, between the first radio resource and the second radio resource being less than, or equal to, the buffering time offset.

12. The method of claim 11, wherein dropping the TB further comprises skipping buffering the TB.

13. The method of claim 11, further comprising transmitting, to a base station, a negative acknowledgement in response to dropping the TB.

14. The method of claim 11, further comprising:
receiving, in a third radio resource, a second DCI scheduling a second TB in a fourth radio resource; and
determining to buffer the second TB in response to a second duration, in time, between the third radio resource and the fourth radio resource being greater than the buffering time offset.

15. The method of claim 11, wherein the DCI indicates the duration between the first radio resource and the second radio resource.

16. The method of claim 11, wherein:
the first radio resource is a first slot; and
the second radio resource is a second slot.

17. The method of claim 11, wherein the buffering time offset is greater than one slot based on the subcarrier spacing of the cell.

18. The method of claim 11, further comprising determining a processing time of the DCI based on the time gap and the time duration.

19. The method of claim 11, wherein the one or more consecutive symbols of the span comprise one or more PDCCH monitoring occasions of one or more search spaces of a control resource set (CORESET) of an active bandwidth part (BWP) of the cell.

20. A system comprising:
a base station comprising one or more first processors and memory storing instructions that, when executed by the one or more first processors, cause the base station to:
transmit one or more configuration parameters, of a cell, for physical downlink control channel (PDCCH) monitoring indicating:
a time duration of a span, wherein the span comprises one or more consecutive symbols for physical downlink control channel (PDCCH) monitoring in a slot; and
a time gap between starting symbols of two consecutive spans; and
a wireless device comprising one or more first processors and memory storing instructions that, when executed by the one or more first processors, cause the wireless device to:
transmit a wireless device capability message indicating that the wireless device supports a maximum number of downlink control information (DCIs) per the span comprising the one or more consecutive symbols for PDCCH monitoring;
receive, from the base station, the one or more configuration parameters;
determine a buffering time offset, for buffering data scheduled by a PDCCH transmission, based on the time gap between starting symbols of two consecutive spans, a subcarrier spacing of the cell, and the maximum number of DCIs per span;
receive, in a first radio resource, a DCI scheduling a transport block (TB) in a second radio resource; and
drop the TB in response to a duration, in time, between the first radio resource and the second radio resource being less than, or equal to, the buffering time offset.

* * * * *